(12) United States Patent
Abe et al.

(10) Patent No.: US 8,150,180 B2
(45) Date of Patent: Apr. 3, 2012

(54) MOVING PICTURE CODING METHOD AND MOVING PICTURE DECODING METHOD

(75) Inventors: Kiyofumi Abe, Kadoma (JP); Shinya Kadono, Nishinomiya (JP); Satoshi Kondo, Yawata (JP); Makoto Hagai, Moriguchi (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/208,677

(22) Filed: Aug. 12, 2011

(65) Prior Publication Data

US 2011/0293007 A1    Dec. 1, 2011

Related U.S. Application Data

(60) Division of application No. 12/878,350, filed on Sep. 9, 2010, now Pat. No. 8,023,753, which is a division of application No. 11/976,845, filed on Oct. 29, 2007, now Pat. No. 7,817,867, which is a continuation of application No. 10/491,153, filed as application No. PCT/JP03/09228 on Jul. 22, 2003, now Pat. No. 7,308,145.

(30) Foreign Application Priority Data

| Aug. 8, 2002 | (JP) | 2002-232160 |
| Sep. 19, 2002 | (JP) | 2002-273992 |
| Oct. 1, 2002 | (JP) | 2002-289294 |
| Oct. 9, 2002 | (JP) | 2002-296726 |
| Dec. 20, 2002 | (JP) | 2002-370722 |
| Jan. 16, 2003 | (JP) | 2003-008751 |

(51) Int. Cl.
*G06T 9/00* (2006.01)
*H04N 7/32* (2006.01)
*H04N 7/64* (2006.01)

(52) U.S. Cl. ... 382/233; 382/236; 382/238; 375/240.12; 375/240.25; 375/240.27

(58) Field of Classification Search .................. None
See application file for complete search history.

(56) References Cited

U.S. PATENT DOCUMENTS 4,656,500 A    4/1987  Mori
(Continued)

FOREIGN PATENT DOCUMENTS

KR    10-2003-0083760    10/2003
(Continued)

OTHER PUBLICATIONS

International Search Report issued Oct. 28, 2003 in corresponding International Application No. PCT/JP03/09228.

(Continued)

*Primary Examiner* — Scott A Rogers
(74) *Attorney, Agent, or Firm* — Wenderoth, Lind & Ponack, L.L.P.

(57) ABSTRACT

According to a picture coding method of the present invention, a coded picture identified by a picture number is stored, as a reference picture, into a storage unit; commands indicating correspondence between picture numbers and reference indices for designating reference pictures and coefficients used for generation of predictive images are generated; a reference picture being used when motion compensation is performed on a current block in a current picture to be coded is designated by a reference index; a predictive image is generated by performing linear prediction on a block being obtained by motion estimation within the designated reference picture, by use of a coefficient corresponding to the reference index; a coded image signal including a coded signal obtained by coding a prediction error being a difference between the current block in the current picture to be coded and the predictive image, the commands, the reference index and the coefficient is outputted. At that time, information indicating the maximum reference index value is coded and included into the coded image signal, and the commands indicating correspondence between at least one picture number and a plurality of reference indices are generated.

5 Claims, 41 Drawing Sheets

U.S. PATENT DOCUMENTS

| | | | |
|---|---|---|---|
| 7,450,643 | B2 | 11/2008 | Chujoh et al. |
| 7,523,234 | B2 | 4/2009 | Yin et al. |
| 7,616,691 | B2 | 11/2009 | Chujoh et al. |
| 2004/0008784 | A1 | 1/2004 | Kikuchi et al. |
| 2004/0141615 | A1 | 7/2004 | Chujoh et al. |
| 2004/0234143 | A1 | 11/2004 | Hagai et al. |
| 2004/0247190 | A1 | 12/2004 | Hagai et al. |
| 2005/0041742 | A1 | 2/2005 | Abe et al. |
| 2005/0129127 | A1 | 6/2005 | Jeon |
| 2007/0211802 | A1 | 9/2007 | Kikuchi et al. |
| 2008/0069246 | A1 | 3/2008 | Abe et al. |
| 2010/0195723 | A1 | 8/2010 | Ikai et al. |

FOREIGN PATENT DOCUMENTS

| | | |
|---|---|---|
| KR | 10-2004-0002582 | 1/2004 |
| WO | 01/86960 | 11/2001 |

OTHER PUBLICATIONS

Supplementary Partial European Search Report issued Jun. 22, 2007 in corresponding European Application No. 03 74 1520.

Wiegand, T.: "Text of Final Committee Draft of Joint Video Specification" (ITU-T Rec. H. 264/ISO/IEC 14496-10 AVC) MPEG02/N4920 ISO/IEC JTC1/SC29/WG11 MPEG02/N4920, Klagenfurt, AT, Jul. 2002, pp. I-XV, 1, XP001100641; pp. III-IV, paragraph 8; pp. 32-42, paragraph 7.4.2-7.4.3.3; p. 61, paragraph 8.4.

Lim C-S et al.: "Post Decoder Buffer for HRD"; Joint Video Team (JVT) of ISO/IEC MPEG & ITU-T VCEG (ISO/IEC JTC1/SC29/WG11 and ITU-T SG16 Q6), No. JVT-D111, Jul. 22, 2002, pp. 1-10, XP002424748; pp. 3-4, paragraph 3; table A.1.

T. Fukuhara, entitled "Very Low Bit-Rate Video Coding With Block Partitioning and Adaptive Selection of Two Time-Differential Frame Memories", IEEE Transactions on Circuits and Systems for Video Technology, IEEE, Feb. 1997, vol. 7, No. 1, pp. 212-220.

Office Action issued Jun. 12, 2008 in U.S. Appl. No. 11/976,843.

Wiegand, T.: "Text of Final Committee Draft of Joint Video Specification" (ITU-T Rec. H. 264/ISO/IEC 14496-10 AVC) MPEG02/N4920 ISO/IEC JTC1/SC29/WG11 MPEG02/N4920, Klagenfurt, AT, Jul. 2002, pp. 30-32, paragraph 7.4.1.; pp. 42-61, paragraphs 7.4.4-8.3.6.9; and pp. 62-81, paragraphs 8.4.1-9.1.1.

European Search Report issued Feb. 9, 2010 in corresponding European Application No. 07 142 3844.

Thomas Wiegand, "Draft ISO/IEC 14496-10: 2002 (E)", Joint Video Team (JVT) of ISO/IEC MPEG and ITU-T VCEG, (ISO/IEC JTC1/SC29/WG11 and ITU-T SG16 Q6), No. JVT-C167, May 10, 2002, pp. I, 38-40, 99-106, XP002565253.

Yoshihiro Kikuchi, "Multiframe MC using frame interpolation", Joint Video Team (JVT) of ISO/IEC MPEG & ITU-T VCEG (ISO/IEC JTC1/SC29/WG11 and ITU-T SG16 Q6), No. JVT-B075, Feb. 1, 2002, pp. 1-8, XP030005075.

Tsuhan Chen et al., "A New Frame Interpolation Scheme for Talking Head Sequences", Proceedings of the International Conference on Image Processing (ICIP), Washington, Oct. 23-26, 1995, Los Alamitos, IEEE Comp. Soc. Press, US, vol. 2, pp. 591-594, XP010197038, ISBN: 978-0-7803-3122-8.

Extended European Search Report issued Nov. 9, 2011 in corresponding European Application No. EP 10 17 8519.

Extended European Search Report issued Nov. 29, 2011 in corresponding European Application No. EP 10 17 8507.

Hannuksela, Miska M., "Generalized B/MH-Picture Averaging", Joint Video Team (JVT) of ISO/IEC MPEG & ITU-T VCEG (ISO/IEC JTC1/SC29/WG11 and ITU-T SG16 Q.6), 3rd Meeting: Fairfax, VA, USA, May 6-10, 2002, Document JVT-C077, May 10, 2002, pp. 1-8, XP030005186.

Boyce, Jill, "Changes to Adaptive Reference Picture Weighting", Joint Video Team (JVT) of ISO/IEC MPEG & ITU-T VCEG (ISO/IEC JTC1/SC29/WG11 and ITU-T SG16 Q.6), $5^{th}$ Meeting: Geneva, CH, Oct. 9-17, 2002; Document JVTE060, Oct. 9, 2002, pp. 1-7, XP002500852.

Jeon, Byeong-Moon, "B Pictures in JVT", Joint Video Team (JVT) of ISO/IEC MPEG & ITU-T VCEG (ISO/IEC JTC1/SC29/WG11 and ITI-T SG16 Q.6), $4^{th}$ Meeting: Klagenfurt, AT, Jul. 22-26, 2002, Document JVT-D155, Jul. 26, 2002, 19 pages, XP030005418.

Wiegand, Thomas, Joint Final Committee Draft (JFCD) of Joint Video Specification (ITU-T Rec. H.264 ISO/IEC 14496-10 AVC), Joint Video Team (JVT) of ISO/IEC MPEG and ITU-T VCEG, $4^{th}$ Meeting: Klagenfurt, AT, Jul. 22-26, 2002, Document JVT-D157, Jul. 26, 2002, pp. i-191, XP030005420.

Kadono, Shinya et al., "Implicit Weighed Bi-prediction using DC Offset Value", Joint Video Team (JVT) of ISO/IEC MPEG & ITU-T VCEG (ISO/IEC JTC1/SC29/WG11 and ITU-T SG16 Q.6), $5^{th}$ Meeting: Geneva, CH, Oct. 9-17, 2002, Document JVT-E077, Oct. 18, 2002, pp. 1-10, XP030005494.

Sullivan, Gary, "Various Minor Clean-Up Issues", Joint Video Team (JVT) of ISO/IEC MPEG & ITU-T VCEG (ISO/IEC JTC1/SC29/WG11 and ITU-T SG16 Q.6), $5^{th}$ Meeting: Geneva, CH, Oct. 9-17, 2002, Document JVT-E123, pp. 1-6, XP030005536.

Wiegand, Thomas, "Editor's Proposed Modifications to Joint Committee Draft (CD) of Joint Video Specification (ITU-T Rec. H.264 ISO/IEC 14496-10 AVC) relative to JVT-D015d5", Joint Video Team (JVT) of ISO/IEC MPEG and ITU-T VCEG, $4^{th}$ Meeting: Klagenfurt, AT, Jul. 22-26, 2002, Document JVT-D017 draft 1, Jul. 26, 2002, pp. i-144, XP030005292.

Boyce, Jill, "Adaptive reference picture weighting using reference picture index", Joint Video Team (JVT) of ISO/IEC MPEG & ITU-T VCEG (ISO/IEC JTC1/SC29/WG11 and ITU-T SG16 Q.6), $4^{th}$ Meeting: Klagenfurt, AT, Jul. 22-26, 2002, Document JVT-D122, Jul. 26, 2002, pp. 1-7, XP030005394.

FIG. 7

<For ref1>

| ref1 | pset | w1 | w2 | c | d |
|------|------|----|----|---|---|
| 0 | pset0 | 1 | 1 | 0 | 1 |
| 1 | pset1 | 2 | -1 | 0 | 0 |
| 2 | pset2 | 3 | 1 | 1 | 2 |
| .... | .... | .... | .... | .... | .... |

<For ref2>

| ref2 | pset | w1 | w2 | c | d |
|------|------|----|----|---|---|
| 0 | pset0 | 1 | 1 | 0 | 1 |
| 1 | pset1 | -2 | 6 | 0 | 2 |
| 2 | pset2 | 3 | -2 | 2 | 0 |
| .... | .... | .... | .... | .... | .... |

FIG. 13

For ref1

| ref1 | pset | w1_1 | c_1 |
|---|---|---|---|
| 0 | pset0 | 1 | 0 |
| 1 | pset1 | 2 | 0 |
| 2 | pset2 | 3 | 1 |
| .... | .... | .... | .... |

For ref2

| ref2 | pset | w2_2 | c_2 |
|---|---|---|---|
| 0 | pset0 | 1 | 0 |
| 1 | pset1 | 6 | 0 |
| 2 | pset2 | -2 | 2 |
| .... | .... | .... | .... |

FIG. 15

<For ref1>

| ref1 | pset | c |
|---|---|---|
| 0 | pset0 | 0 |
| 1 | pset1 | 0 |
| 2 | pset2 | 2 |
| .... | .... | .... |

<For ref2>

| ref2 | pset | c |
|---|---|---|
| 0 | pset0 | 1 |
| 1 | pset1 | 1 |
| 2 | pset2 | 0 |
| .... | .... | .... |

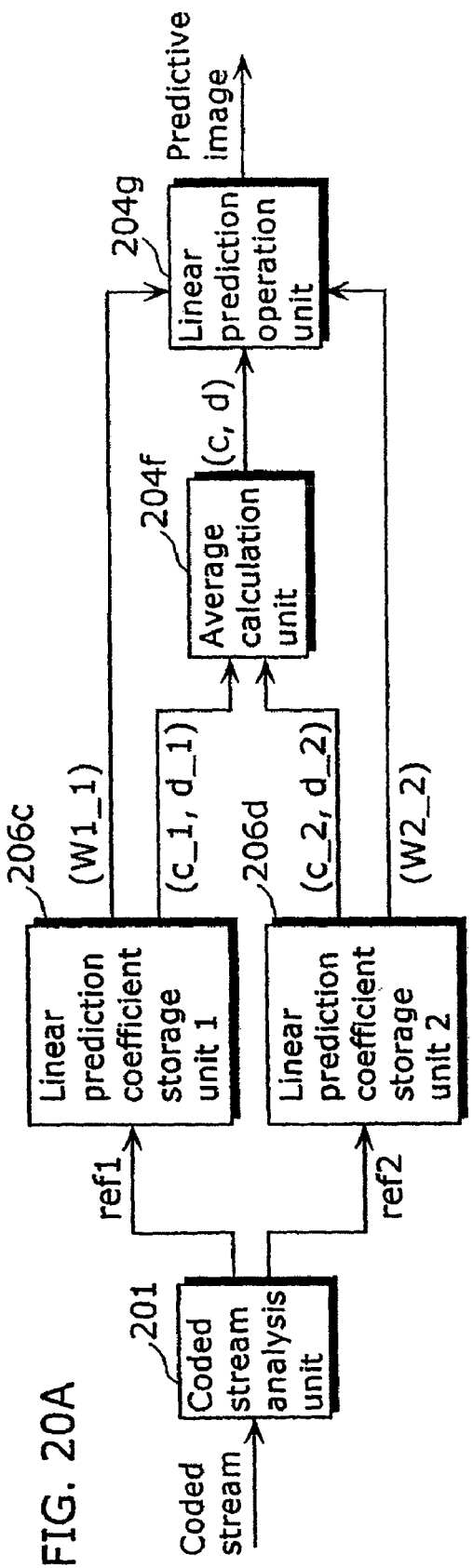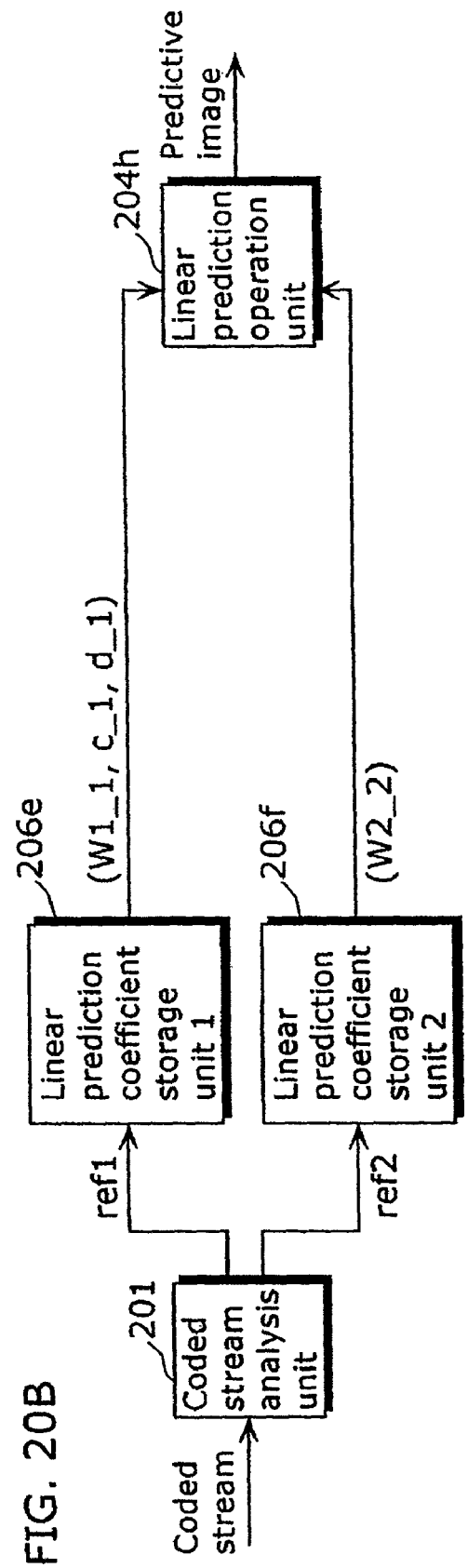

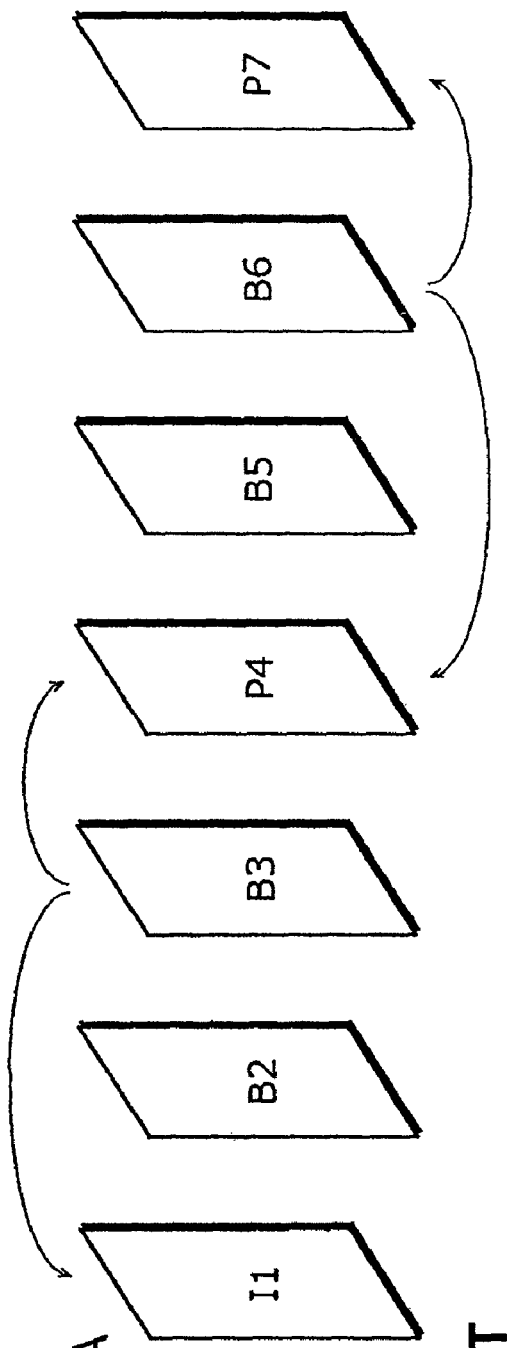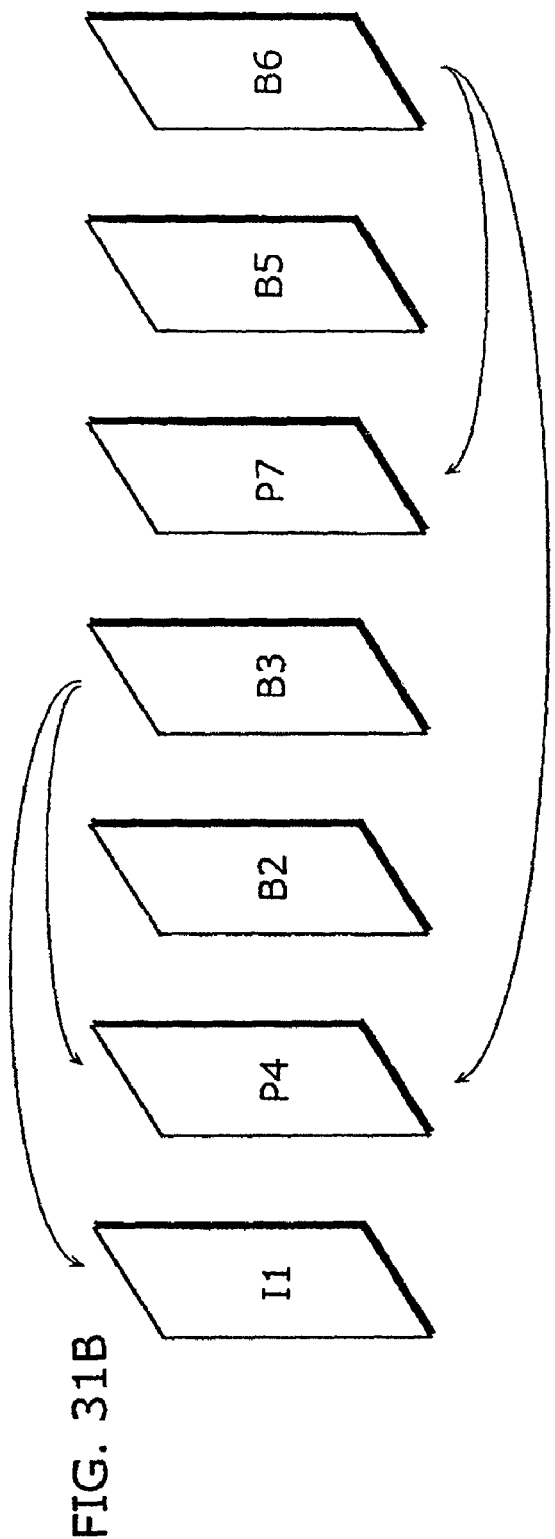
PRIOR ART
FIG. 31A
PRIOR ART
FIG. 31B

FIG. 37  PRIOR ART

<For ref1>

| ref1 | pset | w1 | w2 | c | d |
|---|---|---|---|---|---|
| 0 | pset0 | 1 | 1 | 0 | 1 |
| 1 | pset1 | 2 | -1 | 0 | 0 |
| 2 | pset2 | 3 | 1 | 1 | 2 |
| 3 | pset3 | 3 | -2 | 2 | 0 |
| 4 | pset4 | -2 | 6 | 0 | 2 |

<For ref2>

| ref2 | pset | w1 | w2 | c | d |
|---|---|---|---|---|---|
| 0 | pset0 | 1 | 1 | 0 | 1 |
| 1 | pset1 | -2 | 6 | 0 | 2 |
| 2 | pset2 | 3 | -2 | 2 | 0 |
| 3 | pset3 | 3 | 1 | 1 | 2 |
| 4 | pset4 | 2 | -1 | 0 | 0 |

…

MOVING PICTURE CODING METHOD AND MOVING PICTURE DECODING METHOD

CROSS REFERENCES TO RELATED APPLICATIONS

This application is a divisional of application Ser. No. 12/878,350, filed Sep. 9, 2010 now U.S. Pat. No. 8,023,753, which is a divisional of application Ser. No. 11/976,845, filed Oct. 29, 2007, now U.S. Pat. No. 7,817,867, which is a continuation of application Ser. No. 10/491,153 filed Mar. 26, 2004, now U.S. Pat. No. 7,308,145, which is the National Stage of International Application No. PCT/JP03/09228, filed Jul. 22, 2003.

TECHNICAL FIELD

The present invention relates to a moving picture coding method and a moving picture decoding method, and particularly to a coding method and a decoding method using inter-picture prediction with reference to previously coded pictures.

BACKGROUND ART

With the development of multimedia applications, it has become popular to handle integrally all kinds of media information such as video, audio and text. For that purpose, digitalization of all these kinds of media allows handling of them in an integral manner. However, since digitized images have an enormous amount of data, image information compression techniques are absolutely essential for storage and transmission of such information. It is also important to standardize such compression techniques for interoperation of compressed image data. There exist international standards for image compression techniques, such as H.261 and H.263 standardized by International Telecommunication Union-Telecommunication Standardization Sector (ITU-T) and MPEG-1, MPEG-4 and others standardized by International Organization for Standardization (ISO). ITU is now working for standardization of H.26L as the latest standard for image coding.

In coding of moving pictures, in general, information amount is compressed by reducing redundancies in both temporal and spatial directions. Therefore, in inter-picture prediction coding, which aims at reducing the temporal redundancy, motion of a current picture is estimated on a block-by-block basis with reference to preceding or subsequent pictures so as to create a predictive image, and then differential values between the obtained predictive images and the current picture are coded.

Here, the term "picture" represents a single sheet of an image, and it represents a frame when used in a context of a progressive image, whereas it represents a frame or a field in a context of an interlaced image. The interlaced image here is a single frame that is made up of two fields having different times respectively. In the process of coding and decoding the interlaced image, a single frame can be handled as a frame, as two fields, or as a frame structure or a field structure on every block in the frame.

The following description will be given assuming that a picture is a frame in a progressive image, but the same description can be given even assuming that a picture is a frame or a field in an interlaced image.

FIG. 30 is a diagram for explaining types of pictures and reference relations between them.

A picture like a picture I1, which is intra-picture prediction coded without reference to any pictures, is referred to as an I-picture. A picture like a picture P10, which is inter-picture prediction coded with reference to only one picture, is referred to as a P-picture. And a picture, which can be inter-picture prediction coded with reference to two pictures at the same time, is referred to as a B-picture.

B-pictures, like pictures B6, B12 and B18, can refer to two pictures located in arbitrary temporal directions. Reference pictures can be designated on a block-by-block basis, on which motion is estimated, and they are discriminated between a first reference picture which is described earlier in a coded stream obtained by coding pictures and a second reference picture which is described later in the coded stream.

However, it is required in order to code and decode the above pictures that the reference pictures be already coded and decoded. FIGS. 31A and 31B show examples of order of coding and decoding B-pictures. FIG. 31A shows a display order of the pictures, and FIG. 31B shows a coding and decoding order reordered from the display order as shown in FIG. 31A. These diagrams show that the pictures are reordered so that the pictures which are referred to by the pictures B3 and B6 are previously coded and decoded.

A method for creating a predictive image in the case where the above-mentioned B-picture is coded with reference to two pictures at the same time will be explained in detail using FIG. 32. Note that a predictive image is created in decoding in exactly the same manner.

The picture B4 is a current B-picture to be coded, and blocks BL01 and BL02 are current blocks to be coded belonging to the current B-picture. Referring to a block BL11 belonging to the picture P2 as a first reference picture and BL21 belonging to the picture P3 as a second reference picture, a predictive image for the block BL01 is created. Similarly, referring to a block BL12 belonging to the picture P2 as a first reference picture and a block BL22 belonging to the picture P1 as a second reference picture, a predictive image for the block BL02 is created (See Non-patent document 1).

FIG. 33 is a diagram for explaining a method for creating a predictive image for the current block to be coded BL01 using the referred two blocks BL11 and BL21. The following explanation is made assuming here that a size of each block is 4 by 4 pixels. Assuming that $Q1(i)$ is a pixel value of BL11, $Q2(i)$ is a pixel value of BL21 and $P(i)$ is a pixel value of the predictive image for the target BL01, the pixel value $P(i)$ can be calculated by a linear prediction equation like the following equation 1. "i" indicates the position of a pixel, and in this example, "i" has values of 0 to 15.

$$P(i)=(w1 \times Q1(i)+w2 \times Q2(i))/\mathrm{pow}(2,d)+c \qquad \text{Equation 1}$$

(where pow(2, d) indicates the "d"th power of 2)

"w1", "w2", "c" and "d" are coefficients for performing linear prediction, and these four coefficients are handled as one set of weighting coefficients. This weighting coefficient set is determined by a reference index designating a picture referred to by each block. For example, four values of w1_1, w2_1, c_1 and d_1 are used for BL01, and w1_2, w2_2, c_2 and d_2 are used for BL02, respectively.

Next, reference indices designating reference pictures will be explained with reference to FIG. 34 and FIG. 35. A value referred to as a picture number, which increases one by one every time a picture is stored in a memory, is assigned to each picture. In other words, a picture number with a value added one to the maximum value of the existing picture numbers is assigned to a newly stored picture. However, a reference picture is not actually designated using this picture number, but using a value referred to as a reference index which is defined separately. Indices indicating first reference pictures are referred to as first reference indices, and indices indicating second reference pictures are referred to as second reference indices, respectively.

FIG. 34 is a diagram for explaining a method for assigning two reference indices to picture numbers. When there is a sequence of pictures ordered in display order, picture numbers are assigned in coding order. Commands for assigning the reference indices to the picture numbers are described in a header of a slice that is a subdivision of a picture, as the unit of coding, and thus the assignment thereof are updated every time one slice is coded. The command indicates the differential value between a picture number assigned a reference index currently and a picture number assigned a reference index immediately before the current assignment, in series by the number of reference indices.

Taking the first reference index in FIG. 34 as an example, since "−1" is given as a command first, 1 is subtracted from the picture number 16 of the current picture to be coded and thus the reference index 0 is assigned to the picture number 15. Next, since "−4" is given, 4 is subtracted from the picture number 15 and thus the reference index 1 is assigned to the picture number 11. The following reference indices are assigned to respective picture numbers in the same processing. The same goes for the second reference indices.

FIG. 35 shows the result of the assignment of the reference indices. The first reference indices and the second reference indices are assigned to respective picture numbers separately, but focusing attention to each reference index, it is obvious that one reference index is assigned to one picture number.

Next, a method for determining weighting coefficient sets to be used will be explained with reference to FIG. 36 and FIG. 37.

A coded stream of one picture is made up of a picture common information area and a plurality of slice data areas. FIG. 36 shows a structure of one slice data area among them. The slice data area is made up of a slice header area and a plurality of block data areas. As one example of a block data area, block areas corresponding to BL01 and BL02 in FIG. 32 are shown here.

"ref1" and "ref2" included in the block BL01 indicate the first reference index and the second index indicating two reference pictures for this block, respectively. In the slice header area, data (pset0, pset1, pset2, pset3 and pset4) for determining the weighting coefficient sets for the linear prediction are described for ref1 and ref2, respectively. FIG. 37 shows tables of the above-mentioned data included in the slice header area as an example.

Each data indicated by an identifier "pset" has four values, w1, w2, c and d, and is structured so as to be directly referred to by the values of ref1 and ref2. Also, in the slice header area, a command sequence idx_cmd1 and idx_cmd2 for assigning the reference indices to the picture numbers are described.

Using ref1 and ref2 described in BL01 in FIG. 36, one set of weighting coefficients is selected from the table for ref1 and another set of them is selected from the table for ref2. By performing linear prediction of the equation 1 using respective weighting coefficient sets, two predictive images are generated. A desired predictive image can be obtained by averaging these two predictive images on a per-pixel basis.

In addition, there is a method for obtaining a predictive image using a predetermined fixed equation unlike the above-mentioned method for generating a predictive image using a prediction equation obtained by weighting coefficient sets of linear prediction coefficients. In the former method, in the case where a picture designated by a first reference index appears later in display order than a picture designated by a second reference index, the following equation 2a being a fixed equation composed of fixed coefficients is selected, and in other cases, the following equation 2b being a fixed equation composed of fixed coefficients is selected, so as to generate a predictive image.

$$P(i)=2 \times Q1(i)-Q2(i) \qquad \text{Equation 2a}$$

$$P(i)=(Q1(i)+Q2(i))/2 \qquad \text{Equation 2b}$$

As is obvious from the above, this method has the advantage that there is no need to code and transmit the weighting coefficient sets to obtain the predictive image because the prediction equation is fixed. This method has another advantage that there is no need to code and transmit a flag for designating the weighting coefficient sets of linear prediction coefficients because the fixed equation is selected based on the positional relationship between pictures. In addition, this method allows significant reduction of an amount of processing for linear prediction because of a simple formula for linear prediction.

(Nonpatent Document 1)
ITU-T Rec. H.264| ISO/IEC 14496-10 AVC
Joint Committee Draft (CD)
(2002 May 10)
(P. 34 8.4.3 Re-Mapping of frame numbers indicator,
P. 105 11.5 Prediction signal generation procedure)

In the method for creating a predictive image using weighting coefficient sets based on the equation 1, since the number of commands for assigning reference indices to reference pictures is same as the number of the reference pictures, only one reference index is assigned to one reference picture, and thus the weighting coefficient sets used for linear prediction of the blocks referring to the same reference picture have exactly the same values. There is no problem if images change uniformly in a picture as a whole, but there is a high possibility that the optimum predictive image cannot be generated if respective images change differently. In addition, there is another problem that the amount of processing for linear prediction increases because the equation includes multiplications.

SUMMARY OF THE INVENTION

Against this backdrop, it is an object of the present invention to provide a picture coding method and a picture decoding method and apparatuses and programs for executing these methods for allowing assignment of a plurality of reference indices to one reference picture and thus improving decoding efficiency of reference indices in both cases where a plurality of reference indices are assigned and one reference index is assigned.

In order to achieve this object, the picture coding method according to the present invention is structured as follows. The picture coding method according to the present invention includes: a reference picture storage step of storing a coded picture identified by a picture number, as a reference picture, into a storage unit; a command generation step of generating commands indicating correspondence between reference indices and picture numbers, said reference indices designating reference pictures and coefficients used for generation of predictive images; a reference picture designation step of designating a reference picture by a reference index, said reference picture being used when motion compensation is performed on a current block in a current picture to be coded; a predictive image generation step of generating a predictive image by performing linear prediction on a block by use of a coefficient corresponding to the reference index, said block being obtained by motion estimation within the reference picture designated in the reference picture designation step; and a coded signal output step of outputting a coded image signal including a coded signal obtained by coding a prediction error, the commands, the reference index and the coefficient, said prediction error being a difference between the current block in the current picture to be coded and the predictive image, wherein in the coded signal output step, information indicating a maximum reference index value is coded and placed into the coded image signal.

Here, it may be structured so that the information indicating the maximum reference index value is placed in a picture common information area included in the coded image signal.

According to this structure, when picture numbers and reference indices are corresponded to each other according to the commands in the decoding apparatus, information indicating the maximum reference index value is included in the coded signal. Therefore, by corresponding the picture numbers and the reference indices according to the commands until the number of reference indices reaches the maximum value, all the reference indices and the pictures numbers can be corresponded to each other easily. As a result, it is possible not only to assign a plurality of reference indices to one reference picture, but also to perform decoding of the reference indices efficiently in either case where a plurality of reference indices are assigned or one reference index is assigned.

Here, it may be structured so that in the command generation step, the commands are generated so that at least one reference picture, among reference pictures stored in the storage unit, has a picture number assigned a plurality of reference indices.

Also, it may be structured so that in the reference picture designation step, when the plurality of reference indices are corresponded to the picture number of the reference picture, one of the reference indices is selected based on coefficients corresponding respectively to said plurality of reference indices, and in the predictive image generation step, the linear prediction is performed using a coefficient corresponding to the reference index selected in the reference picture designation step.

According to this structure, a plurality of reference indices are corresponded to one picture. Therefore, when linear prediction is performed using the coefficient corresponding to the reference index designating the reference picture, that coefficient can be selected from among a plurality of coefficients. In other words, the optimum coefficient can be selected as a coefficient used for the linear prediction. As a result, the coding efficiency can be improved.

Here, it may be structured so that in the predictive image generation step, the linear prediction is performed using only a bit shift operation, an addition and a subtraction.

According to this structure, multiplications and divisions which require heavy processing load are not used, but only bit shift operations, additions and subtractions which require smaller processing load are used, so the processing amount of linear prediction can be reduced.

Here, it may be structured so that in the predictive image generation step, as the coefficient used in the linear prediction, only a value indicating a direct current component in a linear prediction equation is corresponded to the reference index.

According to this structure, values of coefficients other than the value indicating a DC component do not need to be coded, so the coding efficiency can be improved. Also, since multiplications and divisions which require heavy processing load are not used but additions and subtractions which require smaller processing load are used, the processing amount for linear prediction can be restrained.

Here, it may be structured so that the reference index has a first reference index indicating a first reference picture and a second reference index indicating a second reference picture, and in the predictive image generation step, in the case where a method for generating the coefficient according to display order information of each of the reference pictures is used as a method for performing the linear prediction, when a reference picture designated by the first reference index and a reference picture designated by the second reference index have the same display order information, the linear prediction is performed using a predetermined coefficient for each of the first and second reference indices instead of the coefficient.

Also, it may be structured so that the predetermined coefficients have the same weight.

According to this structure, it is possible to determine the coefficients for performing linear prediction even in the case where two reference pictures have the same display order information, and thus the coding efficiency can be improved.

Also, the picture decoding method, the picture coding apparatus, the picture decoding apparatus, the picture coding program, the picture decoding program, and the coded picture data of the present invention have the same structures, functions and effects as the picture coding method described above.

In addition, the picture coding method of the present invention can be structured in any of the following manners (1) to (14).

(1) The picture coding method according to the present invention includes: a reference picture storage step of storing a coded picture identified by a picture number into a storage unit; a command generation step of generating commands for allowing a plurality of reference indices to refer to the same picture, said commands indicating correspondence between reference indices and picture numbers, said reference indices designating reference pictures and coefficients used for generation of predictive images, and said reference pictures being referred to when motion compensation is performed on a current block in a current picture to be coded and selected arbitrarily from among a plurality of coded pictures stored in the storage unit; a reference picture designation step of designating a reference picture by a reference index, said reference picture being referred to when motion compensation is performed on the current block in the current picture to be coded; a predictive image generation step of generating a predictive image by performing linear prediction on a block by use of a coefficient corresponding to the reference index designating the reference picture, said block being obtained by motion estimation on the reference picture designated in the reference picture designation step; and a coded signal output step of outputting a coded image signal including a coded signal obtained by coding a prediction error, the commands, the reference index and the coefficient, said prediction error being a difference between the current block in the current frame to be coded and the predictive image.

(2) According to another picture coding method of the present invention, it is possible to assign a plurality of reference indices to the picture number of the reference picture, and it is also possible to select one reference index from among one or more reference indices corresponding to respective coded pictures in the reference picture designation step and thus determine the coefficient used for linear prediction in the predictive image generation step.

(3) According to another picture coding method of the present invention, at least one reference picture, among a plurality of reference pictures referred to by one slice, has a picture number assigned a plurality of reference indices.

(4) According to another picture coding method of the present invention, the reference index includes a first reference index indicating a first reference picture which is arbitrarily designated from among the plurality of coded pictures and a second reference index indicating a second reference frame which is arbitrarily designated from among the plurality of coded frames, wherein in the predictive image generation step, the linear prediction is performed on the block by a coefficient corresponding to the first reference index, and the linear prediction is performed on the block by a coefficient corresponding to the second reference index, and then a final predictive image for the block is generated by calculating an average of pixel values in the two predictive images respectively obtained by the linear predictions.

(5) According to another picture coding method of the present invention, the reference index includes a first reference index indicating a first reference picture which is arbitrarily designated from among the plurality of coded pictures and a second reference index indicating a second reference frame which is arbitrarily designated from among the plurality of coded frames, wherein in the predictive image generation step, the coefficient used for the linear prediction is determined by calculating an average of the coefficients designated by the selected first reference index and the selected second reference index respectively.

(6) According to another picture coding method of the present invention, the reference index includes a first reference index indicating a first reference picture which is arbitrarily designated from among the plurality of coded pictures and a second reference index indicating a second reference frame which is arbitrarily designated from among the plurality of coded frames, wherein sets of coefficients are corresponded to the first reference index and the second reference index, and in the predictive image generation step, the predictive image is generated using a part of the coefficient set corresponding to one of the first and second reference indices and a part of the coefficient set corresponding to the other reference index.

(7) According to another picture coding method of the present invention, in an equation used for the linear prediction in the predictive image generation step, neither a multiplication nor a division are used but only a bit shift operation, an addition and a subtraction are used. Accordingly, the linear prediction can be realized by performing the processing with a smaller amount of calculations.

(8) According to another picture coding method of the present invention, the reference index includes a first reference index indicating a first reference picture which is arbitrarily designated from among the plurality of coded pictures and a second reference index indicating a second reference frame which is arbitrarily designated from among the plurality of coded frames, wherein in the predictive image generation step, the predictive image is generated using the coefficient corresponding to either one of the first reference index and the second reference index which is selected, as a coefficient used for the bit shift operation, from among the coefficient sets corresponding to the first reference index and the second reference index, and using an average of the coefficients corresponding to the first reference index and the second reference index respectively as a coefficient used for other operations.

(9) According to another picture coding method of the present invention, the reference index includes a first reference index indicating a first reference picture which is arbitrarily designated from among the plurality of coded pictures and a second reference index indicating a second reference frame which is arbitrarily designated from among the plurality of coded frames, wherein in the predictive image generation step, only a value indicating a direct current component in a linear prediction equation is used as a coefficient used for the linear prediction, and one coefficient is corresponded to each of the first reference index and the second reference index.

(10) Another picture coding method of the present invention includes: a reference picture storage step of storing a coded picture identified by a picture number into a storage unit; a command generation step of generating commands for allowing a plurality of reference indices to refer to the same picture, said commands indicating correspondence between reference indices and picture numbers, said reference indices indicating reference pictures which are referred to when motion compensation is performed on a current block in a current picture to be coded and selected arbitrarily from among a plurality of coded pictures stored in the storage unit; a reference picture designation step of designating a reference picture by a reference index, said reference picture being referred to when motion compensation is performed on the current block in the current picture to be coded; a predictive image generation step of generating a coefficient from display order information of each reference picture and generating a predictive image by performing linear prediction on a block by use of the generated coefficient, said block being obtained by motion estimation on the reference picture designated in the reference picture designation step; and a coded signal output step of outputting a coded image signal including a coded signal obtained by coding a prediction error, the commands, the reference index and the coefficient, said prediction error being a difference between the current block in the current frame to be coded and the predictive image.

(11) According to another picture coding method of the present invention, in the predictive image generation step, as a method for performing the linear prediction, a method using the coefficient generated according to the display order information and a method using a predetermined fixed equation are switched for use based on the display order information indicating temporal relationship between the reference picture designated by the first reference index and the reference picture designated by the second reference index.

(12) According to another picture coding method of the present invention, in the predictive image generation step, in the case where a method using the coefficient generated according to display order information of each of the reference pictures is used as a method for performing the linear prediction, when a reference picture designated by the first reference index and a reference picture designated by the second reference index have the same display order information, the linear prediction is performed using a predetermined coefficient for each of the first and second reference indices instead of the coefficient.

(13) According to another picture coding method of the present invention, in the predictive image generation step, when the coefficient is generated using the display order information, the coefficient is approximated to a power of 2 so that the linear prediction can be performed not using a multiplication nor a division but using only a bit shift operation, an addition and a subtraction.

(14) According to another picture coding method of the present invention, when the approximation is performed, a round-up approximation and a round-down approximation are switched for use based on the display order information indicating temporal relationship between the reference picture designated by the first reference index and the reference picture designated by the second reference index.

(15) A program of the present invention may be structured so as to cause a computer to execute the picture coding method described in any of the above-mentioned (1) to (14).

Furthermore, a computer readable recording medium of the present invention may be structured as described in the following (16) to (25).

(16) A computer readable recording medium on which a coded signal that is a signal of a coded moving picture is recorded, wherein the coded signal including data obtained by coding the following: a coefficient used for generation of a predictive image; commands for allowing a plurality of reference indices to refer to the same picture, said commands indicating correspondence between reference indices and picture numbers, said reference indices designating reference pictures and coefficients used for generation of predictive images, and said reference pictures being referred to when motion compensation is performed on a current block in a current picture to be coded and selected arbitrarily from among a plurality of coded pictures stored in a storage unit for storing the coded pictures identified by the picture numbers; a reference index for designating the coefficient used for generation of the predictive image and the reference picture used when motion compensation is performed on the current block in the current picture; the predictive image which is generated by performing linear prediction on a block by use of the coefficient corresponding to the reference index designating the reference picture, said block being obtained by motion estimation on the selected reference picture.

(17) The coded signal includes the maximum reference index value.

(18) The maximum value is placed in a picture common information area included in the coded signal.

(19) A header of a slice including a plurality of blocks, a picture common information area, or a header of each block, which is included in the coded signal, includes a flag indicating whether a coefficient used for generating a predictive image of the block using linear prediction has been coded or not.

(20) A header of a slice including a plurality of blocks, a picture common information area, or a header of each block, which is included in the coded signal, includes a flag indicating whether to generate the predictive image of the block not using a coefficient but using a predetermined fixed equation or to generate the predictive image using a predetermined fixed equation by use of only a coefficient indicating a direct current component.

(21) A header of a slice including a plurality of blocks, a picture common information area, or a header of each block, which is included in the coded signal, includes a flag indicating whether to generate the predictive image of the block using two predetermined equations by switching between them or to generate the predictive image using either one of the two equations, when the predictive image is generated using a fixed equation that consists of the two equations.

(22) A header of a slice including a plurality of blocks, a picture common information area, or a header of each block, which is included in the coded signal, includes a flag indicating whether or not to generate a coefficient used for generating the predictive image of the block by linear prediction using display order information of a reference picture.

(23) A header of a slice including a plurality of blocks, a picture common information area, or a header of each block, which is included in the coded signal, includes a flag indicating whether or not to approximate a coefficient used for generating the predictive image of the block by linear prediction to a power of 2.

(24) The coded signal includes a flag indicating that calculation for the linear prediction can be carried out not using a multiplication nor a division but using only a bit shift operation, an addition and a subtraction.

(25) The coded signal includes a flag indicating that calculation for the linear prediction can be carried out using only a value indicating a direct current component.

Furthermore, the picture decoding method of the present invention can be structured as described in the following (26) to (39).

(26) The picture decoding method of the present invention includes: a coded image information obtainment step for decoding a coded image signal including a coded signal obtained by coding coefficients used for generation of predictive images, commands for allowing a plurality of reference indices to refer to the same picture, reference indices and a prediction error, said commands indicating correspondence between the reference indices and picture numbers, said reference indices designating reference pictures and the coefficients, and said reference pictures being referred to when motion compensation is performed on a current block in a current picture to be coded and selected arbitrarily from among a plurality of coded pictures stored in a storage unit; a reference picture designation step of designating a reference picture according to decoded commands and a decoded reference index, said reference picture being used when motion compensation is performed on a current block in a current picture to be decoded; a predictive image generation step of generating a predictive image by performing linear prediction on a block by use of a coefficient corresponding to the reference index designating the reference picture, said block being obtained by motion estimation on the designated reference picture; and a decoded image generation step of generating a decoded image from the predictive image and a decoded prediction error.

(27) According to another picture decoding method of the present invention, it is possible to assign a plurality of reference indices to the picture number of the reference picture, and determine the coefficient used for linear prediction in the predictive image generation step using the reference index decoded in the reference picture designation step.

(28) According to another picture decoding method of the present invention, at least one reference picture, among a plurality of reference pictures referred to by one slice, has a picture number assigned a plurality of reference indices.

(29) According to another picture decoding method of the present invention, the reference index includes a first reference index indicating a first reference picture which is arbitrarily designated from among a plurality of decoded pictures and a second reference index indicating a second reference frame which is arbitrarily designated from among a plurality of decoded frames, wherein in the predictive image generation step, the linear prediction is performed on the block by a coefficient corresponding to the first reference index, and the linear prediction is performed on the block by a coefficient corresponding to the second reference index, and then a final predictive image for the block is generated by calculating an average of pixel values in the two predictive images respectively obtained by the linear prediction.

(30) According to another picture decoding method of the present invention, the reference index includes a first reference index indicating a first reference picture which is arbitrarily designated by a plurality of decoded pictures and a second reference index indicating a second reference frame which is arbitrarily designated from among a plurality of decoded frames, wherein in the predictive image generation step, the coefficient used for the linear prediction is determined by calculating an average of the coefficients designated by the selected first reference index and the selected second reference index respectively.

(31) According to another picture decoding method of the present invention, the reference index includes a first reference index indicating a first reference picture which is arbitrarily designated from among a plurality of decoded pictures and a second reference index indicating a second reference frame which is arbitrarily designated from among a plurality of decoded frames, wherein sets of coefficients are corresponded to the first reference index and the second reference index, and in the predictive image generation step, the predictive image is generated using a part of the coefficient set corresponding to one of the first and second reference indices and a part of the coefficient set corresponding to the other reference index.

(32) According to another picture decoding method of the present invention, in an equation used for the linear prediction in the predictive image generation step, neither a multiplication nor a division are not used but only a bit shift operation, an addition and a subtraction are used. Accordingly, the linear prediction can be realized by performing the processing with smaller amount of calculations.

(33) According to another picture decoding method of the present invention, the reference index includes a first reference index indicating a first reference picture which is arbitrarily designated from among a plurality of decoded pictures and a second reference index indicating a second reference frame which is arbitrarily designated from among a plurality of decoded frames, wherein in the predictive image generation step, a predictive image is generated using the coefficient corresponding to either one of the first reference index and the second reference index which is selected, as a coefficient used for the bit shift operation, from among the coefficient sets corresponding to the first reference index and the second reference index, and using an average of the coefficients corresponding to the first reference index and the second reference index respectively as a coefficient used for other operations.

(34) According to another picture decoding method of the present invention, the reference index includes a first reference index indicating a first reference picture which is arbitrarily designated from among a plurality of decoded pictures and a second reference index indicating a second reference frame which is arbitrarily designated from among a plurality of decoded frames, wherein in the predictive image generation step, only a value indicating a direct current component in a linear prediction equation is used as a coefficient used for the linear prediction, and one coefficient is corresponded to each of the first reference index and the second reference index.

(35) The picture decoding method of the present invention includes: a first step for decoding a coded image signal including a coded signal obtained by coding commands for allowing a plurality of reference indices to refer to the same picture, reference indices and a prediction error, said commands indicating correspondence between the reference indices and picture numbers, said reference indices designating reference pictures which are referred to when motion compensation is performed on a current block in a current picture to be coded and selected arbitrarily from among a plurality of coded pictures stored in a storage unit; a reference picture designation step of designating a reference picture according to decoded commands and a decoded reference index, said reference picture being used when motion compensation is performed on a current block in a current picture to be decoded; a predictive image generation step of generating a coefficient from display order information of each reference picture and generating a predictive image by performing linear prediction on a block by use of the generated coefficient, said block being obtained by motion estimation on the designated reference picture; and a decoded image generation step of generating a decoded image from the predictive image and a decoded prediction error.

(36) In the predictive image generation step, as a method for performing the linear prediction, a method using a coefficient generated according to the display order information and a method using a predetermined fixed equation are switched for use based on the display order information indicating temporal relationship between the reference picture designated by the first reference index and the reference picture designated by the second reference index.

(37) According to another picture decoding method of the present invention, in the predictive image generation step, in the case where a method using the coefficient generated according to display order information of each of the reference pictures is used as a method for performing the linear prediction, when a reference picture designated by the first reference index and a reference picture designated by the second reference index have the same display order information, the linear prediction is performed using a predetermined coefficient for each of the first and second reference indices instead of the coefficient.

(38) According to another picture decoding method of the present invention, in the predictive image generation step, when the coefficient is generated using the display order information, the coefficient is approximated to a power of 2 so that the linear prediction can be performed not using a multiplication nor a division but using a bit shift operation, an addition and a subtraction.

(39) According to another picture decoding method of the present invention, when the approximation is performed, a round-up approximation and a round-down approximation are switched for use based on the display order information indicating temporal relationship between the reference picture designated by the first reference index and the reference picture designated by the second reference index.

(40) A program of the present invention may be structured so as to cause a computer to execute the picture decoding method described in any of the above-mentioned (26) to (39).

As described above, the moving picture coding method and the moving picture decoding method of the present invention allow creation of a plurality of candidates for weighting coefficient sets used in linear prediction for generating a predictive image, and thus allow selection of the optimum set for each block. As a result, the reference indices can be decoded more efficiently in either case where a plurality of reference indices are assigned or one reference index is assigned. In addition, since the present invention allows significant improvement of coding efficiency, it is very effective for coding and decoding of moving pictures.

BRIEF DESCRIPTION OF DRAWINGS

FIG. 7 is a schematic diagram showing an example of weighting coefficient sets of linear prediction coefficients.

FIG. 13 is a schematic diagram showing an example of weighting coefficient sets of linear prediction coefficients.

FIG. 15 is a schematic diagram showing an example of weighting coefficient sets of linear prediction coefficients.

FIGS. 20A and 20B are still other functional block diagrams showing generation of a predictive image in the decoding apparatus.

FIGS. 31A and B are schematic diagrams for explaining reordering of pictures in the background art.

FIG. 37 is a schematic diagram showing an example of weighting coefficient sets of linear prediction coefficients in the background art.

DETAILED DESCRIPTION OF THE INVENTION

First Embodiment

Figure 1:
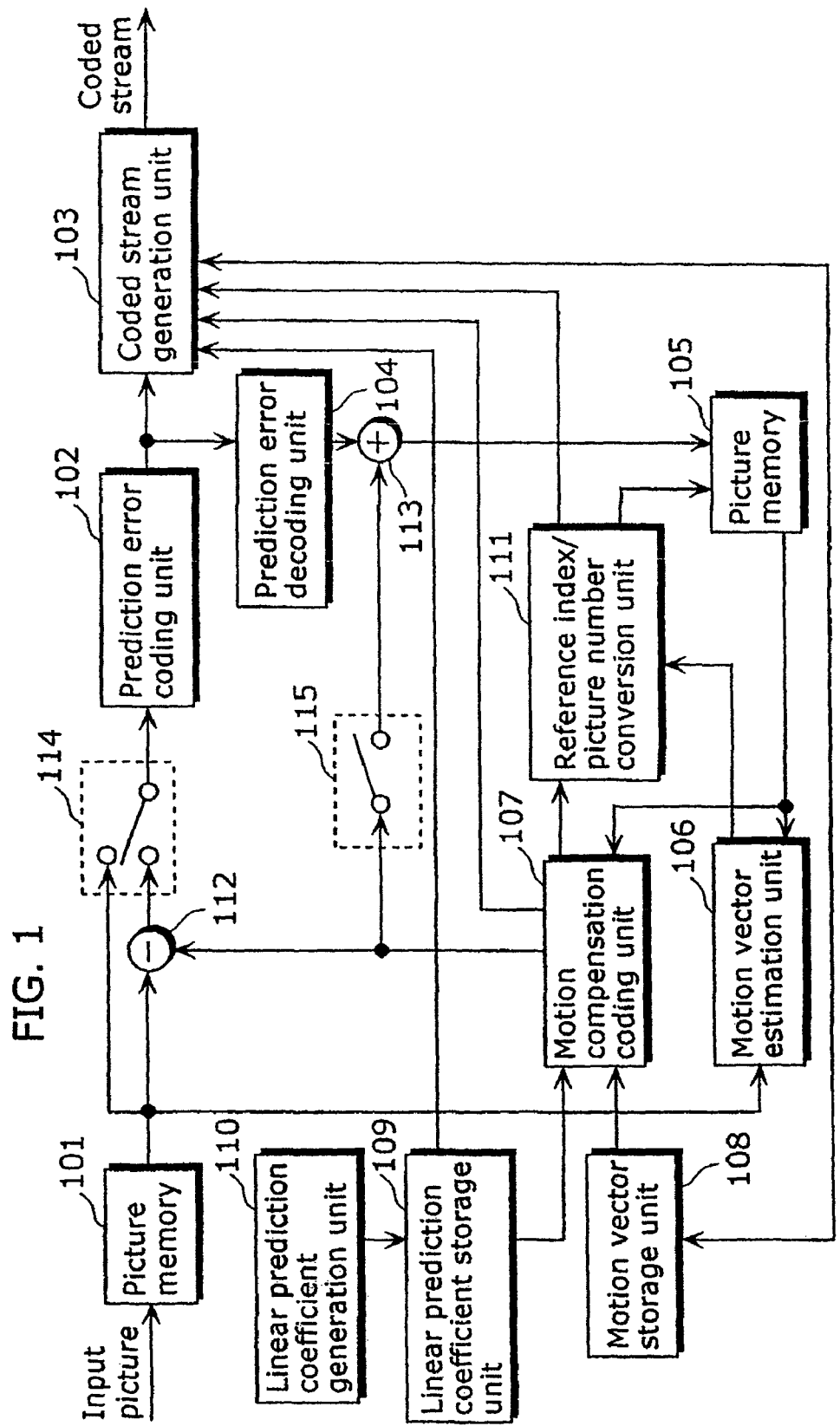
FIG. 1 is a block diagram showing a structure of a coding apparatus in a first embodiment of the present invention.

FIG. 1 is a block diagram showing a structure of a moving picture coding apparatus in the first embodiment of the present invention. The moving picture coding method executed in this moving picture coding apparatus, specifically, (1) an overview of coding, (2) a method for assigning reference indices and (3) a method for generating a predictive image, will be explained in this order using the block diagram as shown in FIG. 1.

(1) Overview of Coding

A moving picture to be coded is inputted to a picture memory 101 on a picture-by-picture basis in display order, and the inputted pictures are reordered into coding order. FIGS. 31A and 31B are diagrams showing an example of reordering of pictures. FIG. 31A shows an example of pictures in display order, and FIG. 31B shows an example of the pictures reordered into coding order. Here, since pictures B3 and B6 refer both temporally preceding and subsequent pictures, the reference pictures need to be coded before coding these current pictures and thus the pictures are reordered in FIG. 31B so that pictures P4 and P7 are coded earlier. Each of the pictures is divided into blocks, each of which is called a macroblock of horizontal 16 by vertical 16 pixels, for example, and the following proceeding is performed on a block-by-block basis.

An input image signal read out from the picture memory 101 is inputted to a difference calculation unit 112. The difference calculation unit 112 calculates a difference between the input image signal and the predictive image signal outputted from a motion compensation coding unit 107, and outputs the obtained difference image signal (prediction error signal) to a prediction error coding unit 102. The prediction error coding unit 102 performs image coding processing such as frequency transformation and quantization, and outputs a coded error signal. The coded error signal is inputted to a prediction error decoding unit 104, which performs image decoding processing such as inverse-quantization and inverse-frequency transformation, and outputs a decoded error signal. An addition unit 113 adds the decoded error signal and the predictive image signal to generate a reconstructed image signal, and stores, into a picture memory 105, the reconstructed image signals which could be referred in the following inter-picture prediction out of the obtained reconstructed image signals.

On the other hand, the input image signal read out per macroblock from the picture memory 101 is also inputted into a motion vector estimation unit 106. Here, the reconstructed image signals stored in the picture memory 105 are searched so as to estimate an image area which is the most alike to the input image signal and thus determine a motion vector pointing to the position of the image area. The motion vector estimation is performed per block that is a subdivision of a macroblock, and the obtained motion vectors are stored in a motion vector storage unit 108.

At this time, since a plurality of pictures can be used for reference in H.26L which is now under consideration for standardization, identification numbers for designating reference pictures are needed per block. The identification numbers are referred to as reference indices, and a reference index/picture number conversion unit 111 establishes correspondence between the reference indices and the picture numbers of the pictures stored in the picture memory 105 so as to allow designation of the reference pictures. The operation in the reference index/picture number conversion unit 111 will be explained in detail in the section (2).

The motion compensation coding unit 107 extracts the image area that is most suitable for the predictive image from among the reconstructed image signals stored in, the picture memory 105, using the motion vectors estimated by the above-mentioned processing and the reference indices. Pixel value conversion processing such as interpolation processing by linear prediction is performed on the pixel values of the obtained image area so as to obtain the final predictive image. The linear prediction coefficients used for that purpose are generated by the linear prediction coefficient generation unit 110, and stored in the linear prediction coefficient storage unit 109. This predictive image generation method will be explained in detail in the section (3).

The coded stream generation unit 103 performs variable length coding for the coded information such as the linear prediction coefficients, the reference indices, the motion vectors and the coded error signals outputted as a result of the above series of processing so as to obtain a coded stream to be outputted from this coding apparatus.

The flow of operations in the case of inter-picture prediction coding has been described above, and a switch 114 and a switch 115 switch between inter-picture prediction coding and intra-picture prediction coding. In the case of intra-picture prediction coding, a predictive image is not generated by motion compensation, but a difference image signal is generated by calculating a difference between a current area and a predictive image of the current area which is generated from a coded area in the same picture. The prediction error coding unit 102 converts the difference image signal into the coded error signal in the same manner as inter-picture prediction coding, and the coded stream generation unit 103 performs variable length coding for the signal to obtain a coded stream to be outputted.

(2) Method for Assigning Reference Indices

Next, the method by which the reference index/picture number conversion unit 111 as shown in FIG. 1 assigns reference indices will be explained using FIG. 3 and FIG. 4.

Figure 3:
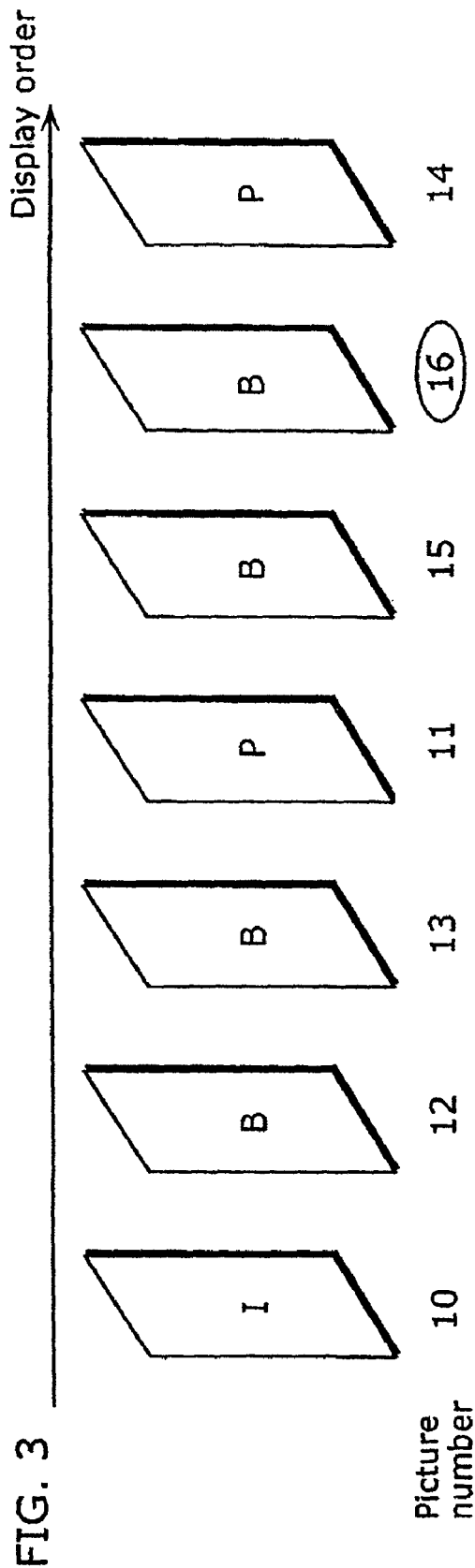
FIG. 3 is a schematic diagram for explaining a method for assigning reference indices to picture numbers.

FIG. 3 is a diagram for explaining the method for assigning two reference indices to picture numbers. Supposing that there is a sequence of pictures ordered in display order as shown in this diagram, picture numbers are assigned to the pictures in coding order. Commands for assigning reference indices to picture numbers are described in a header of each slice that is a subdivision of a picture, as the unit of coding, and thus the assignment thereof is updated every time one slice is coded. The command indicates, in series by the number of reference indices, the differential value between a picture number which is assigned a reference index currently and a picture number which is assigned a reference index immediately before the current assignment.

Taking the first reference indices in FIG. 3 as an example, since "−1" is given first as a command, a picture with its picture number 15 is assigned to the reference index number 0 by subtracting 1 to the current picture number 16. Next, "−4" is given as a command, a picture with its picture number 11 is assigned to the reference index number 1 by subtracting 4 from the picture number 15 which has been assigned just before it. Each of the following picture numbers is assigned in the same manner. The same applies to the second reference indices.

Figure 34:
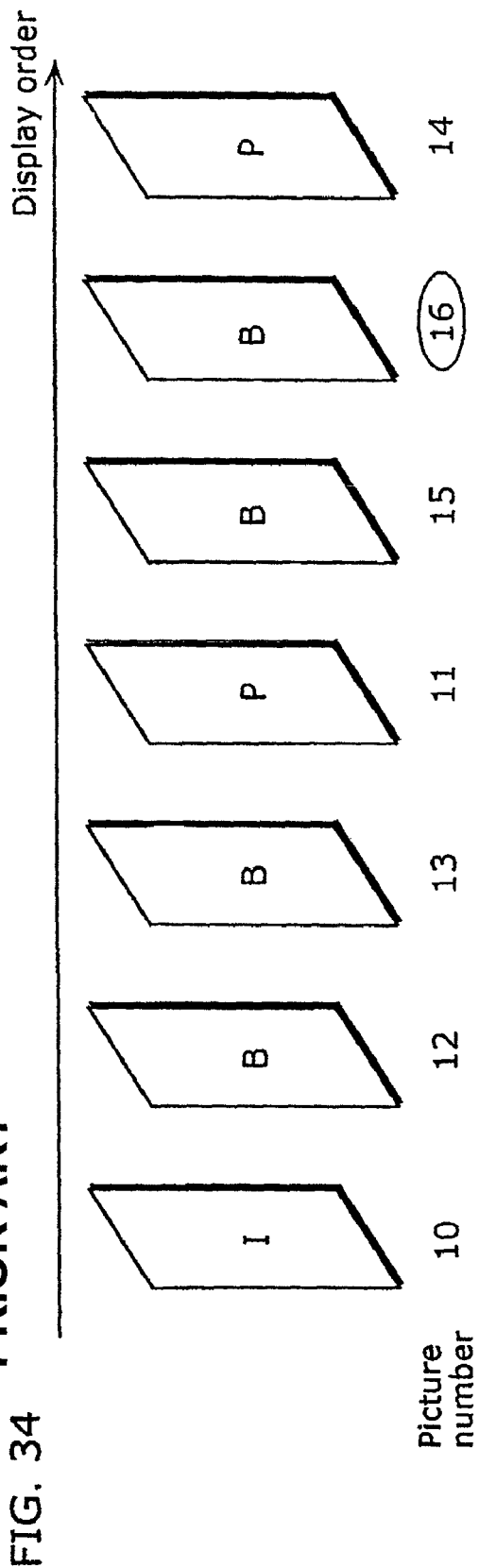
FIG. 34 is a schematic diagram for explaining a method for assigning reference indices to picture numbers in the background art.

According to the conventional reference index assignment method as shown in FIG. 34, all the reference indices are corresponded to respective picture numbers. On the other hand, in the example of FIG. 3, although exactly the same assignment method is used, a plurality of reference indices are corresponded to the same picture number by changing the values of the commands.

Figure 4:
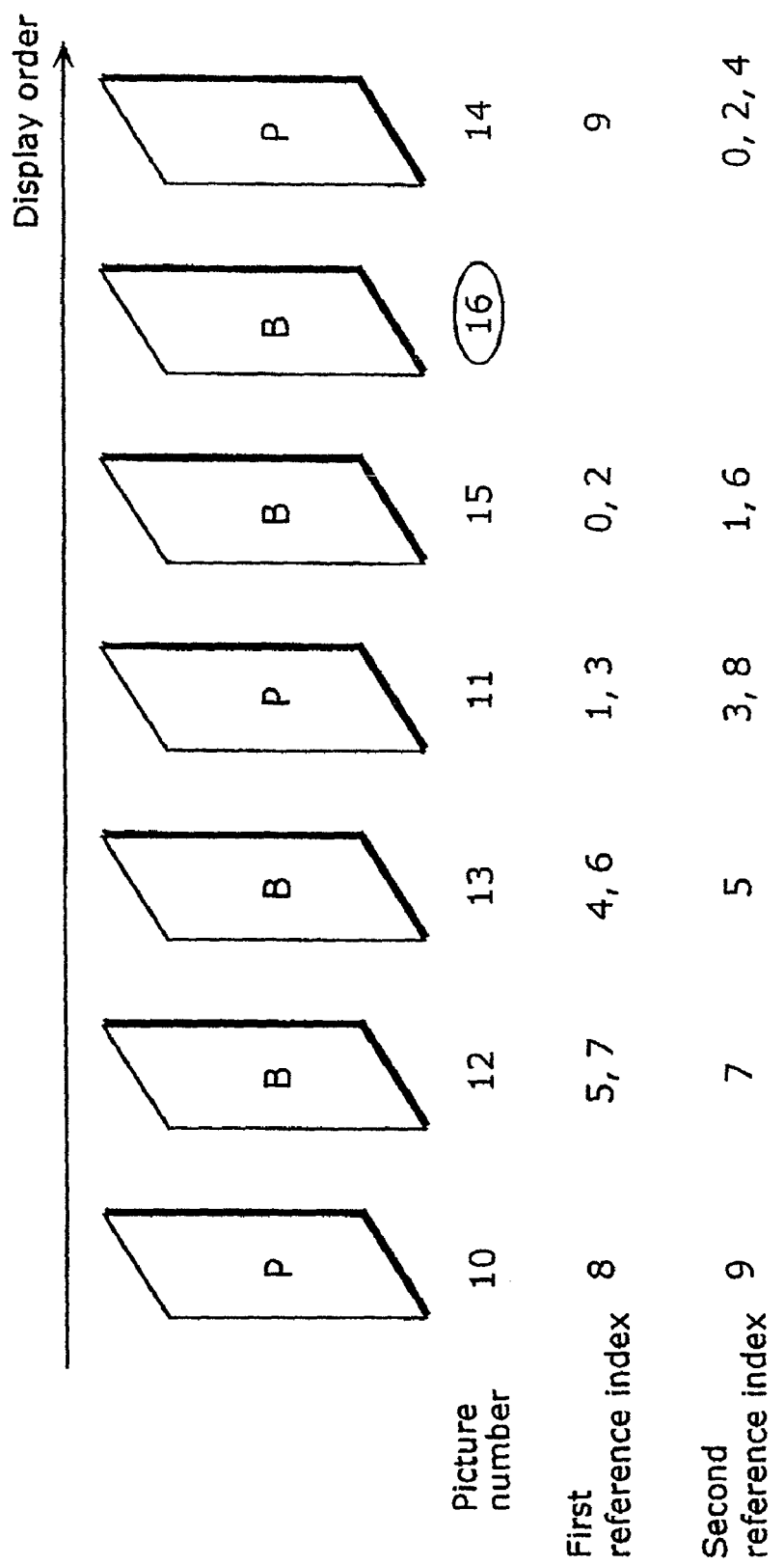
FIG. 4 is a schematic diagram showing an example of relationship between reference indices and picture numbers.

FIG. 4 shows the result of assignment of the reference indices. This diagram shows that the first reference index and the second reference index are assigned to each picture number separately, but a plurality of reference indices are assigned to one picture number in some cases. In the coding method of the present invention, it is assumed that a plurality of reference indices are assigned to at least one picture number, like this example.

If the reference indices are used only for determination of reference pictures, the conventional method of one-to-one assignment of reference indices to picture numbers is the most efficient coding method. However, in the case where a weighting coefficient set of linear prediction coefficients is selected for generation of a predictive image using reference indices, the same linear prediction coefficients have to be used for all the blocks having the same reference pictures, so there is an extremely high possibility that the optimum predictive image cannot be generated.

So, if it is possible to assign a plurality of reference indices to one picture number as in the case of the present invention, the optimum weighting coefficient set of linear prediction coefficients can be selected for each block from among a plurality of candidate sets even if all the blocks have the same reference picture, and thus the predictive image with its coding efficiency being higher can be generated.

Note that, the above description shows the case where the picture numbers are given assuming that all the reference pictures are stored in a reference memory. However, a current picture is given a picture number which is larger by one than the number of a picture which has been coded immediately before the current picture, only when the current picture which has been coded lastly is stored, so the continuity of the picture numbers are maintained in the reference memory even if some pictures are not stored, and thus the above-mentioned method can be used without change.

(3) Method for Generating Predictive Image

Next, the predictive image generation method in the motion compensation coding unit 107 as shown in FIG. 1 will be explained using FIG. 5. Although the predictive image generation method by linear prediction is exactly the same as the conventional method, flexibility in selection of linear prediction coefficients is increased because a plurality of reference index numbers can be corresponded to the same picture.

The picture B16 is a current B-picture to be coded, and the blocks BL01 and BL02 are current blocks to be coded which belong to the B-picture. The picture P11 and the picture B15 are used as the first reference picture and the second reference picture for BL01, and the predictive image is generated with reference to the blocks BL11 and BL21 belonging to the pictures P11 and B15 respectively. In the same manner, the picture P11 and the picture B15 are used as the first reference picture and the second reference picture for BL02, the predictive image is generated with reference to the blocks BL12 and BL22 belonging to those reference pictures respectively.

Although both BL01 and BL02 refer to the same pictures as their first reference picture and the second reference picture, it is possible to assign different values to the first reference index ref1 and the second reference index ref2 for BL01 and BL02 by using the reference index assignment method as explained in the above (2). Taking FIG. 4 as an example, 1 and 3 are assigned to the first reference index corresponding to the picture number 11, whereas 1 and 6 are assigned to the second reference index corresponding to the picture number 15.

As a result, four combinations of these reference indices, (ref1, ref2)=(1, 1), (1, 6), (3, 1) and (3, 6) are supposed, and thus it is possible to select the combination for deriving the optimum weighting coefficient set on a per-block basis from among these combinations. In FIG. 5, ref1=1 and ref2=1 are assigned for BL01, and ref1=3 and ref2=6 are assigned for BL02, for example.

Figure 5:
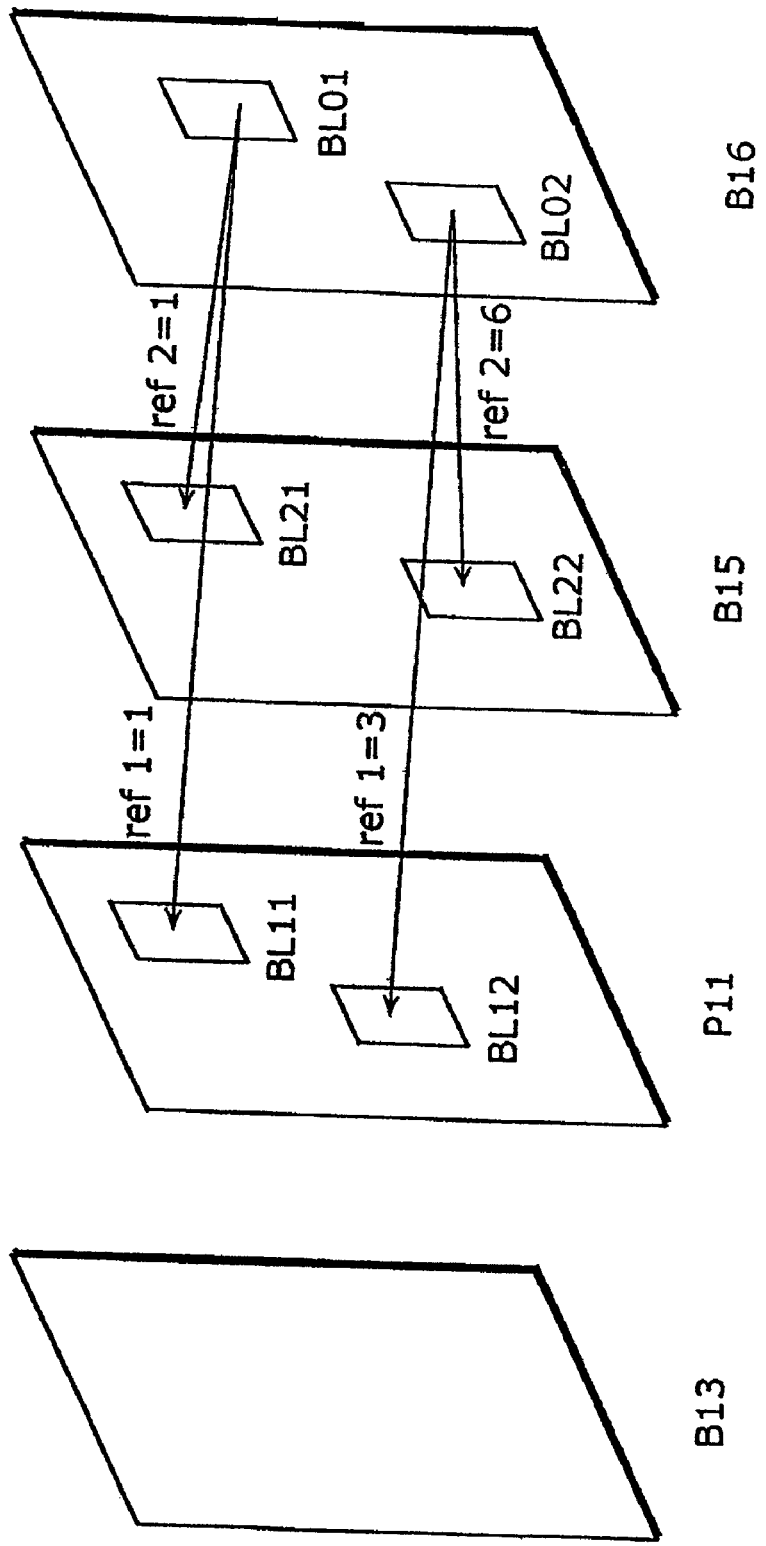
FIG. 5 is a schematic diagram for explaining operations for motion compensation.
Figure 35:
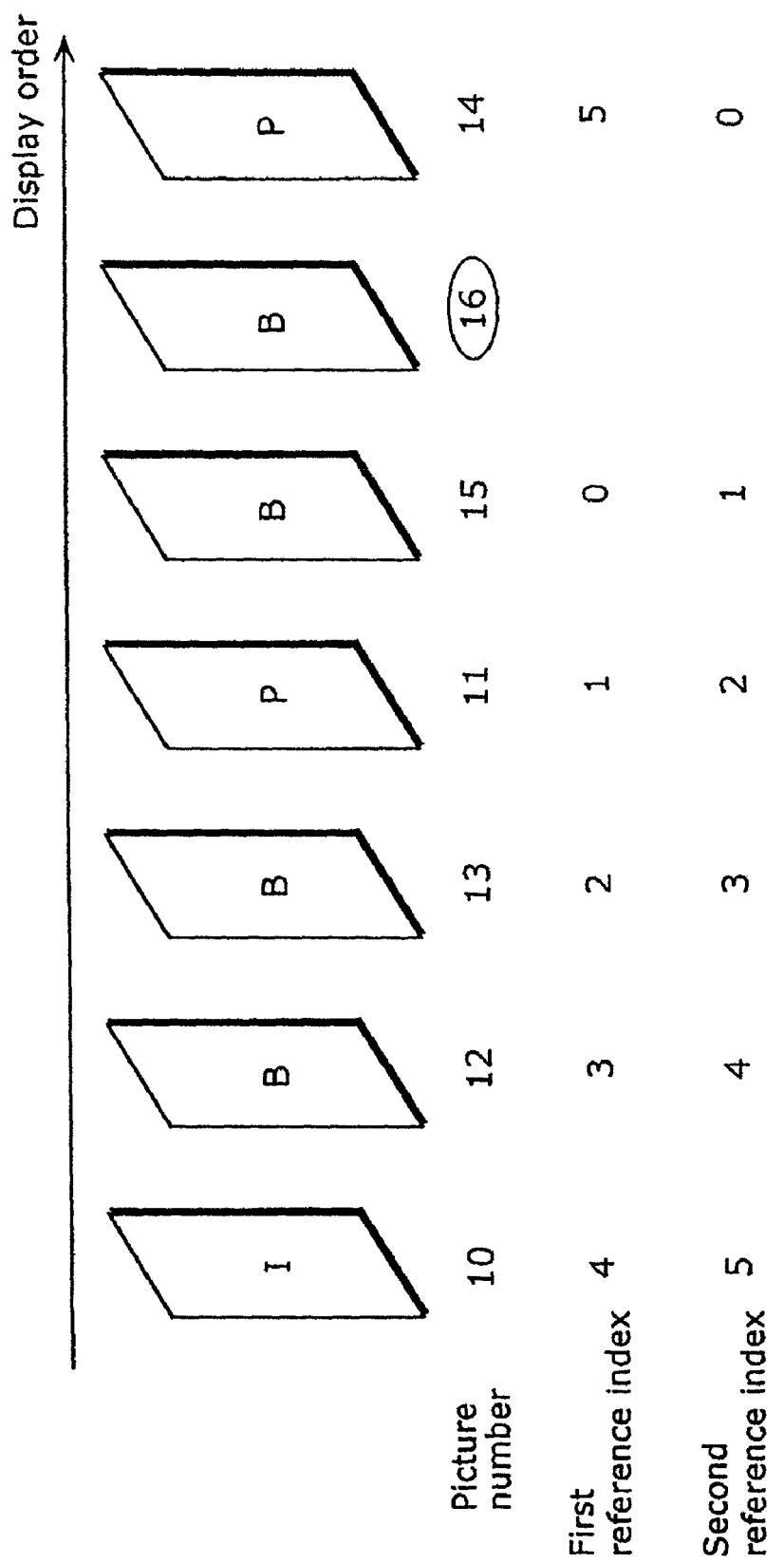
FIG. 35 is a schematic diagram showing an example of relationship between reference indices and picture numbers in the background art.
Figure 36:
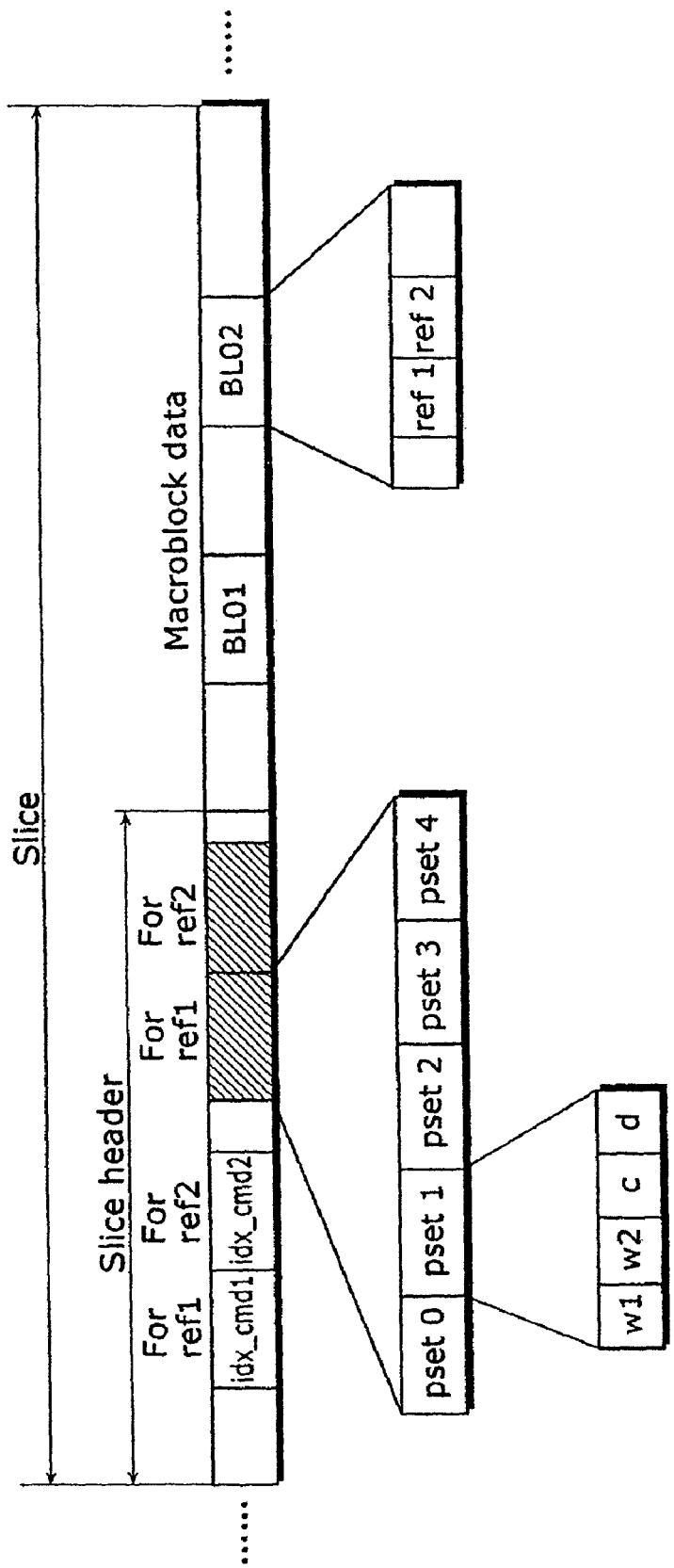
FIG. 36 is a schematic diagram for explaining a structure of a coded stream in the background art.

According to the conventional reference assignment method as shown in FIG. 35, only one combination of (ref1, ref2)=(1, 1) can be selected for both BL01 and BL02 in the case of FIG. 5, and thus only one weighting coefficient set of linear prediction coefficients can be selected, too. On the other hand, according to the present invention, four options are available, and it can be said that the possibility for selection of the optimum weighting coefficient set is increased.

Figure 6:
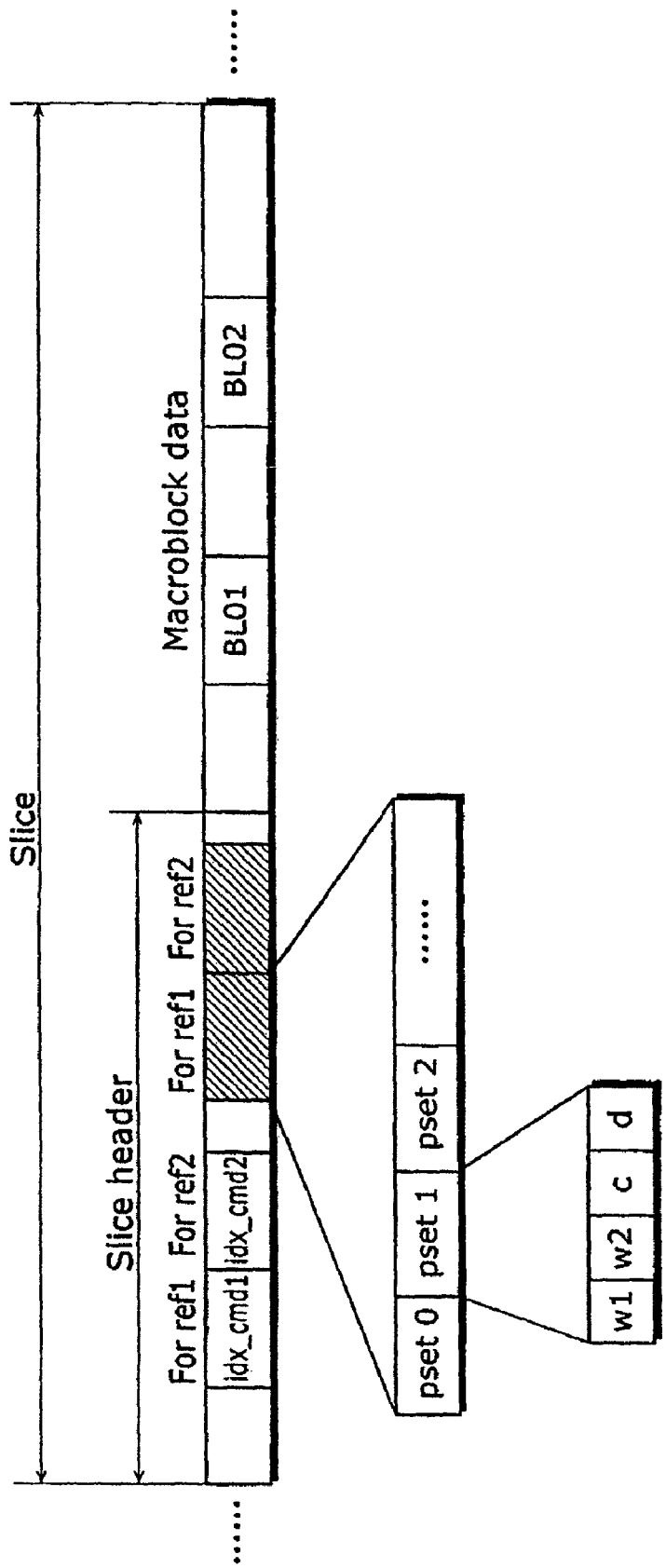
FIG. 6 is a schematic diagram for explaining a structure of a coded stream.

A coded stream of one picture is made up of a picture common information area and a plurality of slice data areas. FIG. 6 shows the structure of the slice data area in the coded stream. The slice data area is further made up of a slice header area and a plurality of block data areas. This diagram shows each of the block areas corresponding to BL01 and BL02 in FIG. 5 as an example of the block data area. "ref1" and "ref2" included in BL01 designate the first reference index and the second reference index respectively indicating two pictures referred to by the block BL01.

Also, in the slice header area, data (pset0, pset1, pset2, . . . ) for giving the weighting coefficient sets for performing the above-mentioned linear prediction is described for ref1 and ref2 respectively. In this area, "pset"s of the number equivalent to the number of the reference indices as explained in (2) can be set. To be more specific, in the case where ten reference indices from 0 to 9 are used as each of the first reference index and the second reference index, ten "pset"s from 0 to 9 can also be set for each of ref1 and ref2.

FIG. 7 shows an example of tables of the weighting coefficient sets included in the slice header area. Each data indicated by an identifier pset has four values w1, w2, c and d, and these tables are structured so that the data can be directly referred to by the values of ref1 and ref2. Also, command sequences idx_cmd1 and idx_cmd2 for assigning the reference indices to the picture numbers are described in the slice header area.

Using ref1 and ref2 described in BL01 in FIG. 6, one set of weighting coefficients is selected from each of the tables for ref1 and ref2 in FIG. 7. By performing linear prediction on the pixel values of the reference images using these two sets of weighting coefficients, a predictive image is generated.

As described above, using the coding method in which a plurality of reference indices are assigned to one picture number, a plurality of candidates for weighting coefficient sets of linear prediction coefficients can be created, and thus the best one can be selected from among them. For example, in the case where two first reference indices and two second reference indices are assigned, four sets of weighting coefficients are available as candidates for selection, and in the case where three first reference indices and three second reference indices are assigned, nine sets of weighting coefficients are available as candidates for selection.

This linear prediction method has a dramatic effect particularly in the case where the brightness of the entire picture or a part thereof changes significantly like fade and flash. In many cases, the degree of change in brightness differs from part to part of a picture. Therefore, the structure of the present invention in which the best one can be selected for each block from among a plurality of weighting coefficient sets is very effective in image coding.

Here, the flow of processing from determination of weighting coefficient sets up to generation of a predictive image will be explained in detail.

Figure 8:
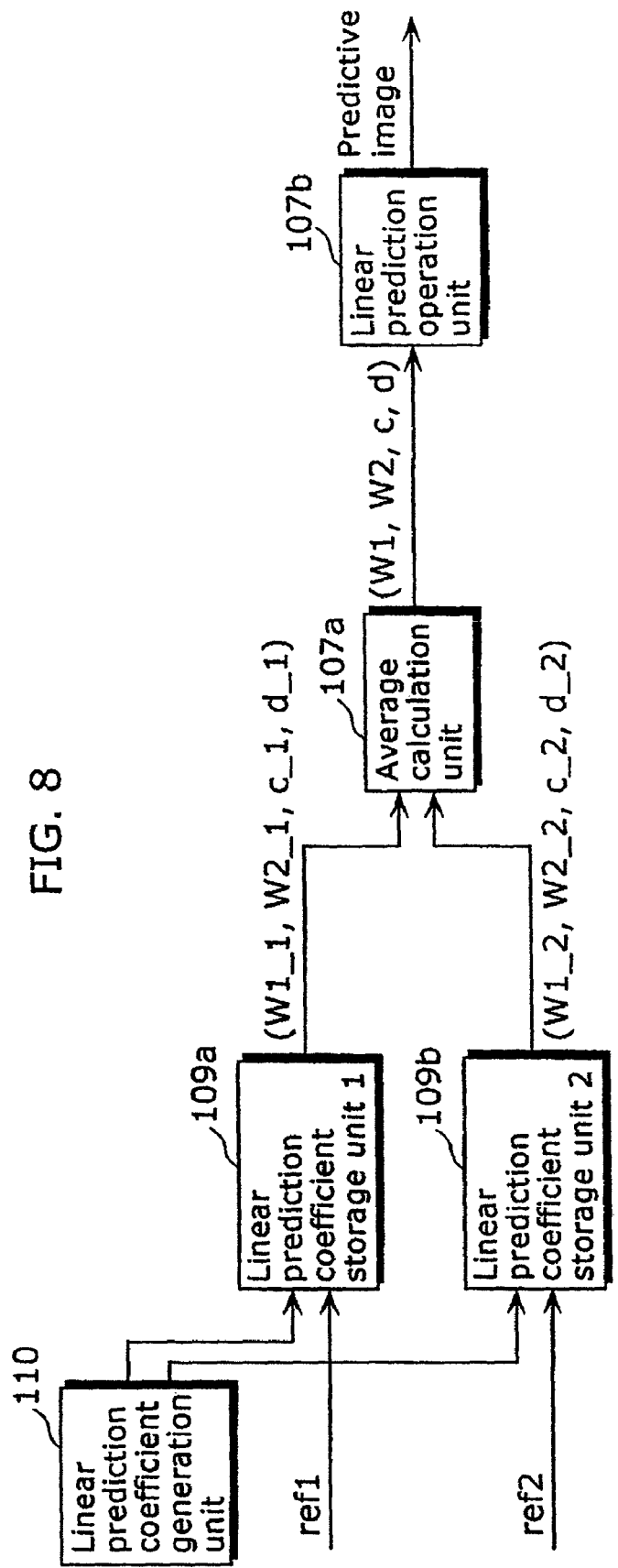
FIG. 8 is a functional block diagram showing generation of a predictive image in a coding apparatus.

FIG. 8 is a functional block diagram showing the functional structure for generating a predictive image in the linear prediction coefficient generation unit 110, the linear prediction coefficient storage unit 109 and the motion compensation coding unit 107.

A predictive image is generated via the linear prediction coefficient generation unit 110, the linear prediction coefficient storage unit 109a, the linear prediction coefficient storage unit 109a, the average calculation unit 107a and the linear prediction operation unit 107b.

The weighting coefficient sets generated by the linear prediction coefficient generation unit 110 are stored in the linear prediction coefficient storage unit 109a and the linear coefficient storage unit 109b. The average calculation unit 107a obtains, from the linear prediction coefficient storage unit 109a, one set of weighting coefficients (w1_1, w2_1, c_1, d_1) selected by the first reference index ref1 determined by the motion estimation processing, and further obtains, from the linear coefficient storage unit 109b, one set of weighting coefficients (w1_2, w2_2, c_2, d_2) selected by the second reference index ref2.

Then, the average calculation unit 107a calculates the average, for respective parameters, of the weighting coefficient sets obtained from the linear prediction coefficient storage units 109a and 109b so as to consider it as the weighting coefficient set (w1, w2, c, d) to be used for the actual linear prediction, and outputs it to the linear prediction operation unit 107b. The linear prediction operation unit 107b calculates the predictive image using the equation 1 based on the obtained weighting coefficient set (w1, w2, c, d) for output.

Figure 9:
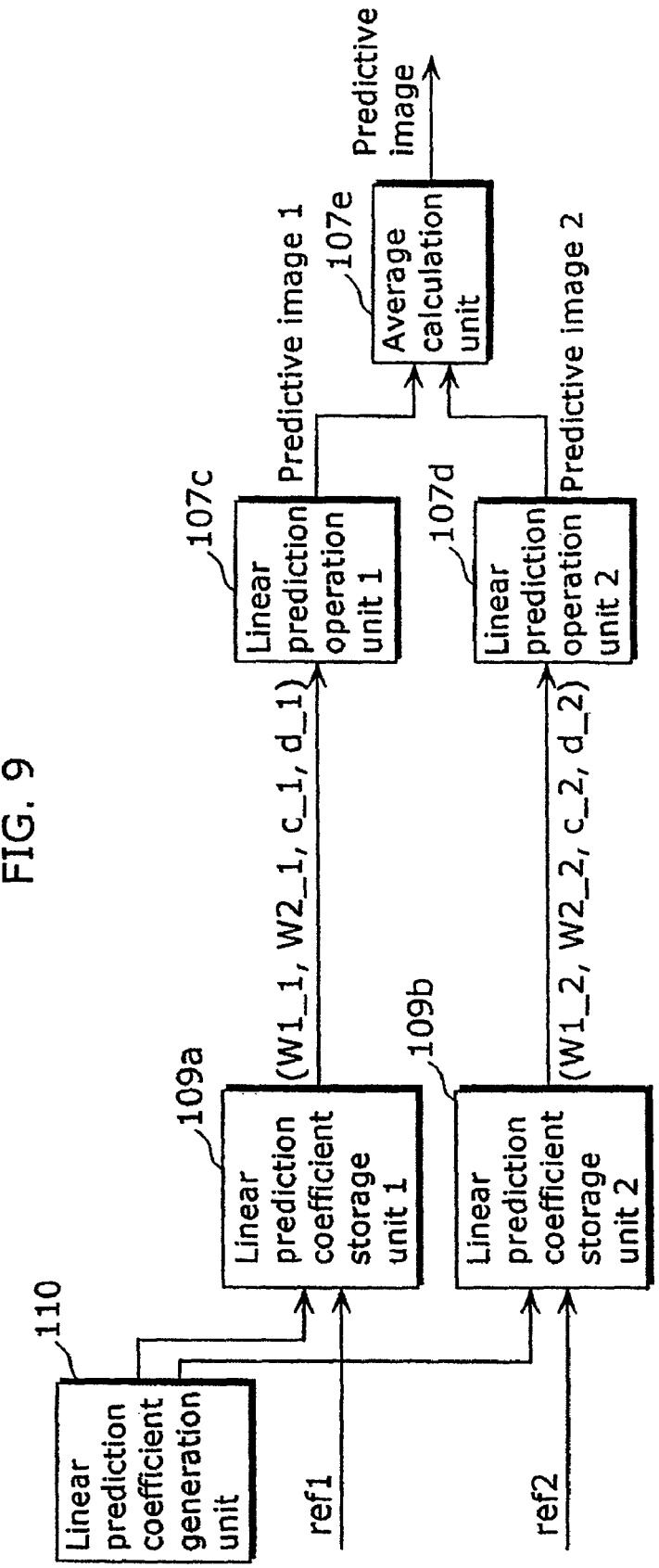
FIG. 9 is another functional block diagram showing generation of a predictive image in the coding apparatus.

FIG. 9 is a functional block diagram showing another functional structure for generating a predictive image. A predictive image is generated via the linear prediction coefficient generation unit 110, the linear prediction coefficient storage unit 109a, the linear prediction coefficient storage unit 109b, the linear prediction operation unit 107c, the linear prediction operation unit 107d and the average calculation unit 107e.

The weighting coefficient sets generated by the linear prediction coefficient generation unit 110 are stored in the linear prediction coefficient storage unit 109a and the linear prediction coefficient storage unit 109b. The linear prediction operation unit 107c obtains, from the linear prediction coefficient storage unit 109a, one set of weighting coefficients (w1_1, w2_1, c_1, d_1) selected by the first reference index ref1 determined by the motion estimation processing, and calculates the predictive image using the equation 1 based on the weighting coefficient set for output to the average calculation unit 107e.

In the same manner, the linear prediction operation unit 107d obtains, from the linear prediction coefficient storage unit 109b, one set of weighting coefficient set (w1_2, w2_2, c_2, d_2) selected by the second reference index determined by the motion estimation processing, and calculates the predictive image using the equation 1 based on the weighting coefficient set for output to the average calculation unit 107e.

The average calculation unit 107e calculates the average of respective pixel values of predictive images which are outputted from the linear prediction operation unit 107c and the linear prediction operation unit 107d respectively so as to generate the final predictive image for output.

Figures 10A, 10B:
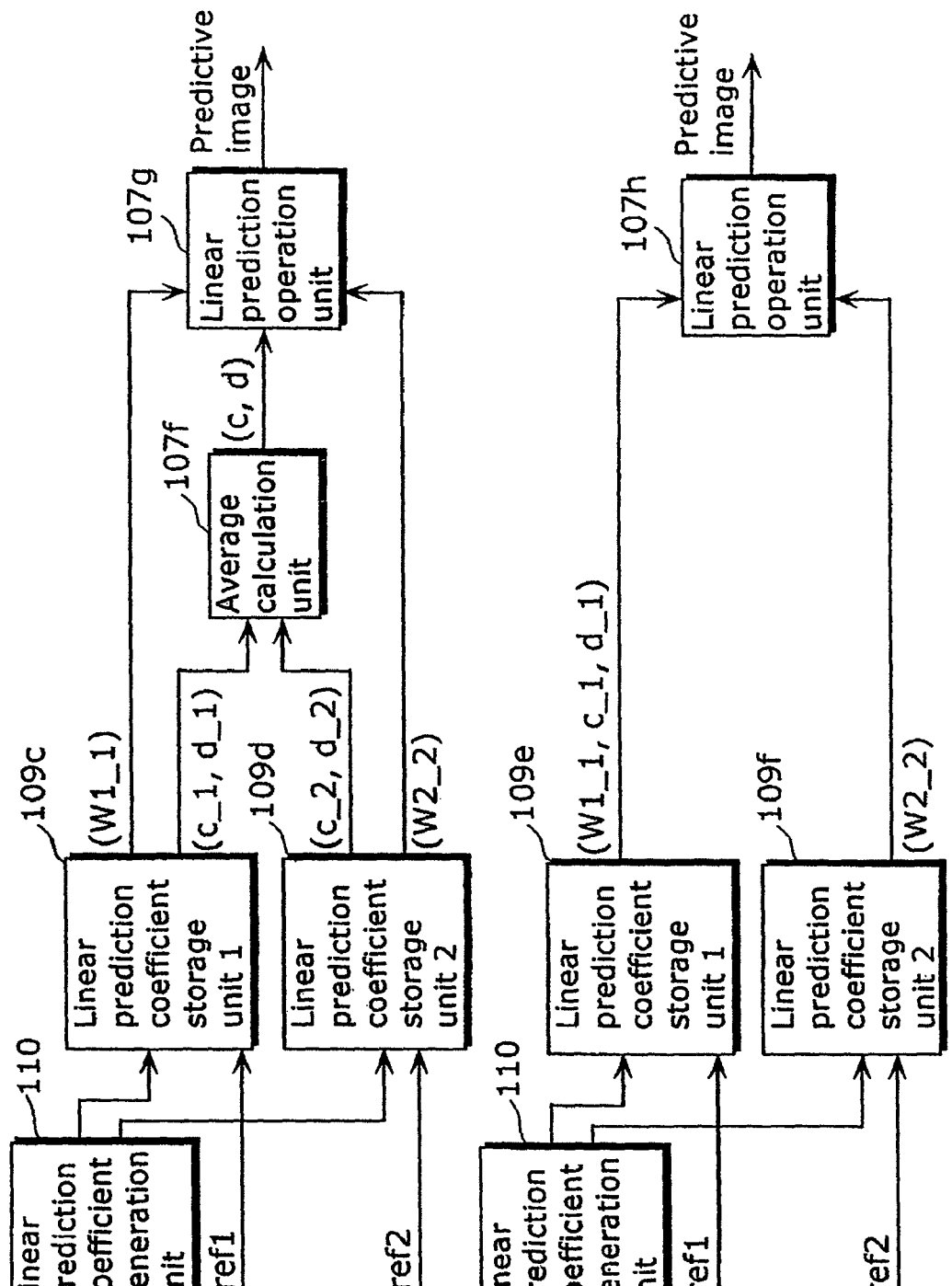
FIGS. 10A and 10B are still other functional block diagrams showing generation of a predictive image in the coding apparatus.

FIG. 10A is a functional block diagram showing another functional structure for generating a predictive image. A predictive image is generated via the linear prediction coefficient generation unit 110, the linear prediction coefficient storage unit 109c, the linear prediction storage unit 109d, the average calculation unit 107f, and the linear prediction operation unit 107g.

The weighting coefficient sets generated by the linear prediction coefficient generation unit 110 are stored in the linear prediction coefficient storage unit 109c and the linear prediction coefficient storage unit 109d. The average calculation unit 107f obtains, from the linear prediction coefficient storage unit 109c, the parameters of c_1 and d_1 in one set of weighting coefficients (w1_1, w2_1, c_1, d_1) selected by the first reference index ref1 determined by the motion estimation processing, and similarly, obtains, from the linear prediction coefficient storage unit 109d, the parameters of c_2 and d_2 in one set of weighting coefficients (w1_2, w2_2, c_2, d_2) selected by the second reference index ref2. The average calculation unit 107f calculates the average of c_1 and c_2 and the average of d_1 and d_2 obtained from the linear prediction coefficient storage unit 109c and the linear prediction coefficient storage unit 109d so as to obtain c and d for output to the linear prediction operation unit 107g.

Also, the linear prediction operation unit 107g obtains the parameter of w1_1 in the above-mentioned weighting coefficient set (w1_1, w2_1, c_1, d_1) from the linear prediction coefficient storage unit 109c, obtains the parameter of w2_2 in the above-mentioned weighting coefficient set (w1_2, w2_2, c_2, d_2) from the linear prediction coefficient storage unit 109d, and obtains c and d which are the averages calculated by the average calculation unit 107f, and then calculates the predictive image using the equation 1 for output.

To be more specific, when determining the weighting coefficient set (w1, w2, c, d) which is actually used for linear prediction from among the weighting coefficient set (w1_1, w2_1, c_1, d_1) obtained from the linear prediction coefficient storage unit 109c and the weighting coefficient set (w1_2, w2_2, c_2, d_2) obtained from the linear prediction coefficient storage unit 109d, the linear prediction operation unit 107g uses the following rule.

w1=w1_1
w2=w2_2
c=(average of c_1 and c_2)
d=(average of d_1 and d_2)

As described above, in generation of the predictive image as explained in FIG. 10A, the linear prediction coefficient storage unit 109c does not need w2_1 in the weighting coefficient set. Therefore, w2 is not required for the weighting coefficient set for ref1, and thus data amount of a coded stream can be reduced.

Also, the linear prediction coefficient storage unit 109d does not need w1_2 in the weighting coefficient set. Therefore, w1 is not required for the weighting coefficient set for ref2, and thus data amount of a coded stream can be reduced.

FIG. 10B is a functional block diagram showing another functional structure for generating a predictive image. A predictive image is generated via the linear prediction coefficient generation unit 110, the linear prediction coefficient storage unit 109e, the linear prediction coefficient storage unit 109f and the linear prediction operation unit 107h.

The weighting coefficient sets generated by the linear prediction coefficient generation unit 110 are stored in the linear prediction coefficient storage unit 109e and the linear prediction coefficient storage unit 109f. The linear prediction operation unit 107h obtains, from the linear prediction coefficient storage unit 109e, the parameters of w1_1, c_1 and d_1 which are a part of one set of weighting coefficients (w1_1, w2_1, c_1, d_1) selected by the first reference index ref1 determined by the motion estimation processing, and similarly, obtains, from the linear prediction coefficient storage unit 109f, the parameter of w2_2 which is a part of one set of weighting coefficients (w1_2, w2_2, c_2, d_2) selected based on the second reference index ref2. The linear prediction operation unit 107h calculates a predictive image using the equation 1 based on w1_1, c_1, d_1, w2_2 obtained from the linear prediction coefficient storage unit 109e and the linear prediction coefficient storage unit 109f for output.

To be more specific, when determining the weighting coefficient set (w1, w2, c, d) which is actually used for linear prediction from among the weighting coefficient set (w1_1, w2_1, c_1, d_1) obtained from the linear prediction coefficient storage unit 109e and the weighting coefficient set (w1_2, w2_2, c_2, d_2) obtained from the linear prediction coefficient storage unit 109f, the linear prediction operation unit 107h uses the following rule.

w1=w1_1
w2=w2_2
c=c_1
d=d_1

In generation of the predictive image as explained in FIG. 10B, the linear prediction coefficient storage unit 109e does not need w2_1 in the weighting coefficient set. Therefore, w2 is not required for the weighting coefficient set for ref1, and thus data amount of a coded stream can be reduced.

Also, the linear prediction coefficient storage unit 109f does not need w1_2, c_2 and d_2 in the weighting coefficient set. Therefore, w1, c and d are not required for the weighting coefficient set for ref2, and thus data amount of a coded stream can be reduced.

Figure 11:
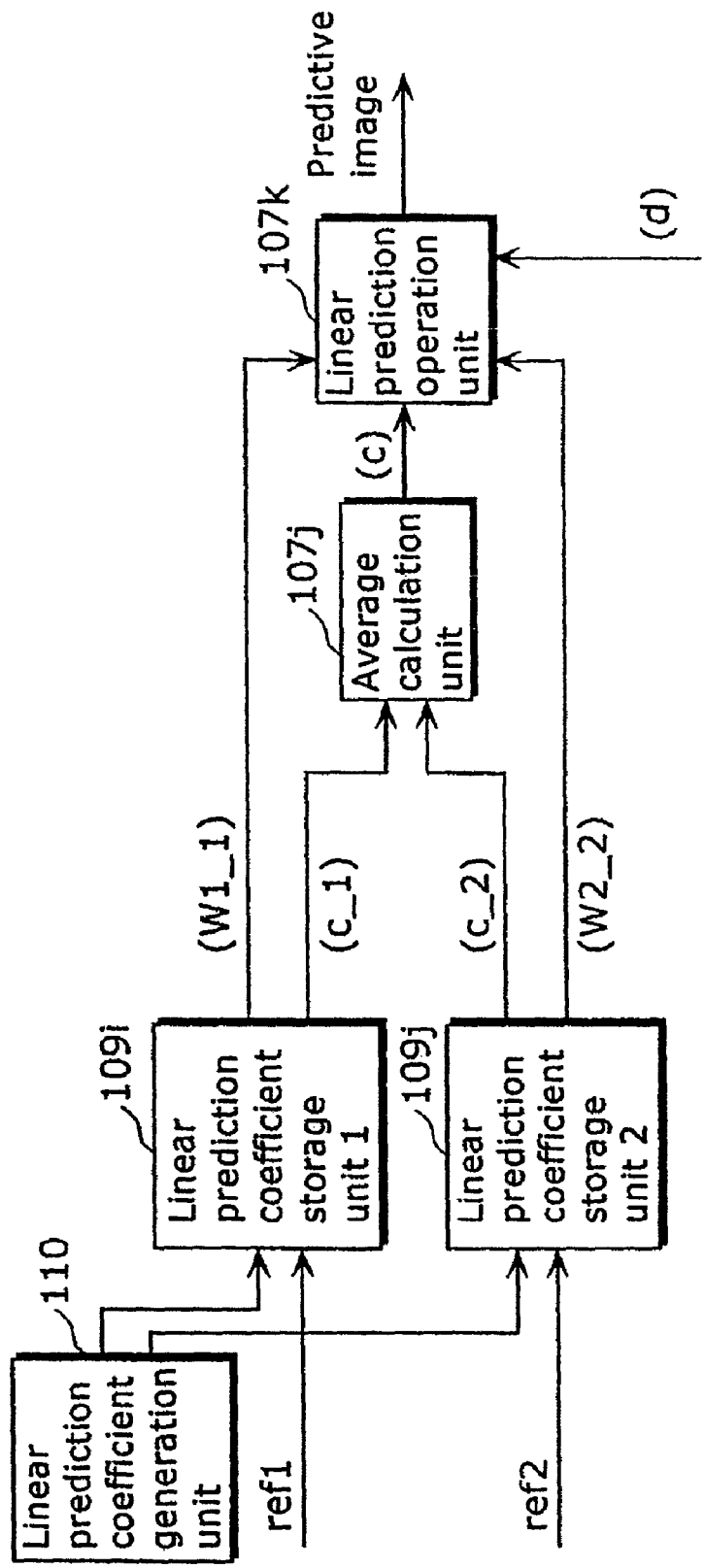
FIG. 11 is still another functional block diagram showing generation of a predictive image in the coding apparatus.

Furthermore, it is also possible to use one or more parameters out of w1, w2, c and d as fixed values. FIG. 11 is a functional block diagram in the case where only "d" as a fixed value is used for the functional structure in FIG. 10A. A predictive image is generated via the linear prediction coefficient generation unit 110, the linear prediction coefficient storage unit 109i, the linear prediction coefficient storage unit 109j, the average calculation unit 107j and the linear prediction operation unit 107k.

The coefficients selected by the first reference index ref1 from the linear prediction coefficient storage unit 109i are only (w1_1, c_1), and the coefficients selected by the second reference index ref 2 from the linear prediction coefficient storage unit 109j are only (w2_2, c_2). The average calculation unit 107j calculates the average of c_1 and c_2 obtained from the linear prediction coefficient storage unit 109i and the linear prediction coefficient storage unit 109j so as to obtain "c" and outputs it to the linear prediction operation unit 107k.

The linear prediction operation unit 107k obtains the parameter of w1_1 from the linear prediction coefficient storage unit 109i, the parameter of w2_2 from the linear prediction coefficient storage unit 109j, and the parameter of c from the average calculation unit 107j, and then calculates the predictive image based on the equation 1 using a predetermined fixed value as a parameter of d, and outputs the predictive image. To be more specific, the following values are entered as the coefficients (w1, w2, c, d) of the equation 1.

w1=w1_1
w2=w2_2
c=(average of c_1 and c_2)
d=(fixed value)

Assignment of the above values into the equation 1 provides the following equation 1a.

$$P(i)=(w1\_1 \times Q1(i)+w2\_2 \times Q2(i))/\text{pow}(2,d)+(c\_1+c\_2)/2 \quad \text{Equation 1a}$$

(where pow(2, d) indicates the "d"th power of 2)

Furthermore, by modifying the equation 1a, the following equation 1b is obtained. It is possible for the linear prediction operation unit 107k to handle the linear prediction operation method in exactly the same manner in either format of the equation 1b or the equation 1.

$$P(i)=(w1\_1 \times Q1(i)/\text{pow}(2,d-1)+c\_1+w2\_2 \times Q2(i)/\text{pow}(2,d-1)+c\_2)/2 \quad \text{Equation 1b}$$

(where pow(2, d−1) indicates the "d−1"th power of 2)

Although pow(2, d−1) is used in the equation 1b, the system may be structured using pow(2, d') by entering d' (assuming d'=d−1) into the linear prediction operation unit 107k because d is a fixed value.

In addition, in generation of the predictive image as explained in FIG. 11, the linear prediction coefficient storage unit 109i needs only w1_1 and among the weighting coefficient sets for it, and the linear prediction coefficient storage unit 109j needs only w2_2 and c_2 among the weighting coefficient sets for it. Therefore, there is no need to code the parameters other than the above required parameters, and thus the data amount of the coded stream can be reduced.

Note that it is possible to use one predetermined fixed value as a value of d in any cases, but the fixed value can be switched on a per-slice basis by describing the fixed value in the slice header. Similarly, the fixed value can be switched on a per-picture basis or a per-sequence basis by describing it in the picture common information area or the sequence common information area.

Figure 12:
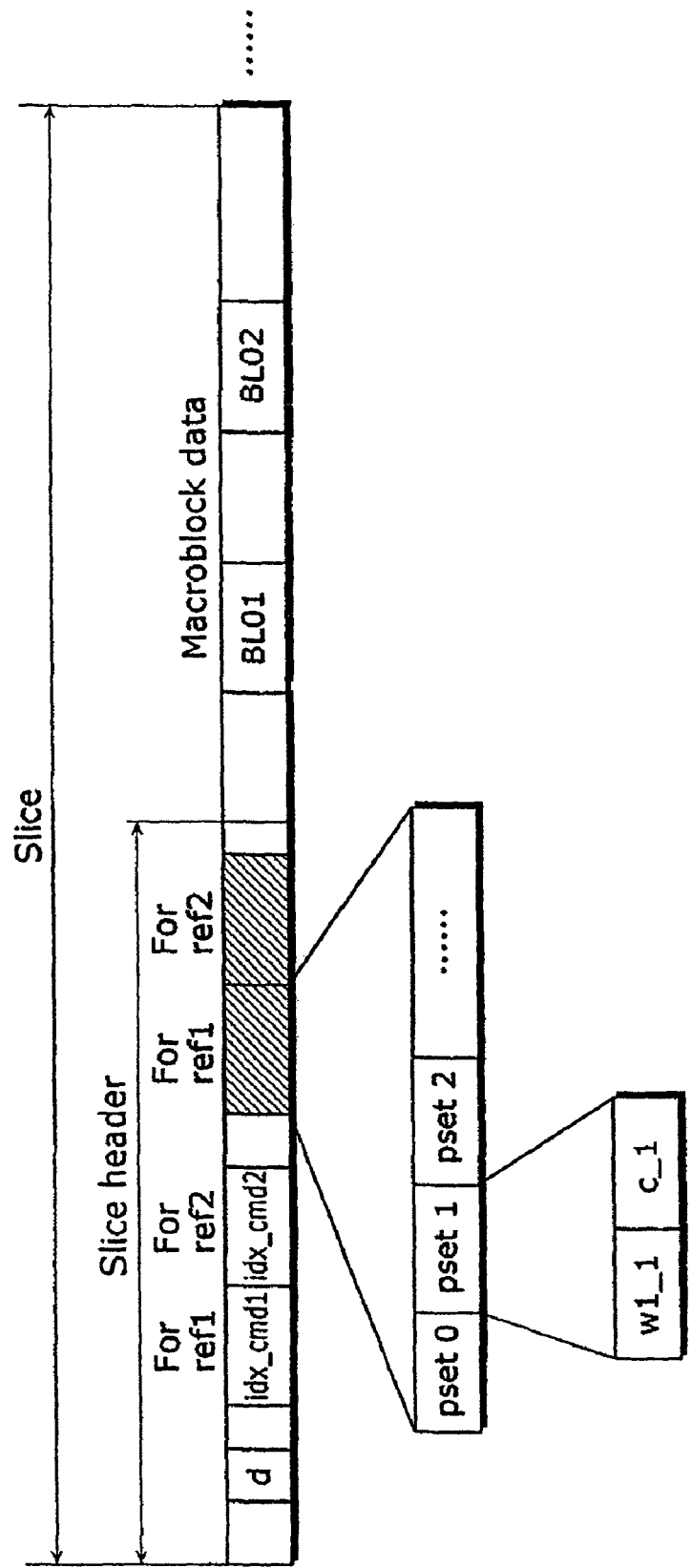
FIG. 12 is a schematic diagram for explaining a structure of a coded stream.

FIG. 12 shows an example of a structure of a slice data area in the case where the above-mentioned linear prediction method is used. This is different from FIG. 6 in that only "d" is described in the slice header area and only w1_1 and c_1 are described as pset for ref1. FIG. 13 shows tables showing an example of the above weighting coefficient sets included in the slice header area. Each data indicated by the identifier "pset" has two values of w1_1 and c_1 or w2_2 and c_2, and structured so as to be directly referred to by the values of ref1 and ref2.

Note that the linear prediction coefficient generation unit 110 generates the weighting coefficient sets by examining the characteristics of a picture, and the motion compensation coding unit 107 creates a predictive image using any of the methods as explained in FIG. 8, FIG. 9, FIG. 10 and FIG. 11 and determines the combination of two reference indices ref1 and ref2 so as to minimize the prediction error. In the case where any of the methods of FIG. 10A, FIG. 10B and FIG. 11 which do not require all the parameters is used, it is possible to omit the processing of creating unnecessary parameters in the stage where the linear prediction coefficient generation unit 110 in the coding apparatus creates the weighting coefficient sets.

In the methods of FIG. 10A, FIG. 10B and FIG. 11, it is possible for the linear prediction coefficient generation unit 110 to search for and create the optimum weighting coefficient sets for ref1 and ref2, w1_1 and w2_2, for example, separately, when creating such weighting coefficient sets. In other words, using these methods, it is possible to reduce the amount of processing executed by the coding apparatus for creating weighting coefficient sets.

Note that the above-mentioned coding methods are concerned with a B-picture having two reference pictures, but it is also possible to execute the same processing in the single picture reference coding mode for a P-picture or a B-picture having only one reference picture. In this case, using only one of the first reference index and the second reference index, pset and idx_cmd for either ref1 or ref2 are only described in the slice header area included in the coded stream of FIG. 6, according to the reference index described in the block data area.

In addition, as a linear prediction method, the following equation 3 is used instead of the equation 1 as explained in the conventional method. In this case, Q1(i) is a pixel value of a block which is referred to, P(i) is a pixel value of a predictive image of a current block to be coded, and w1, w2, c and d are linear prediction coefficients given by the selected weighting coefficient set.

$$P(i)=(w1 \times Q1(i)+w2 \times Q1(i))/\text{pow}(2,d)+c \quad \text{Equation 3}$$

(where pow(2, d) indicates the "d"th power of 2)

Note that it is possible to use the equation 4 as a linear prediction equation, instead of the equation 3. In this case, Q1(i) is a pixel value of a block which is referred to, P(i) is a pixel value of a predictive image of a current block to be coded, and w1, c and d are linear prediction coefficients given by the selected weighting coefficient set.

$$P(i)=(w1 \times Q1(i))/\text{pow}(2,d)+c \quad \text{Equation 4}$$

(where pow(2, d) indicates the "d"th power of 2)

Use of the equation 1 and the equation 3 requires four parameters w1, w2, c and d, whereas use of the equation 4 requires only three parameters w1, c and d for linear prediction. In other words, in the case where either one of the first reference index and the second reference index is used for a picture as a whole, like a P-picture, it is possible to reduce the number of data items of each weighting coefficient set to be described in the slice header area to three.

When the equation 3 is used, it is possible to realize linear prediction which is available for both B-pictures and P-pictures adaptively without change in structure. When the equation 4 is used, the data amount to be described in the header area of a P-picture can be reduced, and thus it is possible to achieve reduction of the processing amount because of simplified calculation. However, since the reference index assignment method suggested by the present invention can directly be applied to any of the above methods, a predictive image with its high coding efficiency can be created, which is extremely effective in image coding.

By the way, the pictures which are referred to in motion compensation are determined by designating the reference indices assigned to respective pictures. In that case, the maximum number of pictures which are available for reference has been described in the picture common information area in the coded stream.

Figure 38:
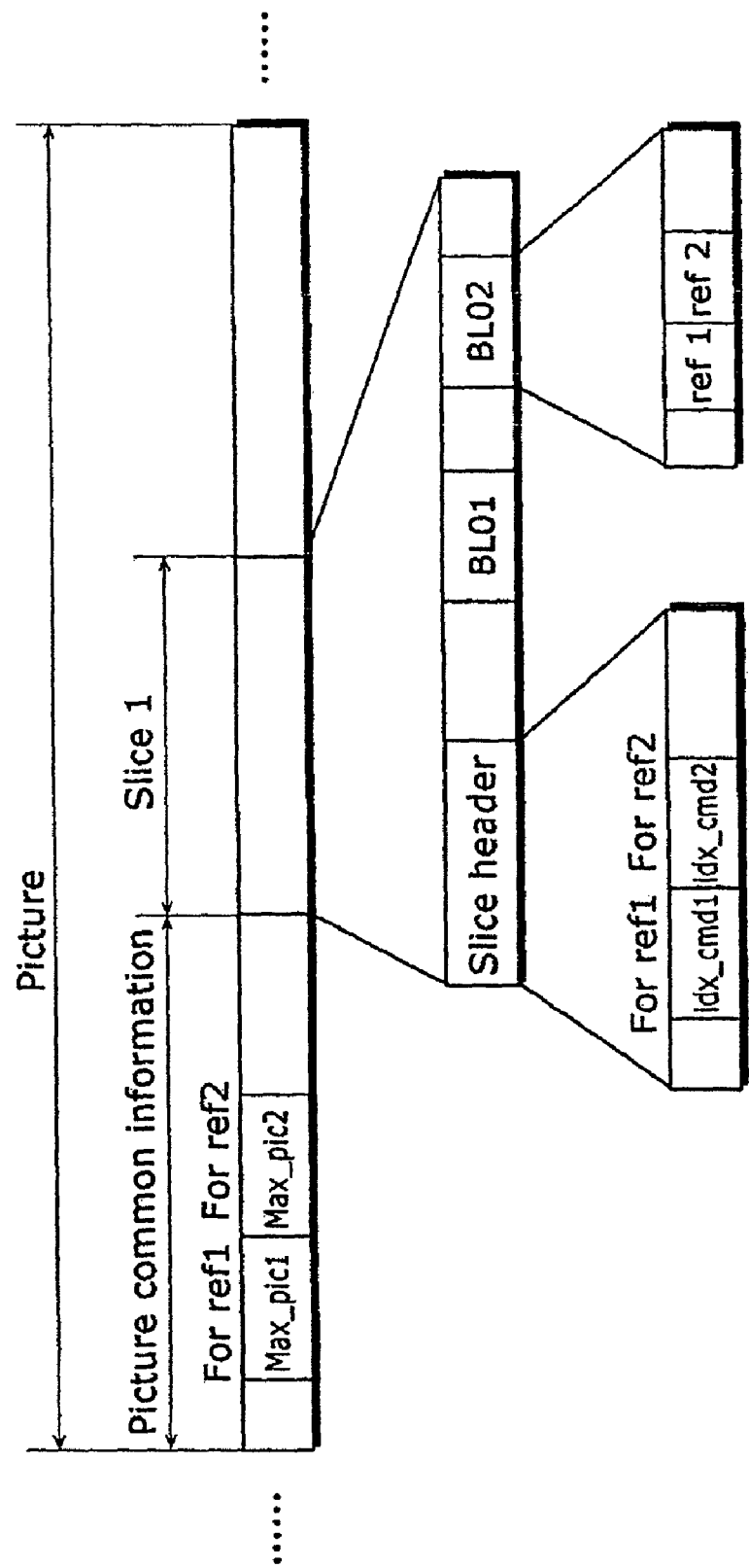
FIG. 38 is a schematic diagram for explaining a structure of a coded stream in the background art.

FIG. 38 is a schematic diagram of a coded stream in which the maximum number of pictures which are available for reference is described. As this diagram shows, the maximum number of pictures for ref1 Max_pic1 and the maximum number of pictures for ref2 Max_pic2 are described in the picture common information in the coded stream.

Information required for coding is not the maximum number of real pictures themselves, but the maximum reference index value available for designating pictures.

Since one reference index is assigned to one picture in the conventional method, the above-mentioned description of the maximum number of pictures causes no contradiction. But the difference in number between reference indices and pictures has a significant influence on the case where a plurality of reference indices are assigned to one picture number, like the present invention.

As described above, command sequences idx_cmd1 and idx_cmd2 are described in a coded stream in order to assign reference indices to picture numbers. The picture numbers and the reference indices are corresponded to each other based on each command in these command sequences idx_cmd1 and idx_cmd2. For that purpose, knowing the maximum reference index value shows that all the reference indices and picture numbers have been corresponded to each other, namely, the end of the commands in the command sequences idx_cmd1 and idx_cmd2.

Therefore, in the present embodiment, the maximum number of available reference indices, instead of the maximum number of pictures in the background art, is described in the picture common information area being the header of the picture. Or, both of the maximum number of pictures and the maximum number of reference indices are described.

Figure 23:
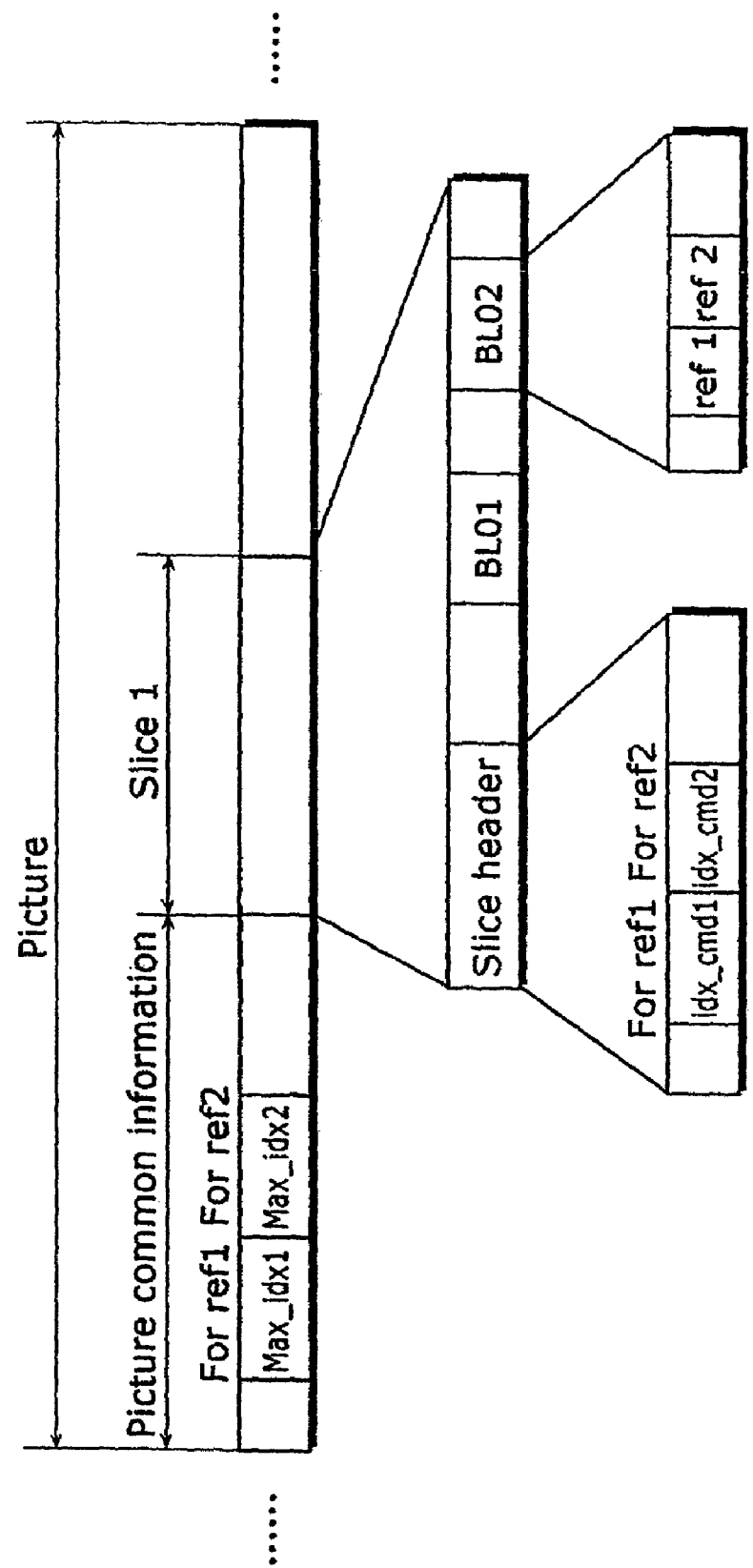
FIG. 23 is a schematic diagram for explaining a structure of a coded stream.

FIG. 23 shows a picture common information area in a coded stream of a picture in which the maximum numbers of reference indices are described. In the picture common information area, the maximum number of reference indices available for ref1 Max_idx1 and the maximum number of reference indices available for ref2 Max_idx2 are described.

In FIG. 23, the maximum number of reference indices is described in the picture common information, but it may be structured so that the maximum number of reference indices is described in the slice data area as well as in the picture common information. For example, the maximum number of reference indices required for each slice can be clearly described, in the case where the maximum number of required reference indices for each slice is significantly different from the maximum number thereof described in the picture common information area, from slice to slice, for example, the maximum number of reference indices in a picture is 8, the maximum number of reference indices required for the slice 1 in the picture is 8, and the maximum number of reference indices required for the slice 2 is 4.

In other words, it may be structured so that the maximum number of reference indices described in the picture common information is set as a default value common to all the slices in the picture and the maximum number of reference indices required for a slice, which is different from the default value, is described in the slice header.

Although FIG. 23 and FIG. 38 show the examples where a coded stream is made up of a picture common information area and slice data areas, the picture common information area and the slice data areas can be handled as separate coded streams in exactly the same manner as one coded stream.

Second Embodiment

The moving picture coding method in the second embodiment of the present invention will be explained. Since the structure of the coding apparatus, the flow of coding processing and the reference index assignment method are exactly the same as those in the first embodiment, the explanation thereof is not repeated here.

In the first embodiment, linear prediction is performed on each pixel for generating a predictive image in motion compensation using the equation 1, the equation 3 or the equation 4. However, since all of these equations include multiplications, which cause significant increase of processing amount in considering that these multiplications are performed on all the pixels.

So, it is possible to use the equation 5 instead of the equation 1, the equation 6 instead of the equation 3, and the equation 7 instead of the equation 4. These equations allow calculations only using bit shift operations without using multiplications, and thus allows reduction of processing amount. In the following equations, Q1(i) and Q2(i) are pixel values of referred blocks, P(i) is a pixel value of a predictive image of a current block to be coded, and m, n and c are linear prediction coefficients given by a selected weighting coefficient set.

$$P(i)=\pm\text{pow}(2,m)\times Q1(i)\pm\text{pow}(2,n)\times Q2(i)+c \qquad \text{Equation 5}$$

$$P(i)=\pm\text{pow}(2,m)\times Q1(i)\pm\text{pow}(2,n)\times Q1(i)+c \qquad \text{Equation 6}$$

$$P(i)=\pm\text{pow}(2,m)\times Q1(i)+c \qquad \text{Equation 7}$$

(where pow(2, m) indicates "m"th power of 2, and pow(2, n) indicates "n"th power of 2)

As is the case with the first embodiment, the equation 5 is used for generating a predictive image with reference to two pictures at a time, and the equation 6 or the equation 7 is used for generating a predictive image with reference to only one picture. Since these equations require identifiers indicating plus and minus signs, weighting coefficient sets required for prediction operations are (sign1, m, sign2, n, c) for the equations 5 and 6, and (signs, m, c) for the equation 7. "sign1" and "sign2" are parameters identifying the first and second plus and minus signs, respectively. Although the number of parameters is larger than that in the first embodiment, there is little increase in processing amount because both sign1 and sign2 can be represented by 1 bit.

Here, the flow of processing from determination of weighting coefficient sets until generation of a predictive image with reference to two pictures at a time using the equation 5 will be explained in detail.

First, the case where the functional structure for generation of a predictive image is that as shown in FIG. 8 will be explained. The average calculation unit 107*a* obtains the weighting coefficient set (sign1_1, m_1, sign2_1, n_1, c_1) from the linear prediction coefficient storage unit 109*a*. Also, the average calculation unit 107*a* obtains the weighting coefficient set (sign1_2, m_2, sign2_2, n_2, c_2) from the linear prediction coefficient storage unit 109*b*.

The average calculation unit 107*a* calculates, for respective parameters, the average of the weighting coefficient sets obtained from the linear prediction coefficient storage unit 109*a* and the linear prediction coefficient storage unit 109*b* so as to consider the average as the weighting coefficient set (sign1, m, sign2, n, c). The linear prediction operation unit 107*b* calculates the predictive image using the equation 5 based on the weighting coefficient set (signs, m, sign2, n, c) outputted from the average calculation unit 107*a*.

Note that FIG. 8 shows the weighting coefficient set (w1_1, w2_1, c_1, d_1) and the like obtained from the linear prediction coefficient storage unit 109*a* and the like, which are calculated in the case where the equation 1 is used as explained in the first embodiment, and does not show the parameters used in the case where the predictive image is obtained using the equation 5, but the parameters used in the former case can be replaced by the parameters in the latter case as they are. The same goes for the cases of FIG. 9 and FIG. 10 to be described later.

Next, the case where the functional structure for generation of a predictive image is that as shown in FIG. 9 will be explained. The linear prediction operation unit 107c calculates a predictive image 1 based on the weighting coefficient set (sign1_1, m_1, sign2_1, n_1, c_1) obtained from the linear prediction coefficient storage unit 109a. The linear prediction operation unit 107d calculates a predictive image 2 based on the weighting coefficient set (sign1_2, m_2, sign2_2, n_2, c_2) obtained from the linear prediction coefficient storage unit 109b. And the average calculation unit 107e calculates, for respective pixels, the average of the predictive images calculated by the linear prediction operation units 107c and 107d so as to obtain a predictive image.

In this case, the linear prediction operation unit 107c first calculates the predictive image using the equation 5 based on the weighting coefficient set (sign1_1, m_1, sign2_1, n_1, c_1), so it is possible to calculate the predictive image using bit shift operations without using multiplications. The same goes for the linear prediction operation unit 107d. On the other hand, in the case of FIG. 8, since the average of the weighting coefficient set (sign1_1, m_1, sign2_1, n_1, c_1) and the weighting coefficient set (sign1_2, m_2, sign2_2, n_2, c_2) is calculated first, the average of m_1 and m_2 or the average of n_1 and n_2, namely, the exponents of 2, could not be integers, and thus there is a possibility that the processing amount increases. Also, if the exponents of 2 are rounded off to integers, there is another possibility that the error increases.

Next, the case where a predictive image is generated in the functional structure as shown in FIG. 10A will be explained. The linear prediction operation unit 107g calculates a predictive image using the equation 5, based on the parameters sign1_1 and m_1 which are obtained from the linear prediction coefficient storage unit 109c and used for bit shift operations; the parameters sign2_2 and n_2 which are obtained from the linear prediction coefficient storage unit 109d and used for bit shift operations; and the average c calculated by the average calculation unit 107f, of the parameters c_1 and c_2 which are obtained from the linear prediction coefficient storage units 109c and 109d.

In this case, since the coefficients used for bit shift operations are the values which are obtained directly from the linear prediction coefficient storage unit 109c or the linear prediction coefficient storage unit 109d, the exponents of 2 in the equation 5 are integers. Therefore, the calculations can be performed using bit shift operations, and thus the processing amount can be reduced.

The case where a predictive image is generated in the functional structure as shown in FIG. 10B will be explained. The linear prediction operation unit 107h calculates a predictive image using the equation 5 based on the parameters sign1_1, m_1 and c_1 which are obtained from the linear prediction coefficient storage unit 109e and the parameters sign2_2 and n_2 which are obtained from the linear prediction coefficient storage unit 109f.

In this case, since the coefficients used for bit shift operations are values which are obtained directly from the linear prediction coefficient storage unit 109e or the linear prediction coefficient storage unit 109f, the exponents of 2 in the equation 5 are integers. Therefore, the predictive image can be calculated using bit shift operations, and thus the processing amount can be reduced.

In the cases of FIGS. 10A and 10B, there are parameters which do not need to be added to the coded stream for transmission, as is the case with the cases of FIGS. 10A and 10B in the first embodiment, and the data amount of the coded stream can be reduced.

Using the linear prediction equations as explained in the second embodiment, the calculations can be performed using bit shift operations without using multiplications, so the processing amount can be significantly reduced from that in the first embodiment.

In the present embodiment, linear prediction is performed using the equations 5, 6 and 7 instead of the equations 1, 3 and 4, and using the parameter set to be coded (sign1, m, sign2, n, c) instead of (w1, w2, c, d), so the calculations can be realized only using bit shift operations and thus reduction of processing amount is achieved. However, it is also possible, as another approach, to use the equations 1, 3 and 4 and (w1, w2, c, d) as they are, by limiting the selectable values of w1 and w2 to only the values available for bit shift operations, so the calculations can be realized only using bit shift operations and thus reduction of processing amount is achieved.

When determining the values of w1 and w2, the linear prediction coefficient generation unit 110 in FIG. 1 selects, as one of the choices, only the values available for bit shift operations and describes the selected values directly into the coded streams in FIG. 6 and FIG. 12, as the values of w1 and w2 therein. As a result, it is possible to reduce the processing amount for linear prediction even in exactly the same structure as that of the first embodiment. It is also possible to determine the coefficients easily because the choices of the coefficients are limited.

In addition, as a method for such limitation, it is possible to limit the values of w1 and w2 so that 1 is always selected for such values and generate the optimum values of only c1 and c2, which are DC components, in the linear prediction coefficient generation unit 110. Taking the structure of FIG. 11 as an example, (1, c_1) for ref1 and (1, c_2) for ref2 are coded as parameter sets. In this case, the pixel value P(i) of the predictive image is calculated by the following equation in which w1_1 and w2_2 in the equation 1a are substituted for 1.

$$P(i)=(Q1(i)+Q2(i))/\text{pow}(2,d)+(c\_1+c\_2)/2$$

(where pow(2, d) indicates the "d"th power of 2)

Accordingly, it is possible to significantly reduce the processing amount for linear prediction even in exactly the same structure as that of the first embodiment. It is also possible to significantly simplify the method for determining coefficients because necessary coefficients are only c_1 and c_2.

Figure 24:
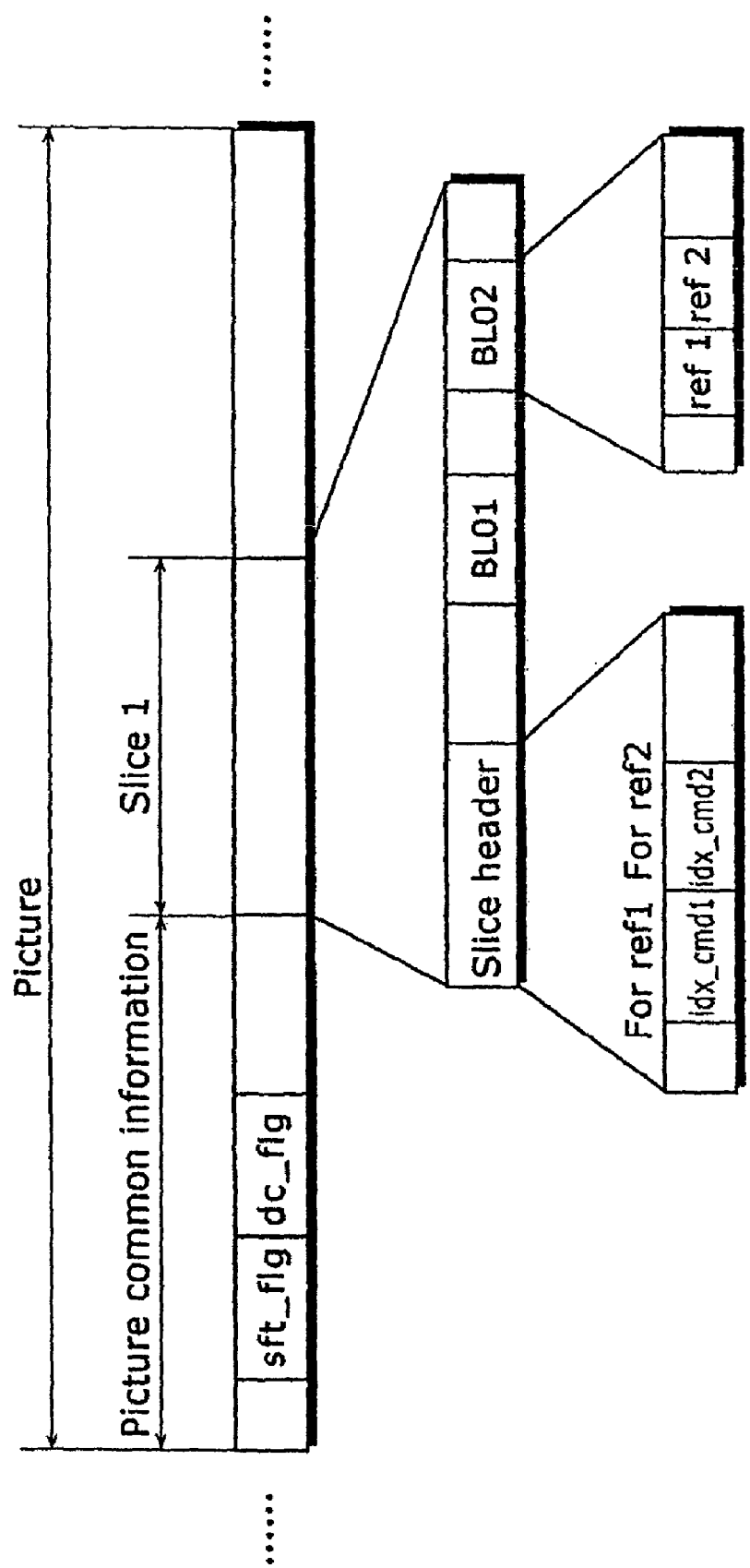
FIG. 24 is a schematic diagram for explaining a structure of a coded stream.

FIG. 24 shows an example where a flag sft_flg, indicating whether or not it is possible to perform linear prediction using only bit shift operations, and a flag dc_flg, indicating whether or not it is possible to perform linear prediction using only c that is a DC component, are described in picture common information in a coded stream of a picture. A decoding apparatus can decode the picture without reference to these flags. However, referring to these flags, it is possible to perform decoding in the structure suitable for linear prediction using only bit shift operations or decoding in the structure suitable for linear prediction using only a DC component, so these flags could be very important information depending on the structure of the decoding apparatus.

Although FIG. 24 shows the example where a coded stream is made up of a picture common information area and slice data areas, the picture common information area and the slice data areas can be handled as separate coded streams in exactly the same manner as one coded stream. Also, in the example of FIG. 24, sft_flg and dc_flg are described in the picture common information area, but they can be handled in exactly the same manner even if they are described in the sequence common information area or another independent common information area. In addition, it is possible not only to use both of these two flags sft_flg and dc_flg at the same time, but also to use either one of them, and they can be handled in the same manner in the latter case.

Third Embodiment

The moving picture coding method in the third embodiment of the present invention will be explained. Since the structure of the coding apparatus, the flow of coding processing and the reference index assignment method are exactly same as those in the first embodiment, the explanation thereof is not repeated here.

As explained in the background art, there is a method for generating a predictive image using a predetermined fixed equation such as the equation 2a and the equation 2b, unlike the first and second embodiments in which a predictive image is generated using a prediction equation obtained from weighting coefficient sets of linear prediction coefficients. This conventional method has an advantage that a data amount for coding can be reduced because there is no need to code and transmit the weighting coefficient sets used for generating the predictive image. Also, the processing amount for linear prediction can be significantly reduced because the equations for linear prediction are simple. However, the method using the fixed equations has a problem that prediction accuracy is lowered because there are only two selectable linear prediction equations 2a and 2b.

So, in the present embodiment, the equations 8a and 8b are used instead of the equations 2a and 2b. These equations 8a and 8b are obtained by adding C1 and C2 to the equations 2a and 2b. Since only the number of additions increases for the operation, there is little increase in processing amount, compared with the original equations 2a and 2b. In the following equations, Q1($i$) and Q2($i$) are pixel values of referred blocks, P(i) is a pixel value of a predictive image of a current block to be coded, and C1 and C2 are linear prediction coefficients given by a selected weighting coefficient set.

$$P(i)=2\times(Q1(i)+C1)-(Q2(i)+C2) \quad \text{Equation 8a}$$

$$P(i)=(Q1(i)+C1+Q2(i)+C2)/2 \quad \text{Equation 8b}$$

The equations 8a and 8b are prediction equations for generating a predictive image with reference to two pictures at a time, but when generating a predictive image with reference to only one picture, the equation 9 is used instead of the equation 3 or 4 as explained in the above embodiments.

$$P(i)=Q1(i)+C1 \quad \text{Equation 9}$$

Figure 14:
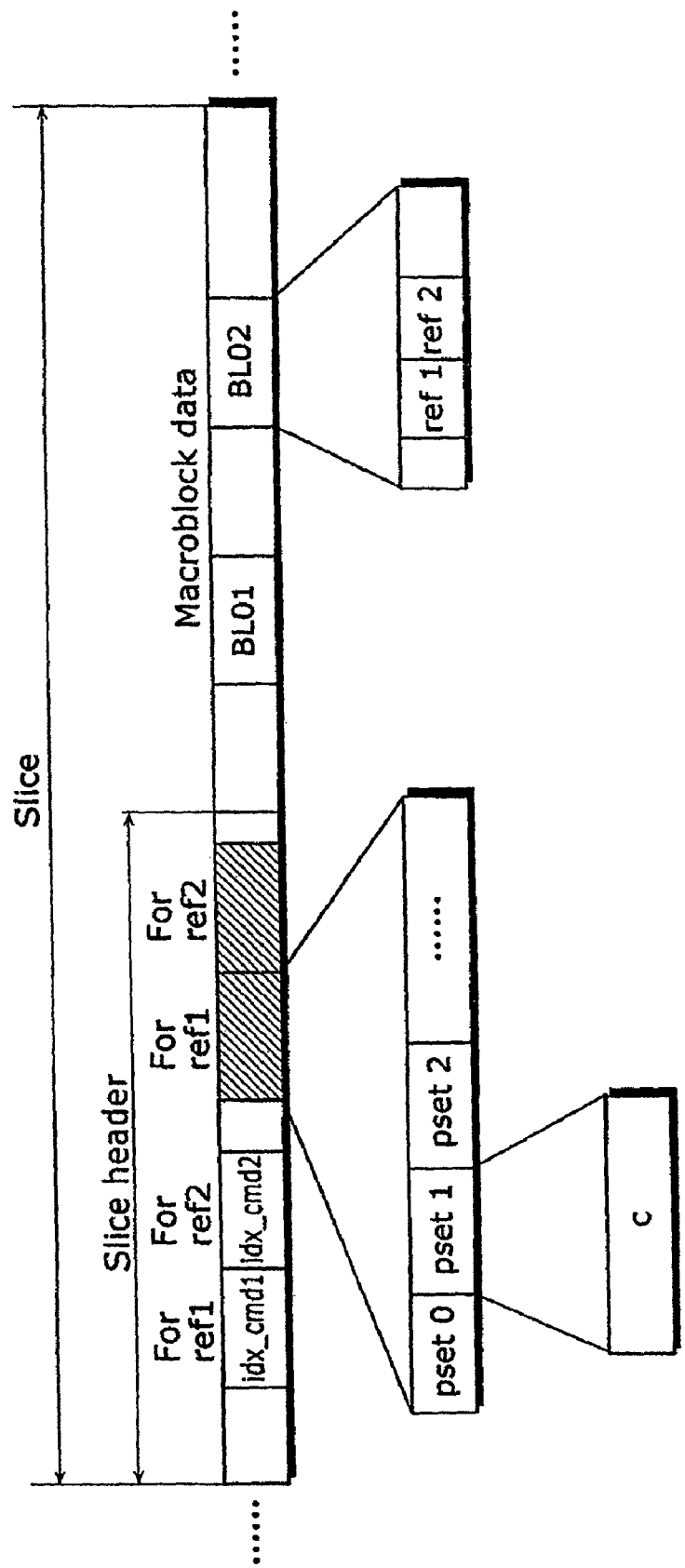
FIG. 14 is a schematic diagram for explaining a structure of a coded stream.

The weighting coefficient sets for using this method are only (C1) for ref1 and (C2) for ref2. Therefore, an example of a coded stream of a picture obtained using this method is as shown in FIG. 14. In the slice header area, the weighting coefficient sets for linear prediction (pset0, pset1, pset2, . . . ) are described for ref1 and ref2 separately, and each of the weighting coefficient sets includes only C. Similarly, FIG. 15 shows an example of weighting coefficient sets included in the slice header area. Differently from FIG. 7, each of the weighting coefficient sets in FIG. 15 includes only C.

Figure 16:
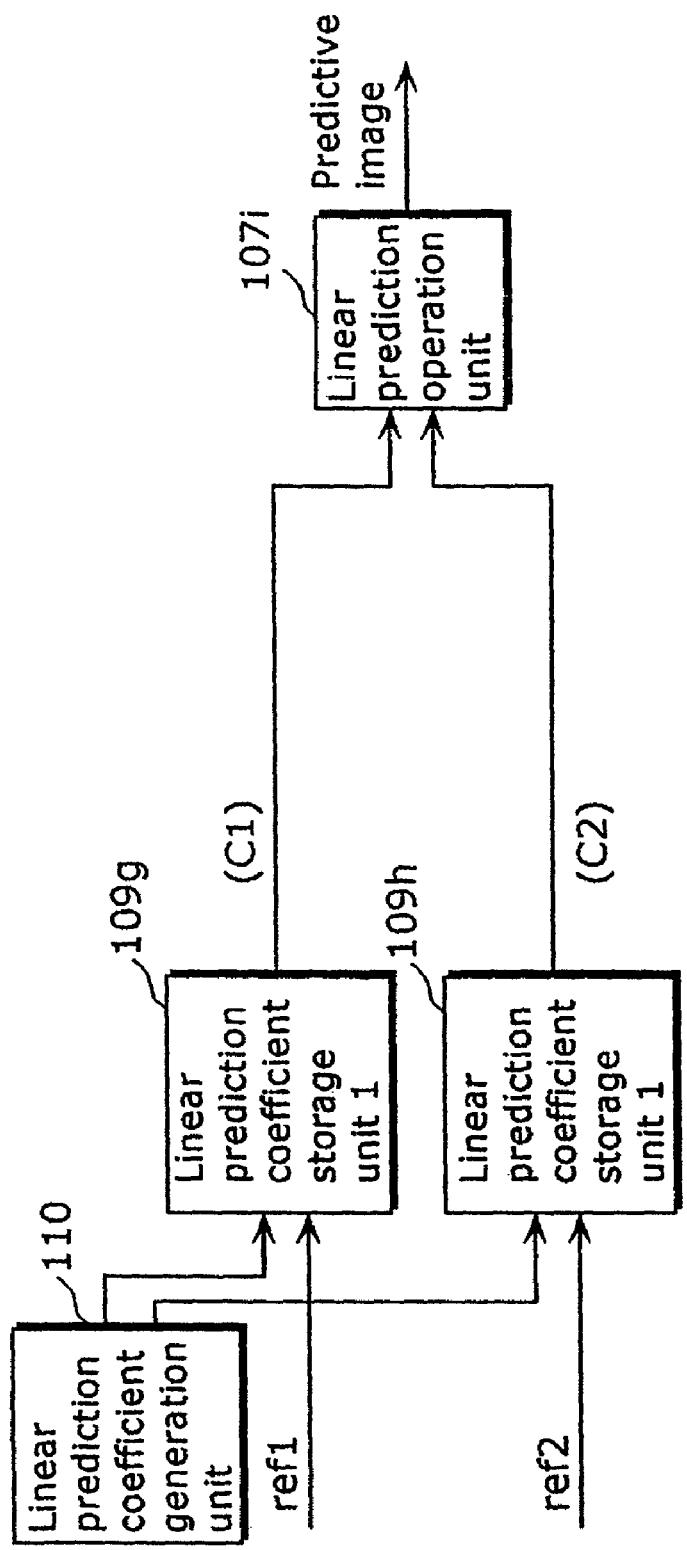
FIG. 16 is a functional block diagram showing generation of a predictive image in the coding apparatus.

FIG. 16 is a block diagram showing the functional structure for generating a predictive image via the linear prediction coefficient generation unit 110, the linear prediction coefficient storage unit 109 and the motion compensation coding unit 107 in FIG. 1.

A predictive image is generated via the linear prediction coefficient generation unit 110, the linear prediction coefficient storage unit 109$g$, the linear prediction coefficient storage unit 109$h$ and the linear prediction operation unit 107$i$.

The weighting coefficient sets generated by the linear prediction coefficient generation unit 110 are stored in the linear prediction coefficient storage unit 109$g$ and the linear prediction coefficient storage unit 109$h$. Using the first reference index ref1 and the second reference index ref2 determined by the motion estimation processing, the weighting coefficient sets (C1) and (C2) having one element respectively are obtained from the linear prediction coefficient storage units 109$g$ and 109$h$. These values are inputted to the linear prediction operation unit 107$i$, where linear prediction is performed on them using the equations 8a and 8b, and then the predictive image is generated.

Similarly, when linear prediction is performed with reference to only one picture, either one of the weighting coefficient sets (C1) and (C2) is obtained using only one of ref1 and ref2 in FIG. 16, linear prediction is performed using the equation 9, and then the predictive image is generated.

Note that the linear prediction coefficient generation unit 110 generates the weighting coefficient sets (C1) and (C2) by examining the characteristics of a picture, creates a predictive image using the method as explained in FIG. 16, and then determines a combination of the two reference indices ref1 and ref2 so as to minimize the prediction error.

Since the present embodiment requires only one parameter to be used for each of ref1 and ref2, the coding apparatus can determine the values of parameters easily and further the data amount to be described in the coded stream can be reduced. Also, since the linear prediction equations do not require complicated operations such as multiplications, the operation amount can also be minimized. In addition, the use of the coefficients C1 and C2 allows dramatic improvement of the low prediction accuracy, which is considered as a disadvantage of the conventional method of using a fixed equation.

Note that it is possible to use the linear prediction method as explained in the present embodiment, regardless of whether a plurality of reference indices can refer to the same picture or not.

Fourth Embodiment

The moving picture coding method in the fourth embodiment of the present invention will be explained. Since the structure of the coding apparatus, the flow of coding processing and the reference index assignment method are exactly same as those in the first embodiment, the explanation thereof is not repeated here.

Figure 39:
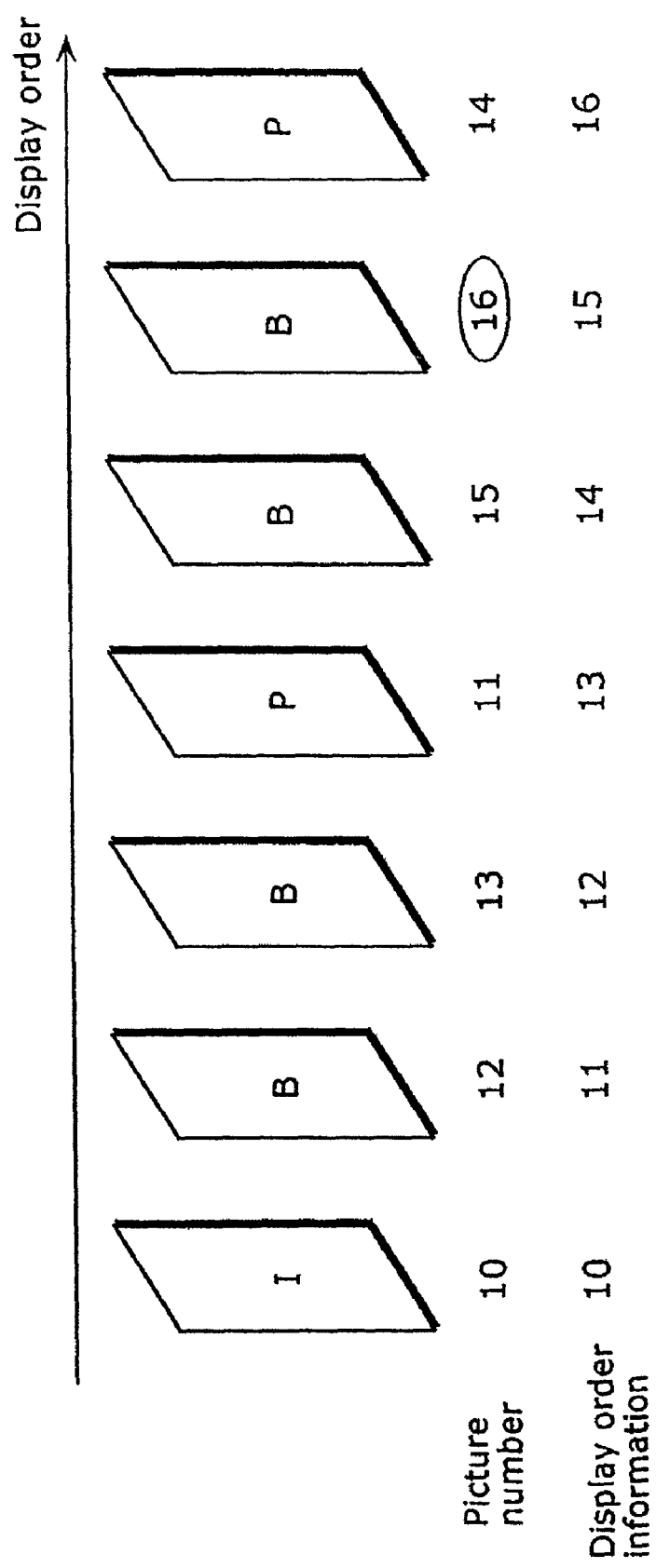
FIG. 39 is a schematic diagram for explaining relationship between picture numbers and display order information.

Display order information indicating display time or the alternative thereto as well as a picture number are assigned to each picture. FIG. 39 is a diagram showing an example of picture numbers and the corresponding display order information. Certain values are assigned to the display order information according to display order. In this example, the value which increases one by one for each picture is used. A method for generating values of coefficients used in an equation for linear prediction using this display order information will be explained in the fourth embodiment.

In the first embodiment, linear prediction is performed for each pixel using the equation 1, the equation 3 or the equation 4 when generating a predictive image in motion compensation. However, since the linear prediction requires data of coefficients, such coefficient data is described in slice header areas in a coded stream as weighting coefficient sets to be used for creation of the predictive image. Although this method achieves high coding efficiency, it requires additional processing for creating data of the weighting coefficient sets and causes increase in bit amount because the weighting coefficient sets are described in the coded stream.

So, it is also possible to perform linear prediction using the equation 10, equation 11a and the equation 12a instead of the equation 1. Using these equations, the weighting coefficients can be determined based on only the display order information of each reference picture, so there is no need to code the weighting coefficient sets separately.

In the following equations, Q1(i) and Q2(i) are pixel values of referred blocks, P(i) is a pixel value of a predictive image of a current block to be coded, V0 and V1 are weighting coefficients, T0 is the display order information of the current picture to be coded, T1 is the display order information of the picture designated by the first reference index, and T2 is the display order information of the picture designated by the second reference index.

$$P(i)=V1 \times Q1(i)+V2 \times Q2(i) \qquad \text{Equation 10}$$

$$V1=(T2-T0)/(T2-T1) \qquad \text{Equation 11a}$$

$$V2=(T0-T1)/(T2-T1) \qquad \text{Equation 12a}$$

When it is assumed, as an example, that the current picture to be coded is No. 16, the picture designated by the first reference index is No. 11, and the picture designated by the second reference index is No. 10, the display order information of respective pictures are 15, 13 and 10, and thus the following linear prediction equations are determined.

$$V1=(10-15)/(10-13)=5/3$$

$$V2=(15-13)/(10-13)=-2/3$$

$$P(i)=5/3 \times Q1(i)-2/3 \times Q2(i)$$

Compared with the method for performing linear prediction using the weighting coefficient sets in the equation 1, the above equations have lower flexibility of coefficient values, and thus it can be said that it is impossible to create the optimum predictive image. However, compared with the method of switching the two fixed equations 2a and 2b depending on the positional relationship between two reference pictures, the above equations are more efficient linear prediction equations.

When both the first reference index and the second reference index refer to the same picture, the equation 11a and the equation 12a do not hold because T1 becomes equal to T2. So, when the two reference pictures have the same display order information, linear prediction shall be performed using ½ as the values of V1 and V2. In that case, the linear prediction equations are as follows.

$$V1=\tfrac{1}{2}$$

$$V2=\tfrac{1}{2}$$

$$P(i)=\tfrac{1}{2} \times Q1(i)+\tfrac{1}{2} \times Q2(i)$$

Also, the equations 11a and 12a do not hold because T1 becomes equal to T2 when the first reference index and the second reference index refer to different pictures but these pictures have the same display order information. When the two reference pictures have the same display order information as mentioned above, linear prediction shall be performed using ½ as the values of V1 and V2.

As described above, when two reference pictures have the same display order information, it is possible to use a predetermined value as a coefficient. Such predetermined coefficient may be one having the same weight like ½ as shown in the above example.

By the way, use of the equation 10 in the above embodiments requires multiplications and divisions for linear prediction. Since the linear prediction operation using the equation 10 is the operation for all the pixels in a current block to be coded, addition of multiplications causes significant increase in the processing amount.

So, approximation of V1 and V2 to the powers of 2 like the case of the second embodiment makes it possible to perform linear prediction operation using only shift operations, and thus to achieve reduction of the processing amount. As the linear prediction equations for that case, the equations 11b and 12b are used instead of the equations 11a and 12a. In the following equations, v1 and v2 shall be integers.

$$V1=\pm\mathrm{pow}(2,v1)=\mathrm{apx}((T2-T0)/(T2-T1)) \qquad \text{Equation 11b}$$

$$V2=\pm\mathrm{pow}(2,v2)=\mathrm{apx}((T0-T1)/(T2-T1)) \qquad \text{Equation 12b}$$

(where pow(2, v1) indicates the "v1"th power of 2 and pow(2, v2) indicates the "v2"th power of 2)

(where =apx( ) indicates that the value in ( ) shall be approximated to the left-hand value)

Note that it is also possible to use the equations 11c and 12c instead of the equations 11a and 12a, where v1 is an integer.

$$V1=\pm\mathrm{pow}(2,v1)=\mathrm{apx}((T2-T0)/(T2-T1)) \qquad \text{Equation 11c}$$

$$V2=1-V1 \qquad \text{Equation 12c}$$

(where pow(2, v1) indicates the "v1"th power of 2)

(where =apx( ) indicates that the value in ( ) shall be approximated to the left-hand value)

Note that it is also possible to use the equations 11d and 12d instead of the equations 11a and 12a, where v1 is an integer.

$$V1=1-V2 \qquad \text{Equation 11d}$$

$$V2=\pm\mathrm{pow}(2,v2)=\mathrm{apx}((T0-T1)/(T2-T1)) \qquad \text{Equation 12d}$$

(where pow(2, v2) indicates the "v2"th power of 2)

(where =apx( ) indicates that the value in ( ) shall be approximated to the left-hand value)

Note that the value of V1 and V2 approximated to the power of 2 shall be, taking the equation 11b as an example, the value of ±pow(2, v1) obtained when the values of ±pow(2, v1) and (T2−T0)/(T2−T1) are mostly approximated to each other as the value of v1 changes one by one.

For example, in FIG. 39, when a current picture to be coded is No. 16, the picture designated by the first reference index is No. 11, and the picture designated by the second reference index is No. 10, the display order information of the respective pictures are 15, 13 and 10, so (T2−T0)/(T2−T1) and ±pow(2, v1) are as follows.

$$(T2-T0)/(T2-T1)=(10-15)/(10-13)=5/3$$

$$+\mathrm{pow}(2,0)=1$$

$$+\mathrm{pow}(2,1)=2$$

Since 5/3 is close to 2 rather than 1, V1=2 is obtained as a result of approximation.

As another approximation method, it is also possible to switch between round-up approximation and round-down approximation depending on the relationship between two values of display order information T1 and T2.

In that case, round-up approximation is performed on both V1 and V2 when T1 is later than T2, and round-down approximation is performed on both V1 and V2 when T1 is earlier than T2. It is also possible, in a reverse manner, to perform round-down approximation on both V1 and V2 when T1 is later than T2, and round-up approximation on both V1 and V2 when T1 is earlier than T2.

As another approximation method using display order information, round-up approximation is performed in an equation for V1 and round-down approximation is performed in an equation for V2 when T1 is later than T2. As a result, the difference between the values of the two coefficients becomes large, it is likely that values suitable for extrapolation are obtained. On the contrary, when T1 is earlier than T2, the value in the equation for V1 and the value in the equation for V2 are compared, and then round-up approximation is performed on the smaller value and round-down approximation is performed on the larger value. As a result, the difference between the values of the two coefficients becomes small, so it is likely that values suitable for interpolation are obtained.

For example, in FIG. 39, when a current picture to be coded is No. 16, the picture designated by the first reference index is No. 11, and the picture designated by the second reference index is No. 10, the display order information of the respective pictures are 15, 13 and 10. Since T1 is later than T2, round-up approximation is performed on the equation for V1 and round-down approximation is performed on the equation for V2. As a result, the equations 11b and 12b are calculated as follows.

$(T2-T0)/(T2-T1)=(10-15)/(10-13)=5/3$ $+pow(2,0)=1$ $+pow(2,1)=2$     (1) Equation 11b As a result of round-up approximation, V1=2 is obtained.

$(T0-T1)/(T2-T1)=(15-13)/(10-13)=-2/3$ $-pow(2,0)=-1$ $-pow(2,-1)=-½$     (2) Equation 12b As a result of round-down approximation, V2=−1 is obtained. Note that although the equation 10 is only one equation for liner prediction in the above embodiments, it is also possible to combine this method with the linear prediction method by use of the two fixed equations 2a and 2b as explained in the background art. In that case, the equation 10 is used instead of the equation 2a, and the equation 2b is used as it is. In other words, the equation 10 is used when the picture designated by the first reference index appears behind the picture designated by the second reference index in display order, whereas the equation 2b is used in other cases.

It is also possible, on the contrary, to use the equation 10 instead of the equation 2b and use the equation 2a as it is. In other words, the equation 2a is used when the picture designated by the first reference index appears behind the picture designated by the second reference index, and the equation 10 is used in other cases. However, when two reference pictures have the same display order information, linear prediction is performed using ½ as the values of V1 and V2.

It is also possible to describe only the coefficient C in the slice header areas to be used for linear prediction, in the same manner as the concept of the third embodiment. In that case, the equation 13 is used instead of the equation 10. V1 and V2 are obtained in the same manner as the above embodiments.

$P(i)=V1×(Q1(i)+C1)+V2×(Q2(i)+C2)$     Equation 13

The processing for generating coefficients C is needed, and further the coefficients C needs to be coded into the slice header area, but use of C1 and C2 allows more accurate linear prediction even if the accuracy of V1 and V2 is low. This is effective particularly in the case where V1 and V2 are approximated to the powers of 2 for performing linear prediction.

Note that using the equation 13, the linear prediction can be performed in the same manner in both cases where one reference index is assigned to one picture and a plurality of reference indices are assigned to one picture.

In the calculation of the values in each of the equations 11a, 12a, 11b, 12b, 11c, 12c, 11d and 12d, the combinations of available values are limited to some extent in every slice. So, only one operation is enough for coding a slice, unlike the equation 10 or the equation 13 in which the operation needs to be performed for all the pixels in a current block to be coded, and thus there seems to be little influence on the entire processing amount.

Note that the display order information in the present embodiment is not limited to display order, but may be the actual display time, or the order of respective pictures starting from a predetermined picture, with its value increasing as the lapse of display time.

Fifth Embodiment

The moving picture coding method in the fifth embodiment of the present invention will be explained. Since the structure of the coding apparatus, the flow of coding processing and the reference index assignment method are exactly same as those in the first embodiment, the explanation thereof is not repeated here.

In the conventional method, it is possible to switch between generation of a predictive image by use of fixed equations and generation of a predictive image by use of weighting coefficient sets of linear prediction coefficients, using flags described in a picture common information area in a coded stream, if necessary.

In the present embodiment, another method for switching the various linear prediction methods as explained in the above first to fourth embodiments using flags will be explained.

Figure 17:
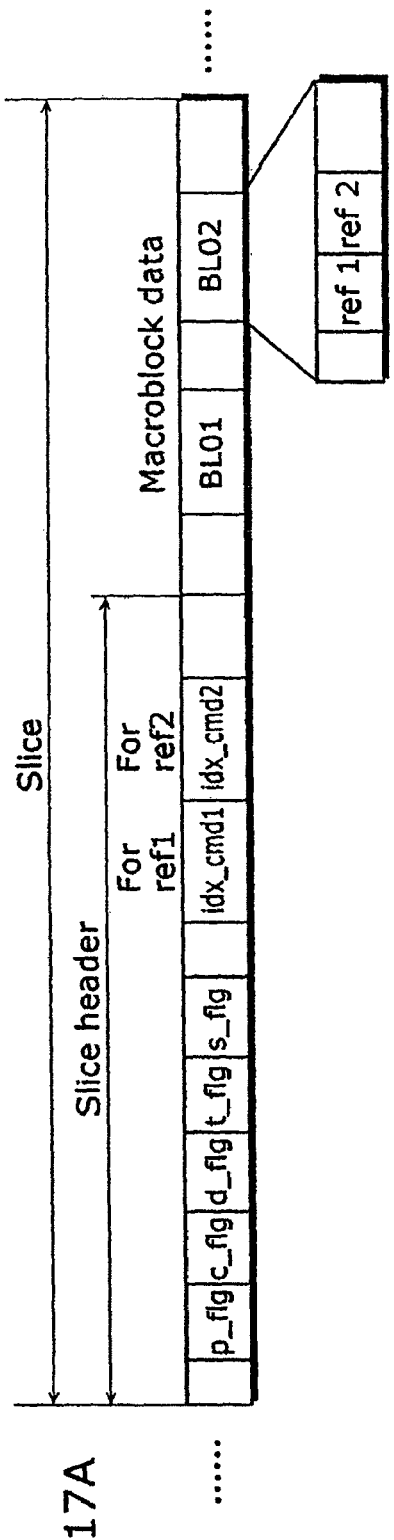
FIGS. 17A and 17B are schematic diagrams for explaining a structure of a coded stream and an example of flags.

FIG. 17A shows the structure used for the case where five flags (p_flag, c_flag, d_flag, t_flag, s_flag) for controlling the above switching are described in the slice header area in the coded stream.

As shown in FIG. 17B, p_flag is a flag indicating whether weighting coefficients have been coded or not. c_flag is a flag indicating whether only the data of the parameter C (C1 and C2), out of the parameters for ref1 and ref2, has been coded or not. t_flag is a flag indicating whether weighting coefficients for linear prediction are to be generated or not using the display order information of the reference pictures. And s_flag is a flag indicating whether the weighting coefficients for linear prediction are to be approximated to the powers of 2 or not for the calculation by use of shift operations.

Furthermore, d_flag is a flag indicating whether or not to switch two predetermined fixed equations like the equations 2a and 2b depending on the temporal positional relationship between the picture designated by ref1 and the picture designated by ref2, when linear prediction is performed using such two fixed equations. To be more specific, when this flag indicates the switching of the equations, the equation 2a is used in the case where the picture designated by ref1 is later than the picture designated by ref2 in display order, and the equation 2b is used in other cases for performing linear prediction, as is the case with the conventional method. On the other hand, when this flag indicates no switching of the equations, the equation 2b is always used for performing linear prediction, regardless of the positional relationship between the picture designated by ref1 and the picture designated by ref2.

Note that even if the equation 2a is used instead of the equation 2b as an equation to be used without switching, the equation 2a can be handled in the same manner as the equation 2b.

In the coding apparatus as shown in FIG. 1, the motion compensation coding unit 107 determines whether or not to code the data concerning the weighting coefficient sets on a per-slice basis, outputs the information of the flag p_flag to the coded stream generation unit 103 based on the determination, and describes the information in the coded stream as shown in FIG. 17A. As a result, it is possible to use the weighting coefficient sets in a higher performance apparatus for performing linear prediction, and not to use the weighting coefficient sets in a lower performance apparatus for performing linear prediction.

Similarly, in the coding apparatus as shown in FIG. 1, the motion compensation coding unit 107 determines, on a per-slice basis, whether or not to code only the data concerning the parameter C (C1 and C2) corresponding to the DC components of image data, outputs the information of the flag c_flag to the coded stream generation unit 103 based on the determination, and describes the information in the coded stream as shown in FIG. 17A. As a result, it is possible to use all the weighting coefficient sets in a higher performance apparatus for performing linear prediction, and to use only the DC components in a lower performance apparatus for performing linear prediction.

Similarly, in the coding apparatus as shown in FIG. 1, when linear prediction is performed using fixed equations, the motion compensation coding unit 107 determines, on a per-slice basis, whether or not to perform coding by switching two equations, outputs the information of the flag d_flag to the coded stream generation unit 103 based on the determination, and describes the information in the coded stream as shown in FIG. 17A. As a result, it is possible to use either one of the fixed equations for linear prediction in the case where there is little temporal change in brightness of a picture, and to switch between the two fixed equations for linear prediction in the case where the brightness of the picture changes as time goes by.

Similarly, in the coding apparatus as shown in FIG. 1, the motion compensation coding unit 107 determines, on a per-slice basis, whether or not to generate coefficients for linear prediction using the display order information of the reference pictures, outputs the information of the flag t_flag to the coded stream generation unit 103 based on the determination, and describes the information in the coded stream as shown in FIG. 17A. As a result, it is possible to code the weighting coefficient sets for linear prediction in the case where there is enough space to be coded in the coded stream, and to generate the coefficients from the display order information for linear prediction in the case where there is no more space to be coded.

Similarly, in the coding apparatus as shown in FIG. 1, the motion compensation coding unit 107 determines, on a per-slice basis, whether or not to approximate the coefficients for linear prediction to the powers of 2 so as to allow the calculation of these coefficients by shift operations, outputs the information of the flag s_flag to the coded stream generation unit 103 based on the determination, and describes the information in the coded stream as shown in FIG. 17A. As a result, it is possible to use the weighting coefficients without being approximated in a higher performance apparatus for performing linear prediction, and to use the weighting coefficients with being approximated to the powers of 2 in a lower performance apparatus for performing linear prediction which can be realized only by shift operations.

For example, the case of (1) (p, c, d, t, s_flag)=(1, 0, 0, 0, 1) shows that all the weighting coefficient sets are coded and linear prediction is performed by only shift operations by representing the coefficients as the powers of 2 as explained in the second embodiment so as to generate a predictive image.

The case of (2) (p, c, d, t, s_flag)=(1, 1, 1, 0, 0) shows that only the data concerning the parameter C (C1 and C2) is coded, the method for generating a predictive image by adding the coefficient C to the fixed equations as explained in the third embodiment is used, and further the two fixed equations are switched for use.

In the case of (3) (p, c, d, t, s_flag)=(0, 0, 0, 0, 0), no weighting coefficient set is coded. In other words, it shows that the method for generating a predictive image using only the equation 2b, out of the fixed equations in the conventional method, is used.

The case of (4) (p, c, d, t, s_flag)=(0, 0, 1, 1, 1) shows that no weighting coefficient set is coded, but the weighting coefficients are generated from the display order information of the reference pictures and linear prediction is performed by only shift operations by approximating the generated coefficients to the powers of 2, and then two fixed equations are switched for use so as to generate a predictive image.

Note that in the present embodiment, the determinations are made using five flags (p_flag, c_flag, d_flag, t_flag, s_flag), each of which is 1 bit, but it is also possible to represent the determinations with only one flag of 5 bits, instead of these five flags. In that case, coding by use of variable length coding is available, not by representation with 5 bits.

Note that in the present embodiment, all the five flags (p_flag, c_flag, d_flag, t_flag, s_flag), each of which is 1 bit, are used, but the same can be applied to the case where linear prediction method is switched only using some of these flags. In that case, the flags necessary for the linear prediction are only coded and described, out of the flags as shown in FIG. 17A.

The conventional method allows switching, on a picture-by-picture basis, between the predictive image generation method by use of fixed equations and the predictive image generation method by use of weighting coefficient sets of linear prediction coefficients, by providing a flag for switching these methods in a picture common information area in a coded stream. However, in the conventional method, the predictive image generation method can only be switched on a picture-by-picture basis.

As explained above, the present embodiment allows switching of the predictive image generation method in each slice being a subdivision of a picture by providing this switching flag in a slice header in a coded stream. Therefore, it is possible to generate a predictive image using the weighting coefficients in a slice having complex images and to generate a predictive image using fixed equations in a slice having simple images, and thus it is possible to improve the image quality while minimizing the increase in processing amount.

Note that in the present embodiment, five flags (p_flag, c_flag, d_flag, t_flag, s_flag) are described in a slice header area for determining whether the coefficients are coded or not for each slice, but it is also possible to switch the determination on a picture-by-picture basis by describing these flags in the picture common information area. In addition, it is also possible to generate a predictive image using the optimum method on a block-by-block basis by providing the switching flag on each block being a subdivision of a slice.

Note that the display order information in the present embodiment is not limited to display order, but may be the actual display time, or the order of respective pictures starting from a predetermined picture, with its value increasing as the lapse of display time.

Sixth Embodiment

Figure 2:
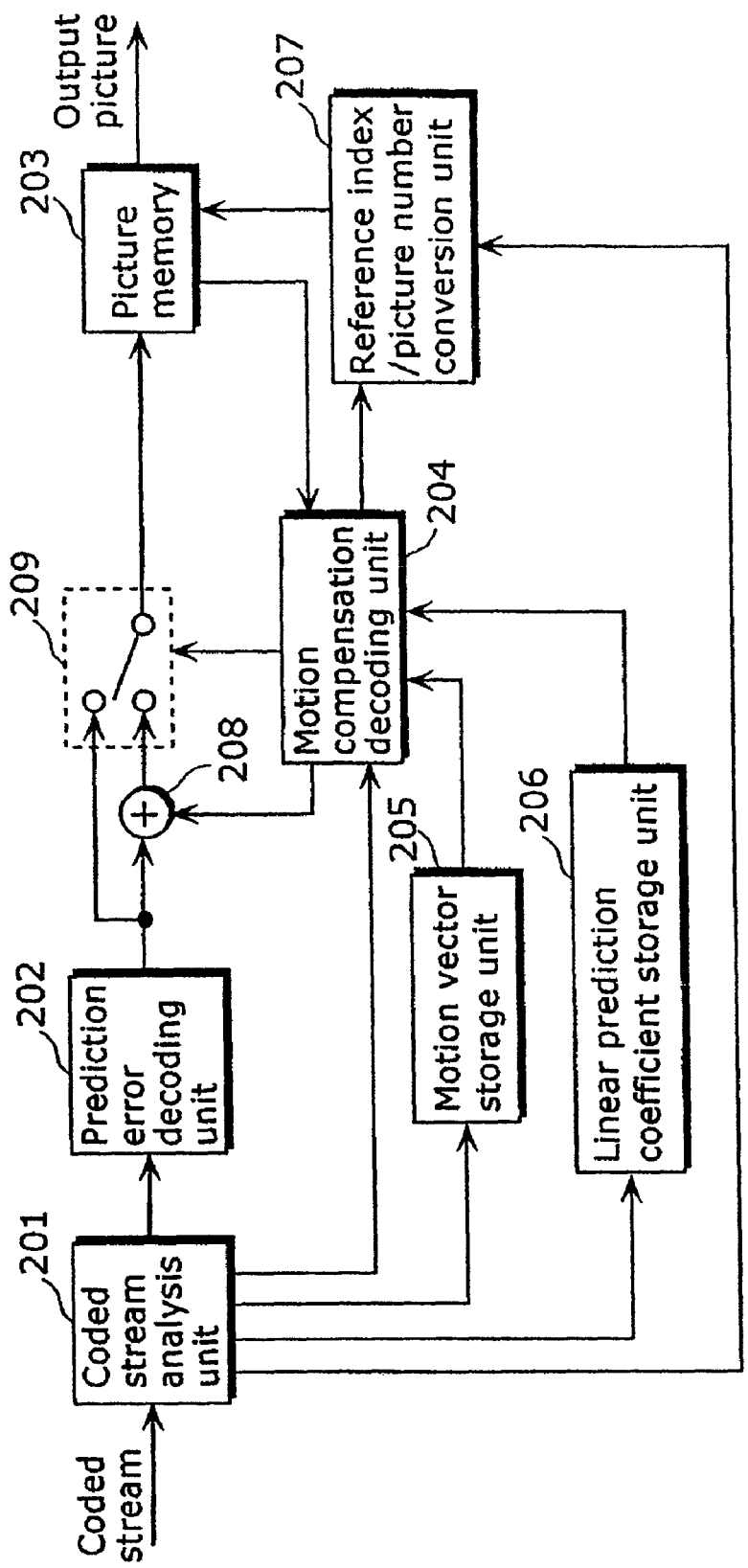
FIG. 2 is a block diagram showing a structure of a decoding apparatus in a sixth embodiment of the present invention.

FIG. 2 is a block diagram showing a structure of a moving picture decoding apparatus in the sixth embodiment of the present invention. Using this block diagram as shown in FIG. 2, the moving picture decoding method executed by this moving picture decoding apparatus will be explained in the following order: (1) an overview of decoding and (2) a method for assigning reference indices, and (3) a method for generating a predictive image. Here, it is assumed that a coded stream which is generated by the moving picture coding method in the first embodiment is inputted to the present decoding apparatus.

(1) Overview of Decoding

First, the coded stream analysis unit 201 extracts the data sequence of weighting coefficient sets for linear prediction and the command sequence for assignment of reference indices from the slice header area, and various information such as the reference index information, the motion vector information and the coded prediction error data from the coded block information area. FIG. 6 shows the above-mentioned various coded information in the coded stream.

The data sequence of the weighting coefficient sets for linear prediction extracted by the coded stream analysis unit 201 is outputted to a linear prediction coefficient storage unit 206, the command sequence for reference index assignment is outputted to a reference index/picture number conversion unit 207, the reference indices are outputted to a motion compensation decoding unit 204, the motion vector information is outputted to a motion vector storage unit 205, and the coded prediction error signal is outputted to a prediction error decoding unit 202, respectively.

The prediction error decoding unit 202 performs image decoding processing such as inverse-quantization and inverse-frequency transform for the inputted coded prediction error signal, and outputs a decoded error signal. The addition unit 208 adds the decoded prediction error signal and the predictive image signal outputted from the motion compensation decoding unit 204 to generate a reconstructed image signal. The obtained reconstructed image signal is stored into a picture memory 203 for use for reference in the following inter-picture prediction and output for display.

The motion compensation decoding unit 204 extracts an image area which is most suitable as a predictive image from the reconstructed image signals stored in the picture memory 203, using the motion vectors inputted from the motion vector storage unit 205 and the reference indices inputted from the coded stream analysis unit 201. At this time, the reference index/picture number conversion unit 207 designates the reference pictures in the picture memory 203 based on the correspondence between the reference indices given from the coded stream analysis unit 201 and the picture numbers.

The operation of the reference index/picture number conversion unit 207 will be explained in detail in the section (2). Further, the motion compensation decoding unit 204 performs pixel value conversion processing such as interpolation processing by linear prediction on pixel values in the extracted image area, so as to generate the final predictive image. The linear prediction coefficients used for that processing are obtained from the data stored in the linear prediction coefficient storage unit 206 using the reference indices as search keys.

This predictive image generation method will be explained in detail in the section (3).

The decoded image generated through the above-mentioned series of processes is stored in the picture memory 203, and outputted as a picture signal for display according to display timing.

The flow of operations in the case of inter-picture prediction decoding has been described above, but a switch 209 switches between inter-picture prediction decoding and intra-picture prediction decoding. In the case of intra-picture decoding, a predictive image is not generated by motion compensation, but a decoded image is generated by generating a predictive image of a current area to be decoded from a decoded area in the same picture and adding the predictive image. The decoded image is stored in the picture memory 203, as is the case with the inter-picture prediction decoding, and outputted as a picture signal for display according to display timing.

(2) Method for Assigning Reference Indices

Next, a method for assigning reference indices in the reference index/picture number conversion unit 207 in FIG. 2 will be explained using FIG. 3 and FIG. 4.

FIG. 3 is a diagram for explaining a method for assigning two reference indices to picture numbers. When there is a sequence of pictures ordered in display order, picture numbers are assigned in decoding order. Commands for assigning the reference indices to the picture numbers are described in a header of a slice that is a subdivision of a picture, as the unit of decoding, and thus the assignment thereof is updated every time one slice is decoded. The command indicates, in series by the number of reference indices, the differential value between a picture number which is assigned a reference index currently and a picture number which is assigned a reference index immediately before the current assignment.

Taking the first reference index in FIG. 3 as an example, since "−1" is given as a command first, 1 is subtracted from the picture number 16 of the current picture to be decoded and thus the reference index 0 is assigned to the picture number 15. Next, since "−4" is given, 4 is subtracted from the picture number 15 and thus the reference index 1 is assigned to the picture number 11. The following reference indices are assigned to respective picture numbers in the same manner. The same applies to the second reference indices.

According to the conventional reference index assignment method as shown in FIG. 34, all the reference indices are corresponded to respective picture numbers. On the other hand, in the example of FIG. 3, the assignment method is exactly same as the conventional method, but a plurality of reference indices are corresponded to the same picture number by changing the values of the commands.

FIG. 4 shows the result of the assignment of the reference indices. This diagram shows that the first reference indices and the second reference indices are assigned to respective picture numbers separately, but a plurality of reference indices are assigned to one picture number in some cases. In the decoding method of the present invention, it is assumed that a plurality of reference indices are assigned to at least one picture number, like this example.

If the reference indices are used only for determination of reference pictures, the conventional method of one-to-one assignment of reference indices to picture numbers is the most efficient method. However, in the case where a weighting coefficient set of linear prediction coefficients is selected for generation of a predictive image using reference indices, the same linear prediction coefficients have to be used for all the blocks having the same reference pictures, so there is an extremely high possibility that the optimum predictive image cannot be generated. So, if it is possible to assign a plurality of reference indices to one picture number as in the case of the present invention, the optimum weighting coefficient set of linear prediction coefficients can be selected from among a plurality of candidate sets for each block even if all the blocks have the same reference picture, and thus the predictive image with its prediction accuracy being higher can be generated.

Note that, the above description shows the case where the picture numbers are given assuming that all the reference pictures are stored in a reference memory. However, since a current picture is given a picture number which is larger by one than the number of a picture which has been coded immediately before the current picture, only when the current picture which has been coded lastly is stored, so the continuity of the picture numbers are maintained in the reference memory even if some pictures are not stored, and thus the above-mentioned method can be used without change.

(3) Method for Generating Predictive Image

Next, the predictive image generation method in the motion compensation decoding unit 204 in FIG. 2 will be explained using FIG. 5. Although the predictive image generation method by linear prediction is exactly the same as the conventional method, flexibility in selection of linear prediction coefficients is increased because a plurality of reference index numbers can be corresponded to the same picture.

The picture B16 is a current B-picture to be decoded, and the blocks BL01 and BL02 are current blocks to be decoded which belong to the B-picture. The picture P11 and the picture B15 are used as the first reference picture and the second reference picture for BL01, and the predictive image is generated with reference to the blocks BL11 and BL21 belonging to the pictures P11 and B15 respectively. In the same manner, the picture P11 and the picture B15 are used as the first reference picture and the second reference picture for BL02, and the predictive image is generated with reference to the blocks BL12 and BL22 respectively.

Although both BL01 and BL02 refer to the same pictures as their first reference picture and the second reference picture, it is possible to assign different values to the first reference index ref1 and the second reference index ref2 for BL01 and BL02 respectively by using the reference index assignment method as explained in the above (2). Taking FIG. 4 as an example, 1 and 3 are assigned to the first reference index corresponding to the picture number 11, whereas 1 and 6 are assigned to the second reference index corresponding to the picture number 15. As a result, four combinations of these reference indices, (ref1, ref2)=(1, 1), (1, 6), (3, 1) and (3, 6) are supposed, and thus it is possible to select the combination for deriving the optimum weighting coefficient set on a per-block basis from among these combinations. In FIG. 5, ref1=1 and ref2=1 are assigned for BL01, and ref1=3 and ref2=6 are assigned for BL02, for example.

According to the conventional reference assignment method as shown in FIG. 35, only one combination of (ref1, ref2)=(1, 1) can be selected for both BL01 and BL02 in the case of FIG. 5, and thus only one weighting coefficient set of linear prediction coefficients can be selected, too. On the other hand, according to the present invention, four options are available, and it can be said that the possibility for selection of the optimum weighting coefficient set is increased.

A coded stream of one picture is made up of a picture common information area and a plurality of slice data areas. FIG. 6 shows the structure of the slice data area in the coded stream. The slice data area is further made up of a slice header area and a plurality of block data areas. This diagram shows each block area corresponding to BL01 and BL02 in FIG. 5 as an example of the block data area.

"ref1" and "ref2" included in BL01 designate the first reference index and the second reference index respectively indicating two pictures referred to by the block BL01. Also, in the slice header area, data for giving the weighting coefficient sets for the above-mentioned linear prediction (pset0, pset1, pset2, . . . ) is described for ref1 and ref2 respectively. In this area, "pset"s of the number equivalent to the number of the reference indices as explained in (2) can be set. To be more specific, in the case where ten reference indices from 0 to 9 are used as each of the first reference index and the second reference index, ten "pset"s from 0 to 9 can be set for each of ref1 and ref2.

FIG. 7 shows an example of tables of the weighting coefficient sets included in the slice header area. Each data indicated by an identifier pset has four values w1, w2, c and d, and these tables are structured so that these values can be directly referred to by the values of ref1 and ref2. Also, command sequences idx_cmd1 and idx_cmd2 for assigning the reference indices to the picture numbers are described in the slice header area.

Using ref1 and ref2 described in BL01 in FIG. 6, one set of weighting coefficients is selected from each of the tables for ref1 and ref2 in FIG. 7. By performing linear prediction on the pixel values of the reference images using these two sets of weighting coefficients, a predictive image is generated.

Here, the flow of the processing from determination of weighting coefficient sets until generation of a predictive image will be explained.

Figure 18:
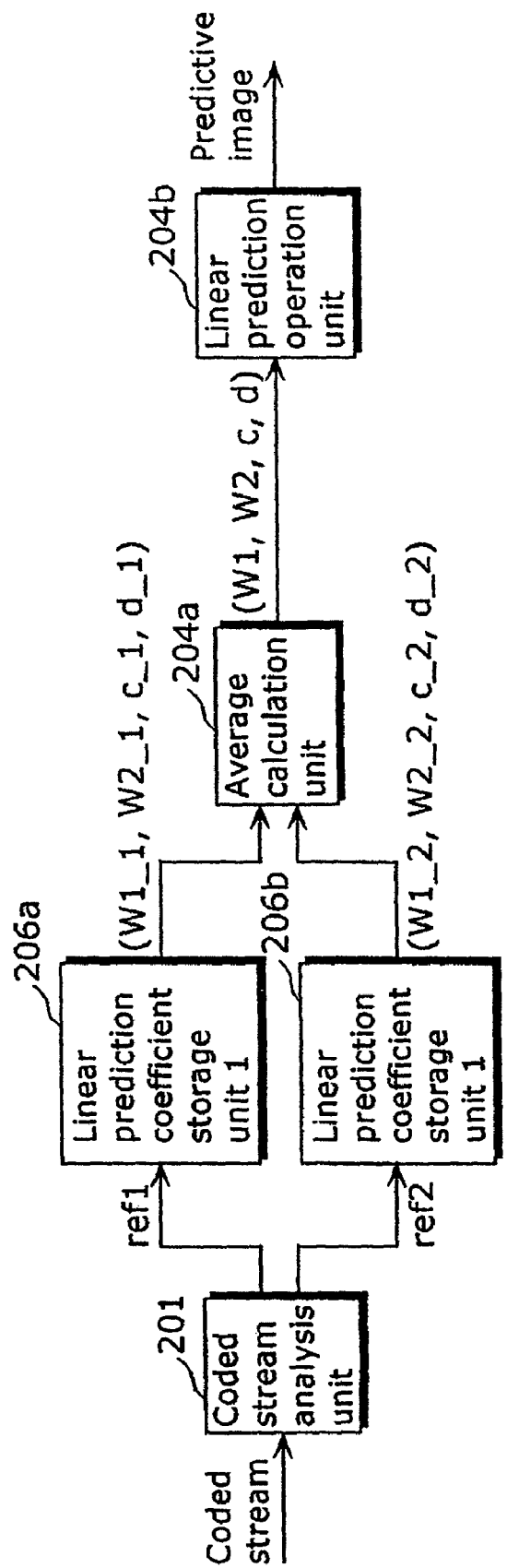
FIG. 18 is a functional block diagram showing generation of a predictive image in a decoding apparatus.

FIG. 18 is a functional block diagram showing a functional structure for generating a predictive image in the linear prediction coefficient storage unit 206 and the motion compensation decoding unit 204.

A predictive image is generated via the linear prediction coefficient storage unit 206a, the linear prediction coefficient storage unit 206b, the average calculation unit 204a and the linear prediction operation unit 204b.

The average calculation unit 204a obtains, from the linear prediction coefficient storage unit 206a, one set of weighting coefficients (w1_1, w2_1, c_1, d_1) selected by ref1 outputted from the coded stream analysis unit 201, and obtains, from the linear prediction coefficient storage unit 206b, one set of weighting coefficients (w1_2, w2_2, c_2, d_2) selected by ref2 outputted from the coded stream analysis unit 201.

The average calculation unit 204a calculates the average, for respective parameters, of the weighting coefficient sets obtained from the linear prediction coefficient storage units 206a and 206b respectively so as to output the averages to the linear prediction operation unit 204b as the weighting coefficient set (w1, w2, c, d) which is actually used for linear prediction. The linear prediction operation unit 204b calculates the predictive image using the equation 1 based on the weighting coefficient set (w1, w2, c, d) for output.

Figure 19:
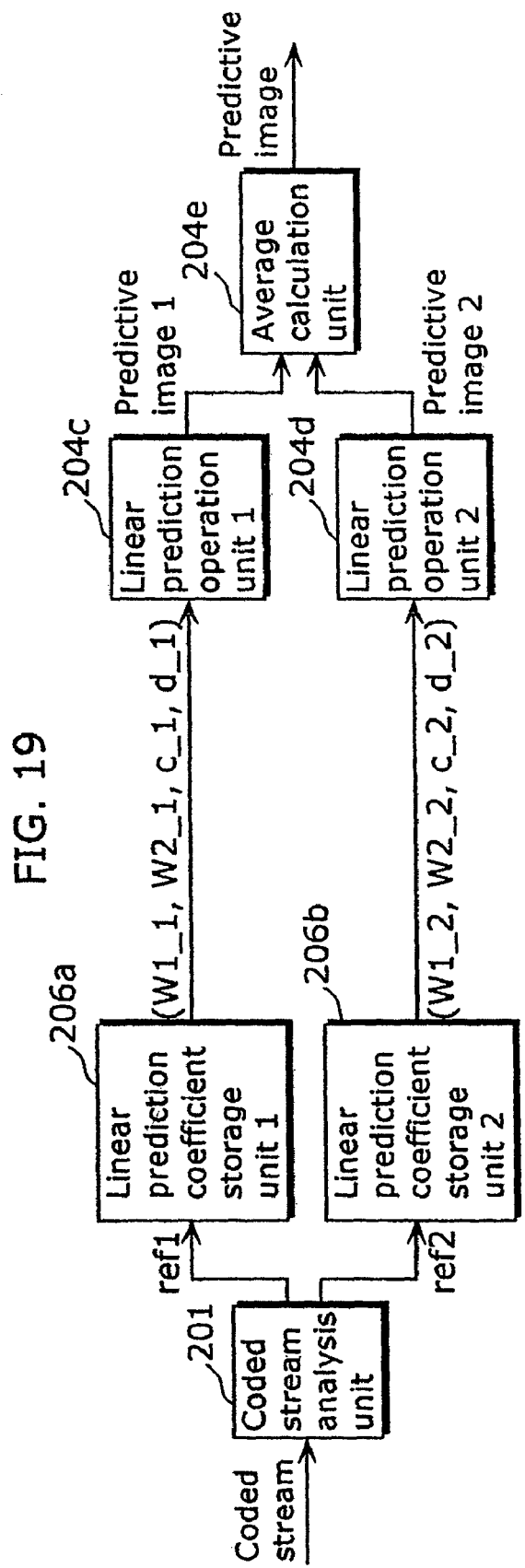
FIG. 19 is another functional block diagram showing generation of a predictive image in the decoding apparatus.

FIG. 19 is a functional block diagram showing another functional structure for generating a predictive image. A predictive image is generated via the linear prediction coefficient storage unit 206a, the linear prediction coefficient storage unit 206b, the linear prediction operation unit 204c, the linear prediction operation unit 204d and the average calculation unit 204e.

The linear prediction operation unit 204c obtains, from the linear prediction coefficient storage unit 206a, one set of weighting coefficients (w1_1, w2_1, c_1, d_1) selected by ref1 outputted from the coded stream analysis unit 201, and calculates the predictive image using the equation 1 based on the weighting coefficient set for output to the average calculation unit 204e.

In the same manner, the linear prediction operation unit 204d obtains, from the linear prediction coefficient storage unit 206b, one set of weighting coefficients (w1_2, w2_2, c_2, d_2) selected by ref2 outputted from the coded stream analysis unit 201, and calculates the predictive image using the equation 1 based on the weighting coefficient set for output to the average calculation unit 204e.

The average calculation unit 204e calculates the average, for respective pixel values, of the predictive images which are outputted from the linear prediction operation unit 204c and the linear prediction operation unit 204d respectively so as to generate the final predictive image for output.

FIG. 20A is a functional block diagram showing another functional structure for generating a predictive image. A predictive image is generated via the linear prediction coefficient storage unit 206c, the linear prediction storage unit 206d, the average calculation unit 204f, and the linear prediction operation unit 204g.

The average calculation unit 204f obtains, from the linear prediction coefficient storage unit 206c, the parameters of c_1 and d_1 in one set of weighting coefficients (w1_1, w2_1, c_1, d_1) selected by ref1 outputted from the coded stream analysis unit 201, and similarly, obtains, from the linear prediction coefficient storage unit 206d, the parameters of c_2 and d_2 in one set of weighting coefficients (w1_2, w2_2, c_2, d_2) selected by ref2 outputted from the coded stream analysis unit 201. The average calculation unit 204f calculates the average of c_1 and c_2 and the average of d_1 and d_2 obtained from the linear prediction coefficient storage unit 206c and the linear prediction coefficient storage unit 206d so as to obtain c and d for output to the linear prediction operation unit 204g.

Also, the linear prediction operation unit 204g obtains the parameter of w1_1 in the above-mentioned weighting coefficient set (w1_1, w2_1, c_1, d_1) from the linear prediction coefficient storage unit 206c, obtains the parameter of w2_2 in the above-mentioned weighting coefficient set (w1_2, w2_2, c_2, d_2) from the linear prediction coefficient storage unit 206d, and obtains c and d which are the averages calculated by the average calculation unit 204f, and then calculates the predictive image using the equation 1 for output.

To be more specific, when determining the weighting coefficient set (w1, w2, c, d) which is actually used for linear prediction from among the weighting coefficient set (w1_1, w2_1, c_1, d_1) obtained from the linear prediction coefficient storage unit 206c and the weighting coefficient set (w1_2, w2_2, c_2, d_2) obtained from the linear prediction coefficient storage unit 206d, the linear prediction operation unit 204g uses the following rule.

w1=w1_1
w2=w2_2
c=(average of c_1 and c_2)
d=(average of d_1 and d_2)

FIG. 20B is a functional block diagram showing another functional structure for generating a predictive image. A predictive image is generated via the linear prediction coefficient storage unit 206e, the linear prediction coefficient storage unit 206f and the linear prediction operation unit 204h.

The linear prediction operation unit 204h obtains, from the linear prediction coefficient storage unit 206e, the parameters of w1_1, c_1 and d_1 which are a part of one set of weighting coefficients (w1_1, w2_1, c_1, d_1) selected by refs outputted from the coded stream analysis unit 201, and similarly, obtains, from the linear prediction coefficient storage unit 206f, the parameter of w2_2 which is a part of one set of weighting coefficients (w1_2, w2_2, c_2, d_2) selected by ref2 outputted from the coded stream analysis unit 201. The linear prediction operation unit 204h calculates the predictive image using the equation 1 based on w1_1, c_1, d_1, w2_2 obtained from the linear prediction coefficient storage unit 206e and the linear prediction coefficient storage unit 206f for output.

To be more specific, when determining the weighting coefficient set (w1, w2, c, d) which is actually used for linear prediction from among the weighting coefficient set (w1_1, w2_1, c_1, d_1) obtained from the linear prediction coefficient storage unit 206e and the weighting coefficient set (w1_2, w2_2, c_2, d_2) obtained from the linear prediction coefficient storage unit 206f, the linear prediction operation unit 204h uses the following rule.

w1=w1_1
w2=w2_2
c=c_1
d=d_1

Figure 21:
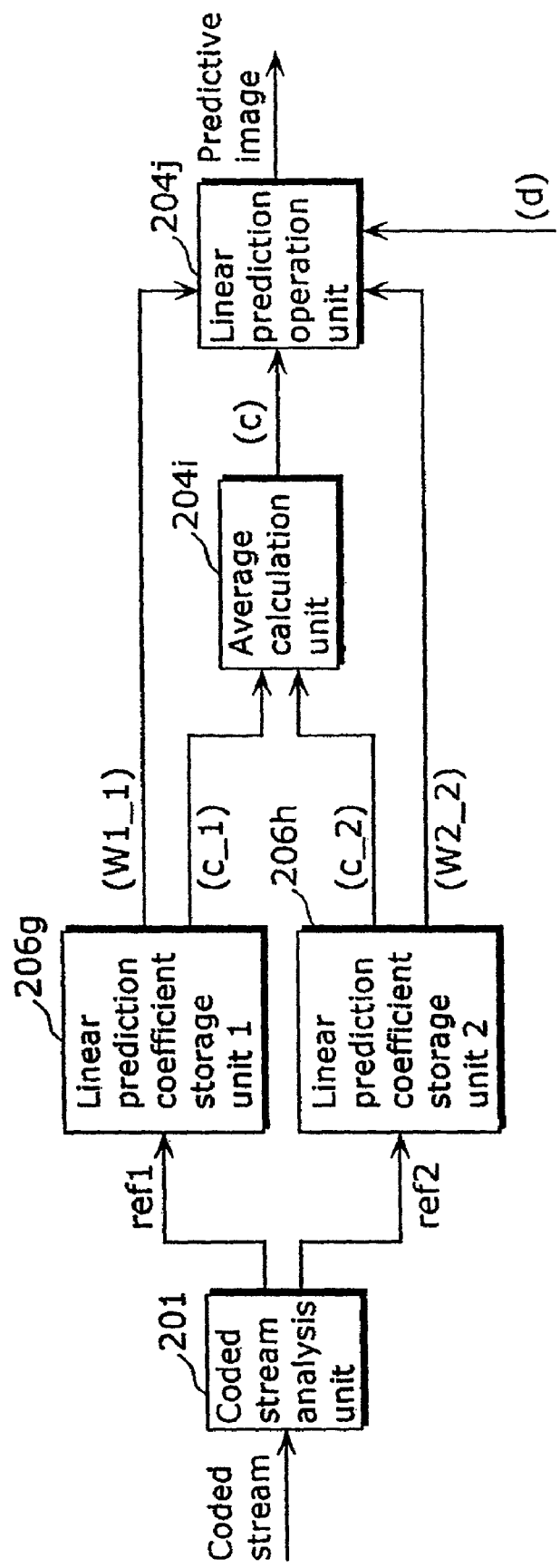
FIG. 21 is still another functional block diagram showing generation of a predictive image in the decoding apparatus.

Furthermore, it is possible to use one or more parameters out of w1, w2, c and d as fixed values. FIG. 21 is a functional block diagram in the case where only "d" is used as a fixed value for the functional structure in FIG. 20A. A predictive image is generated via the linear prediction coefficient storage unit 206g, the linear prediction coefficient storage unit 206h, the average calculation unit 204i and the linear prediction operation unit 204j.

The coefficients selected by the first reference index ref1 from the linear prediction coefficient storage unit 206g are only (w1_1, c_1), and the coefficients selected by the second reference index ref 2 from the linear prediction coefficient storage unit 206h are only (w2_2, c_2). The average calculation unit 204i calculates the average of c_1 and c_2 obtained from the linear prediction coefficient storage unit 206g and the linear prediction coefficient storage unit 206h so as to obtain "c", and outputs it to the linear prediction operation unit 204j.

The linear prediction operation unit 204j obtains the parameter of w1_1 from the linear prediction coefficient storage unit 206g, obtains the parameter of w2_2 from the linear prediction coefficient storage unit 206h, and obtains the parameter of c from the average calculation unit 204i, and then calculates the predictive image using a predetermined fixed value as a parameter of d and the equation 1 for output. In this case, it is also possible to modify the equation 1 into the equation 1b for use as explained in the first embodiment.

It is possible to use one predetermined fixed value as a value of d in any cases, but in the case where the coding apparatus describes the above fixed value in the slice header, that fixed value can be switched on a per-slice basis by extracting it in the coded stream analysis unit 201. Similarly, the fixed value can be switched on a per-picture basis or a per-sequence basis by describing it in the picture common information area or the sequence common information area.

Note that the above-mentioned decoding methods are concerned with a B-picture having two reference pictures, but it is also possible to execute the same processing in the single picture reference decoding mode for a P-picture or a B-picture having only one reference picture. In this case, using only one of the first reference index and the second reference index, pset and idx_cmd for either refs or ref2 are only described in the slice header area included in the coded stream of FIG. 6, according to the reference index described in the block data area. In addition, as a linear prediction method, the following equation 3 or the equation 4 is used instead of the equation 1 as explained in the conventional method.

Use of the equation 1 and the equation 3 requires four parameters w1, w2, c and d, but use of the equation 4 allows linear prediction by use of only three parameters w1, c and d. In other words, it is possible to reduce the number of data items of the weighting coefficient set to be described in each slice header area to three, when either one of the first reference index and the second reference index is used for an entire picture like a P-picture.

If the equation 3 is used, it is possible to realize linear prediction which is available for both B-pictures and P-pictures adaptively without change in structure. If the equation 4 is used, the data amount to be described in the header area of a P-picture can be reduced, and thus it is possible to achieve reduction of processing amount because of simplified calculation. However, since the reference index assignment method suggested by the present invention can directly be applied to any of the above methods, a predictive image with higher prediction accuracy can be created, which is extremely effective in image decoding.

By the way, the pictures which are referred to in motion compensation are determined by designating the reference indices assigned to respective pictures. In that case, the maximum number of pictures which are available for reference has been described in the picture common information area in the coded stream.

FIG. 38 is a schematic diagram of a coded stream in which the maximum number of pictures which are available for reference is described. As this diagram shows, the maximum number of pictures for ref1 "Max_pic1" and the maximum number of pictures for ref2 "Max_pic2" are described in the picture common information in the coded stream.

Information required for decoding is not the maximum number of real pictures themselves, but the maximum reference index value available for designating pictures.

Since one reference index is assigned to one picture in the conventional method, above-mentioned description of the maximum number of pictures causes no contradiction. But the difference in number between reference indices and pictures has a significant influence on the case where a plurality of reference indices are assigned to one picture number, like the present invention.

As described above, command sequences idx_cmd1 and idx_cmd2 are described in a coded stream in order to assign reference indices to picture numbers. The picture numbers and the reference indices are corresponded to each other based on each command in these command sequences idx_cmd1 and idx_cmd2. For that purpose, knowing the maximum reference index value shows that all the reference indices and picture numbers have been corresponded to each other, namely, the end of the commands in the command sequences idx_cmd1 and idx_cmd2.

Therefore, in the present embodiment, the maximum number of available reference indices, instead of the maximum number of pictures in the background art, is described in the picture common information area being a header of the picture. Or, both of the maximum number of pictures and the maximum number of reference indices are described.

FIG. 23 shows a picture common information area in a coded stream of a picture in which the maximum number of reference indices is described. In the picture common information area, the maximum number of reference indices available for ref1 "Max_idx1" and the maximum number of reference indices available for ref2 "Max_idx2" are described.

In FIG. 23, the maximum number of reference indices is described in the picture common information, but it may be structured so that the maximum number of reference indices is described in the slice data area as well as in the picture common information. For example, the maximum number of reference indices required for each slice can be clearly described, in the case where the maximum number of required reference indices for each slice is significantly different from the maximum number thereof described in the picture common information area, from slice to slice, for example, the maximum number of reference indices in a picture is 8, the maximum number of reference indices required for the slice 1 in the picture is 8, and the maximum number of reference indices required for the slice 2 is 4.

In other words, it may be structured so that the maximum number of reference indices described in the picture common information is set to be the default value common to all the slices in the picture, and the maximum number of reference indices required for each slice, which is different from the default value, is described in the slice header.

Although FIG. 23 and FIG. 38 show the examples where a coded stream is made up of a picture common information area and slice data areas, the picture common information area and the slice data areas can be handled as separate coded streams in exactly the same manner as one coded stream.

Seventh Embodiment

The moving picture decoding method in the seventh embodiment of the present invention will be explained. Since the structure of the decoding apparatus, the flow of decoding processing and the reference index assignment method are exactly the same as the sixth embodiment, the explanation thereof is not repeated here.

In the sixth embodiment, linear prediction is performed on each pixel using the equation 1, the equation 3 or the equation 4 for generating a predictive image in motion compensation. However, since all of these equations include multiplications, which cause significant increase in processing amount in considering that these multiplications are performed on all the pixels.

So, it is possible to use the equation 5 instead of the equation 1, the equation 6 instead of the equation 3, and the equation 7 instead of the equation 4. These equations allow calculations only by bit shift operations without using multiplications, and thus allows reduction of processing amount.

As is the case with the sixth embodiment, the equation 5 is used for generating a predictive image with reference to two pictures at a time, and the equation 6 or the equation 7 is used for generating a predictive image with reference to only one picture. Since these equations require identifiers indicating plus and minus signs, weighting coefficient sets required for prediction operations are (sign1, m, sign2, n, c) for the equations 5 and 6, and (sign1, m, c) for the equation 7. "sing1" and "sign2" are parameters identifying the first and second plus and minus signs, respectively. Although the number of parameters is larger than that in the third embodiment, there is little increase in processing amount because both sign1 and sign2 can be represented by 1 bit.

Here, the flow of processing from determination of weighting coefficient sets until generation of a predictive image with reference to two pictures at a time using the equation 5 will be explained in detail.

First, the case where the functional structure for generation of a predictive image is that as shown in FIG. 18 will be explained. The average calculation unit 204$a$ obtains the weighting coefficient set (sign1_1, m_1, sign2_1, n_1, c_1) from the linear prediction coefficient storage unit 206$a$.

Also, the average calculation unit 204a obtains the weighting coefficient set (sign1_2, m_2, sign2_2, n_2, c_2) from the linear prediction coefficient storage unit 206b.

The average calculation unit 204a calculates, for respective parameters, the average of the weighting coefficient sets obtained from the linear prediction coefficient storage unit 206a and the linear prediction coefficient storage unit 206b so as to consider the average as the weighting coefficient set (sign1, m, sign2, n, c). The linear prediction operation unit 204b calculates the predictive image using the equation 5 based on the weighting coefficient set (sign1, m, sign2, n, c) outputted from the average calculation unit 204a.

Note that FIG. 18 shows the weighting coefficient set (w1_1, w2_1, c_1, d_1) and the like obtained from the linear prediction coefficient storage unit 206a and the like, which are calculated in the case where the equation 1 is used as explained in the sixth embodiment, and does not show the parameters used in the case where the predictive image is obtained using the equation 5, but the parameters used in the former case can be replaced by the parameters in the latter case as they are. The same goes for the cases of FIG. 19 and FIG. 20 to be described later.

Next, the case where the functional structure for generation of a predictive image is that as shown in FIG. 19 will be explained. The linear prediction operation unit 204c calculates a predictive image 1 based on the weighting coefficient set (sign1_1, m_1, sign2_1, n_1, c_1) obtained from the linear prediction coefficient storage unit 206a. The linear prediction operation unit 204d calculates a predictive image 2 based on the weighting coefficient set (sign1_2, m_2, sign2_2, n_2, c_2) obtained from the linear prediction coefficient storage unit 206b. And the average calculation unit 204e calculates, for respective pixels, the average of the predictive images calculated by the linear prediction operation units 204c and 204d respectively so as to obtain a predictive image.

In this case, the linear prediction operation unit 204c first calculates the predictive image using the equation 5 based on the weighting coefficient set (sign1_1, m_1, sign2_1, n_1, c_1), so it is possible to calculate the predictive image using bit shift operations without using multiplications. The same goes for the linear prediction operation unit 204d. On the other hand, in the case of FIG. 18, since the average of the weighting coefficient set (sign1_1, m_1, sign2_1, n_1, c_1) and the weighting coefficient set (sign1_2, m_2, sign2_2, n_2, c_2) is calculated first, the average of m_1 and m_2 or the average of n_1 and n_2, namely, the exponents of 2, could not be integers, and thus there is a possibility that the processing amount increases. Also, if the exponents of 2 are rounded off to integers, there is another possibility that the error increases.

Next, the case where a predictive image is generated in the functional structure as shown in FIG. 20A will be explained. The linear prediction operation unit 204g calculates a predictive image using the equation 5, based on the parameters sign1_1 and m_1 which are obtained from the linear prediction coefficient storage unit 206c and used for bit shift operations; the parameters sign2_2 and n_2 which are obtained from the linear prediction coefficient storage unit 206d and used for bit shift operations; and the average c calculated by the average calculation unit 204f, of the parameters c_1 and c_2 which are obtained from the linear prediction coefficient storage units 206c and 206d.

In this case, since the coefficients used for bit shift operations are the values which are obtained directly from the linear prediction coefficient storage unit 206c or the linear prediction coefficient storage unit 206d, the exponents of 2 in the equation 5 are integers. Therefore, the calculations can be performed using bit shift operations, and thus the processing amount can be reduced.

The case where a predictive image is generated in the functional structure as shown in FIG. 20B will be explained. The linear prediction operation unit 204h calculates a predictive image using the equation 5 based on the parameters sign1_1, m_1 and c_1 which are obtained from the linear prediction coefficient storage unit 206e and the parameters sign2_2 and n_2 which are obtained from the linear prediction coefficient storage unit 206f.

In this case, since the coefficients used for bit shift operations are values which are obtained directly from the linear prediction coefficient storage unit 206e or the linear prediction coefficient storage unit 206f, the exponents of 2 in the equation 5 are integers. Therefore, the predictive image can be calculated using bit shift operations, and thus the processing amount can be reduced.

In the cases of FIGS. 20A and 20B, there are parameters which do not need to be added to the coded stream for transmission, as is the case with the cases of FIGS. 10A and 10B in the sixth embodiment, and the data amount of the coded stream can be reduced.

Using the linear prediction equations as explained in the seventh embodiment, the calculations can be performed using bit shift operations without using multiplications, so the processing amount can be significantly reduced from that in the sixth embodiment.

In the present embodiment, linear prediction is performed using the equations 5, 6 and 7 instead of the equations 1, 3 and 4, and using the parameter set to be coded (sign1, m, sign2, n, c) instead of (w1, w2, c, d), so the calculations can be realized only using bit shift operations and thus reduction of processing amount is achieved. However, it is also possible, as another approach, to use the equations 1, 3 and 4 and (w1, w2, c, d) as they are, by limiting the selectable values of w1 and w2 to only the values available for bit shift operations, so the calculations can be realized only using bit shift operations and thus reduction of processing amount is achieved in exactly the same structure as that in the sixth embodiment.

In addition, as a method for such limitation, it is possible to limit the values of w1 and w2 so that 1 is always selected for such values and input a coded stream having arbitrary values of only c1 and c2 which are DC components. Taking the structure of FIG. 21 as an example, (1, c_1) for ref1 and (1, c_2) for ref2 shall be coded as parameter sets. In this case, the pixel value P(i) of the predictive image is calculated by the following equation in which w1_1 and w2_2 in the equation 1a are substituted for 1.

$$P(i)=(Q1(i)+Q2(i))/\text{pow}(2,d)+(c\_1+c\_2)/2$$

(where pow(2, d) indicates the "d"th power of 2)

Accordingly, it is possible to significantly reduce the processing amount for linear prediction even in exactly the same structure as that of the sixth embodiment.

In addition, as shown in FIG. 24, in the case where a flag sft_flg, indicating whether it is possible or not to perform linear prediction using only bit shift operations, and a flag dc_flg, indicating whether it is possible or not to perform linear prediction using only c that is a DC component, are described in picture common information of a coded stream of a picture, the decoding apparatus can perform decoding, referring to these flags, in the structure suitable for linear prediction using only bit shift operations or decoding in the structure suitable for linear prediction using only a DC component. Accordingly, processing amount can be reduced significantly depending on the structure of the decoding apparatus.

Eighth Embodiment

The moving picture decoding method in the eighth embodiment of the present invention will be explained. Since the structure of the decoding apparatus, the flow of decoding processing and the reference index assignment method are exactly same as those in the sixth embodiment, the explanation thereof is not repeated here.

As explained in the background art, there is a method for generating a predictive image using a predetermined fixed equation such as the equation 2a and the equation 2b, unlike the sixth and seventh embodiments in which a predictive image is generated using a prediction equation obtained from weighting coefficient sets of linear prediction coefficients. This conventional method has an advantage that a data amount for coding can be reduced because there is no need to code and transmit the weighting coefficient set used for generating the predictive image. Also, the processing amount for linear prediction can be significantly reduced because the equations for linear prediction are simple. However, this method using the fixed equations has a problem that prediction accuracy is lowered because there are only two selectable linear prediction equations 2a and 2b.

So, the equations 8a and 8b, instead of the equations 2a and 2b, are used in the present embodiment. These equations 8a and 8b are obtained by adding C1 and C2 to the equations 2a and 2b. Since only the number of additions increases for the operation, there is little increase in processing amount, compared with the original equations 2a and 2b.

The equations 8a and 8b are prediction equations for generating a predictive image with reference to two pictures at a time, but when generating a predictive image with reference to only one picture, the equation 9 is used instead of the equation 3 or 4 as explained in the above embodiments.

The weighting coefficient sets for using this method are only (C1) for ref1 and (C2) for ref2. Therefore, an example of a coded stream of a picture obtained using this method is as shown in FIG. 14. In the slice header area, the weighting coefficient sets for linear prediction (pset0, pset1, pset2, . . . ) are described separately for ref1 and ref2, and each of the weighting coefficient sets includes only C. Similarly, FIG. 15 shows an example of weighting coefficient sets included in the slice header area. Differently from FIG. 7, each of the weighting coefficient sets in FIG. 15 includes only C.

Figure 22:
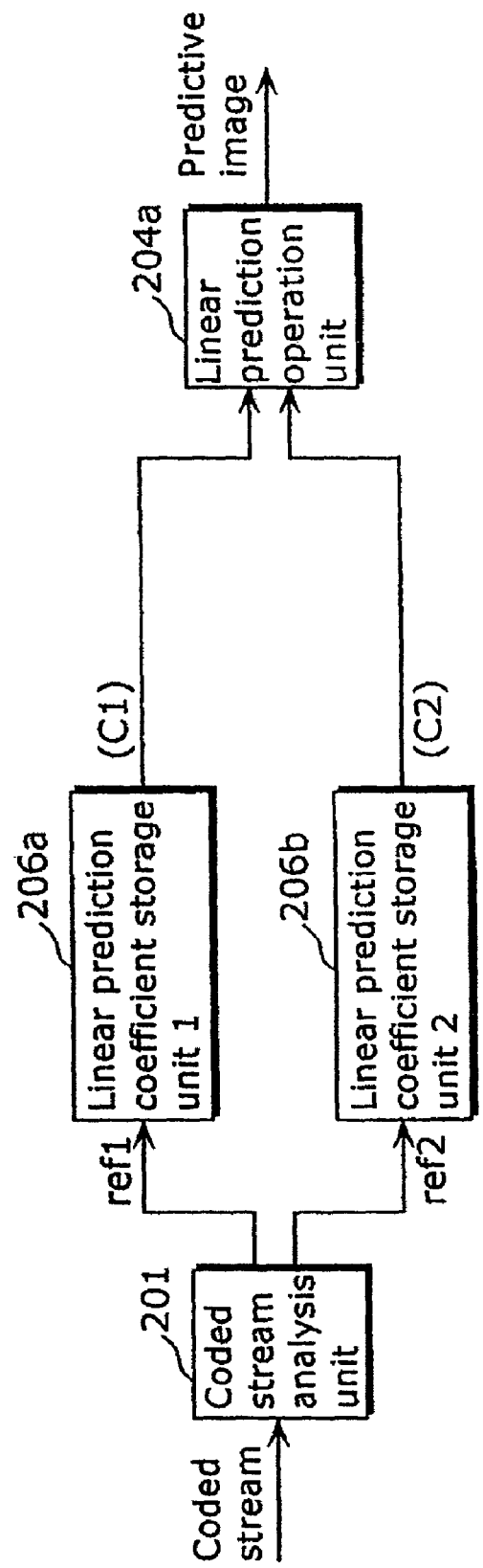
FIG. 22 is still another functional block diagram showing generation of a predictive image in the decoding apparatus.

FIG. 22 is a block diagram showing the functional structure for generating a predictive image via the linear prediction coefficient storage unit 206 and the motion compensation decoding unit 204 in FIG. 2.

A predictive image is generated via the linear prediction coefficient storage unit 206a, the linear prediction coefficient storage unit 206b and the linear prediction operation unit 204a.

The weighting coefficient sets (C1) and (C2) having one element respectively are obtained from the linear prediction coefficient storage units 206a and 206b by the first reference index ref1 and the second reference index ref2 outputted from the coded stream analysis unit 201. These values are inputted to the linear prediction operation unit 204a, where linear prediction is performed on them using the equations 8a and 8b, and then the predictive image is generated.

Similarly, when linear prediction is performed with reference to only one picture, either one of the weighting coefficient sets (C1) and (C2) is obtained using only one of ref1 and ref2 in FIG. 22, linear prediction is performed using the equation 9, and then a predictive image is generated.

Since the present embodiment requires only one parameter to be used for each of ref1 and ref2, the data amount to be described in the coded stream can be reduced. Also, since the linear prediction equations do not require complex operations such as multiplications, the operation amount can also be minimized. In addition, the use of the coefficients C1 and C2 allows dramatic improvement of the low prediction accuracy, which is considered as a disadvantage of the conventional method of using fixed equations.

Note that it is possible to use the linear prediction method as explained in the present embodiment, regardless of whether a plurality of reference indices can refer to the same picture or not.

Ninth Embodiment

The moving picture decoding method in the ninth embodiment of the present invention will be explained. Since the structure of the decoding apparatus, the flow of decoding processing and the reference index assignment method are exactly the same as the sixth embodiment, the explanation thereof is not repeated here.

Display order information indicating display time or the alternative thereto as well as a picture number are assigned to each picture. FIG. 39 is a diagram showing an example of picture numbers and the corresponding display order information. Certain values are assigned to the display order information according to display order. In this example, the value which increases one by one for each picture is used. A method for generating values of coefficients used in an equation for linear prediction using this display order information will be explained in the ninth embodiment.

In the sixth embodiment, linear prediction is performed for each pixel using the equation 1, the equation 3 or the equation 4 when generating a predictive image in motion compensation. However, since the linear prediction requires data of coefficients, such coefficient data is described in slice header areas in a coded stream as weighting coefficient sets for use for creation of the predictive image. Although this method achieves high coding efficiency, it requires additional processing for creating data of the weighting coefficient sets and causes increase in bit amount because the weighting coefficient sets are described in the coded stream.

So, it is also possible to perform linear prediction using the equation 10, equation 11a or the equation 12a instead of the equation 1. Using these equations, the weighting coefficients can be determined based on only the display order information of each reference picture, so there is no need to code the weighting coefficient sets separately.

When it is assumed, as an example, that the current picture to be decoded is No. 16, the picture designated by the first reference index is No. 11, and the picture designated by the second reference index is No. 10, the display order information of respective pictures are 15, 13 and 10, and thus the following linear prediction equations are determined.

$$V1=(10-15)/(10-13)=5/3$$

$$V2=(15-13)/(10-13)=-2/3$$

$$P(i)=5/3 \times Q1(i) - 2/3 \times Q2(i)$$

Compared with the method for performing linear prediction using weighting coefficient sets in the equation 1, the above equations have lower flexibility of coefficient values, and thus it can be said that it is impossible to create the optimum predictive image. However, compared with the method of switching the two fixed equations 2a and 2b depending on the positional relationship between two reference pictures, the above equations are more efficient linear prediction equations.

When both the first reference index and the second reference index refer to the same picture, the equation 11a and the equation 12a do not hold because T1 becomes equal to T2. So, when the two reference pictures have the same display order information, linear prediction shall be performed using ½ as the values of V1 and V2. In that case, the linear prediction equations are as follows.

$$V1=\tfrac{1}{2}$$

$$V2=\tfrac{1}{2}$$

$$P(i)=\tfrac{1}{2}\times Q1(i)+\tfrac{1}{2}\times Q2(i)$$

Also, the equations 11a and 12a do not hold because T1 becomes equal to T2 when the first reference index and the second reference index refer to difference pictures but these pictures have the same display order information. When the two reference pictures have the same display order information as mentioned above, linear prediction shall be performed using ½ as the values of V1 and V2.

As described above, when two reference pictures have the same display order information, it is possible to use a predetermined value as a coefficient. Such predetermined coefficient may be one having the same weight like ½ as shown in the above example.

By the way, use of the equation 10 in the present embodiment requires multiplications and divisions for linear prediction. Since the linear prediction operation using the equation 10 is the operation on all the pixels in a current block to be decoded, addition of multiplications causes significant increase in the processing amount.

So, approximation of V1 and V2 to the powers of 2 like the case of the seventh embodiment makes it possible to perform linear prediction operation by only shift operations, and thus to achieve reduction of the processing amount. As the linear prediction equations for that case, the equations 11b and 12b are used instead of the equations 11a and 12a.

Note that it is also possible to use the equations 11c and 12c instead of the equations 11a and 12a.

Note that it is also possible to use the equations 11d and 12d instead of the equations 11a and 12a.

Note that the value of V1 and V2 approximated to the power of 2 shall be, taking the equation 11b as an example, the value of $\pm\text{pow}(2, v1)$ obtained when the values of $\pm\text{pow}(2, v1)$ and $(T2-T0)/(T2-T1)$ are mostly approximated to each other as the value of v1 changes one by one.

For example, in FIG. 39, when a current picture to be decoded is No. 16, the picture designated by the first reference index is No. 11, and the picture designated by the second reference index is No. 10, the display order information of the respective pictures are 15, 13 and 10, so $(T2-T0)/(T2-T1)$ and $\pm\text{pow}(2, v1)$ are as follows.

$$(T2-T0)/(T2-T1)=(10-15)/(10-13)=5/3$$

$$+\text{pow}(2,0)=1$$

$$+\text{pow}(2,1)=2$$

Since 5/3 is close to 2 rather than 1, V1=2 is obtained as a result of approximation.

As another method of approximation, it is also possible to switch between round-up approximation and round-down approximation depending on the relationship between two values of display order information T1 and T2.

In that case, round-up approximation is performed on both V1 and V2 when T1 is later than T2, and round-down approximation is performed on both V1 and V2 when T1 is earlier than T2. It is also possible, in a reverse manner, to perform round-down approximation on both V1 and V2 when T1 is later than T2, and round-up approximation on both V1 and V2 when T1 is earlier than T2.

As another approximation method using display order information, round-up approximation is performed in an equation for V1 and round-down approximation is performed in an equation for V2 when T1 is later than T2. As a result, the difference between the values of the two coefficients becomes large, so it is likely that values suitable for extrapolation are obtained. On the contrary, when T1 is earlier than T2, the value in the equation for V1 and the value in the equation for V2 are compared, and then round-up approximation is performed on the smaller value and round-down approximation is performed on the larger value. As a result, the difference between the values of the two coefficients becomes small, so it is likely that values suitable for interpolation are obtained.

For example, in FIG. 39, when a current picture to be decoded is No. 16, the picture designated by the first reference index is No. 11, and the picture designated by the second reference index is No. 10, the display order information of the respective pictures are 15, 13 and 10. Since T1 is later than T2, round-up approximation is performed on the equation for V1 and round-down approximation is performed on the equation for V2. As a result, the equations 11b and 12b are calculated as follows.

$$(T2-T0)/(T2-T1)=(10-15)/(10-13)=5/3$$

$$+\text{pow}(2,0)=1$$

$$+\text{pow}(2,1)=2 \quad\quad\quad\quad (1)\ \text{Equation 11b}$$

As a result of round-up approximation, V1=2 is obtained.

$$(T0-T1)/(T2-T1)=(15-13)/(10-13)=-\tfrac{2}{3}$$

$$-\text{pow}(2,0)=-1$$

$$\text{pow}(2,-1)=-\tfrac{1}{2} \quad\quad\quad\quad (2)\ \text{Equation 12b}$$

As a result of round-down approximation, V2=−1 is obtained.

Note that although the equation 10 is only one equation for liner prediction in the above embodiments, it is also possible to combine this method with the linear prediction method by use of two fixed equations 2a and 2b as explained in the background art. In that case, the equation 10 is used instead of the equation 2a, and the equation 2b is used as it is. To be more specific, the equation 10 is used when the picture designated by the first reference index appears behind the picture designated by the second reference index in display order, whereas the equation 2b is used in other cases.

It is also possible, on the contrary, to use the equation 10 instead of the equation 2b and use the equation 2a as it is. To be more specific, the equation 2a is used when the picture designated by the first reference index appears behind the picture designated by the second reference index, and the equation 10 is used in other cases. However, when the two reference pictures have the same display order information, linear prediction is performed using ½ as the values of V1 and V2.

It is also possible to describe only the coefficient C in the slice header areas to be used for linear prediction, in the same manner as the concept of the eighth embodiment. In that case, the equation 13 is used instead of the equation 10. V1 and V2 are obtained in the same manner as the above embodiments.

The processing for generating coefficients is needed, and further the coefficient data needs to be decoded into the slice header area, but use of C1 and C2 allows more accurate linear prediction even if the accuracy of V1 and V2 is low. This is effective particularly in the case where V1 and V2 are approximated to the powers of 2 for linear prediction.

Note that using the equation 13, the linear prediction can be performed in the same manner in both cases where one reference index is assigned to one picture and a plurality of reference indices are assigned to one picture.

In the calculation of the values in each of the equations 11a, 12a, 11b, 12b, 11c, 12c, 11d and 12d, the combinations of available values are limited to some extent in every slice. So, only one operation is enough for decoding a slice, unlike the equation 10 or the equation 13 in which the operation needs to be performed for all the pixels in a current block to be decoded, and thus there seems to be little influence on the entire processing amount.

Note that the display order information in the present embodiment is not limited to display order, but may be the actual display time, or the order of respective pictures starting from a predetermined picture, with its value increasing as the lapse of display time.

Tenth Embodiment

The moving picture decoding method in the tenth embodiment of the present invention will be explained. Since the structure of the decoding apparatus, the flow of decoding processing and the reference index assignment method are exactly same as the sixth embodiment, the explanation thereof is not repeated here.

In the conventional method, it is possible to switch, if necessary, between generation of a predictive image by use of fixed equations and generation of a predictive image by use of weighting coefficient sets of linear prediction coefficients, using flags described in a picture common information area in a coded stream.

In the present embodiment, another method for switching the various linear prediction methods as explained in the above sixth to ninth embodiments using flags will be explained.

FIG. 17A shows the structure used for the case where five flags (p_flag, c_flag, d_flag, t_flag, s_flag) for controlling the above switching are described in the slice header area in the coded stream.

As shown in FIG. 17B, p_flag is a flag indicating whether weighting coefficients have been coded or not. c_flag is a flag indicating whether only the data of the parameter C (C1 and C2), out of the parameters for ref1 and ref2, has been coded or not. t_flag is a flag indicating whether weighting coefficients for linear prediction are to be generated or not using the display order information of the reference pictures. And s_flag is a flag indicating whether the weighting coefficients for linear prediction are to be approximated to the powers of 2 or not for the calculation by use of shift operations.

Furthermore, d_flag is a flag indicating whether or not to switch two predetermined fixed equations like the equations 2a and 2b depending on the temporal positional relationship between the picture designated by ref1 and the picture designated by ref2, when linear prediction is performed using such two fixed equations. To be more specific, when this flag indicates the switching of the equations, the equation 2a is used in the case where the picture designated by ref1 is later than the picture designated by ref2 in display order and the equation 2b is used in other cases for performing linear prediction, as is the case with the conventional method. On the other hand, when this flag indicates no switching of the equations, the equation 2b is always used for linear prediction, regardless of the positional relationship between the picture designated by ref1 and the picture designated by ref2.

Note that even if the equation 2a is used instead of the equation 2b as an equation to be used without switching, the equation 2a can be handled in the same manner as the equation 2b.

In the decoding apparatus as shown in FIG. 2, the coded stream analysis unit 201 analyzes the value of the flag p_flag, and outputs, to the motion compensation decoding unit 204, the instruction indicating whether or not to decode the data concerning the weighting coefficient sets so as to generate a predictive image based on the result of the analysis, and then the motion compensation decoding unit 204 performs motion compensation by linear prediction. As a result, it is possible to use the weighting coefficient sets in a higher performance apparatus for performing linear prediction, and not to use the weighting coefficient sets in a lower performance apparatus for performing linear prediction.

Similarly, in the decoding apparatus as shown in FIG. 2, the coded stream analysis unit 201 analyzes the value of the flag c_flag, and outputs, to the motion compensation decoding unit 204, the instruction indicating whether or not to decode only the data concerning the parameter C (C1 and C2) corresponding to the DC components of image data so as to generate a predictive image by use of fixed equations, based on the result of the analysis, and then the motion compensation decoding unit 204 performs motion compensation by linear prediction. As a result, it is possible to use the weighting coefficient sets in a higher performance apparatus for performing linear prediction, and to use only the DC components in a lower performance apparatus for performing linear prediction.

Similarly, in the decoding apparatus as shown in FIG. 2, when the coded stream analysis unit 201 analyzes the value of the flag d_flag and linear prediction is performed using fixed equations based on the result of the analysis, the coded stream analysis unit 201 outputs the instruction indicating whether or not to switch two equations for decoding to the motion compensation decoding unit 204, in which motion compensation is performed. As a result, it is possible to switch the method, such that either one of the fixed equations is used for linear prediction in the case where there is little temporal change in brightness of a picture, and the two fixed equations are switched for linear prediction in the case where the brightness of the picture changes as time goes by.

Similarly, in the decoding apparatus as shown in FIG. 2, the coded stream analysis unit 201 analyzes the value of the flag t_flag and based on the result of the analysis, it outputs, to the motion compensation decoding unit 204, the instruction indicating whether or not to generate the coefficients for linear prediction using the display order information of the reference pictures, and the motion compensation decoding unit 204 performs motion compensation. As a result, it is possible for the coding apparatus to code the weighting coefficient sets for linear prediction in the case where more coding can be done, and to generate the coefficients from the display order information for linear prediction in the case where no more coding can be done.

Similarly, in the coding apparatus as shown in FIG. 2, the coded stream analysis unit 201 analyzes the value of the flag s_flag, and based on the result of the analysis, it outputs, to the motion compensation decoding unit 204, the instruction indicating whether or not to approximate the coefficients for linear prediction to the powers of 2 so as to allow the calculation of these coefficients by shift operations, and the motion compensation decoding unit 204 performs motion compensation. As a result, it is possible to use the weighting coefficients without being approximated in a higher performance apparatus for performing linear prediction, and to use the weighting coefficients with being approximated to the powers of 2 in a lower performance apparatus for performing linear prediction which can be realized by shift operations.

For example, the case of (1) (p, c, d, t, s_flag)=(1, 0, 0, 0, 1) shows that all the weighting coefficient sets are decoded and linear prediction is performed by only shift operations by representing the coefficients as the powers of 2 as explained in the seventh embodiment, so as to generate a predictive image.

The case of (2) (p, c, d, t, s_flag)=(1, 1, 1, 0, 0) shows that only the data concerning the parameter C (C1 and C2) is decoded, the method for generating a predictive image by adding the coefficient C to the fixed equations as explained in the eighth embodiment is used, and further the two fixed equations are switched for use.

In the case of (3) (p, c, d, t, s_flag)=(0, 0, 0, 0, 0), no weighting coefficient set is decoded. In other words, it shows that the method for generating a predictive image using only the equation 2b, out of the fixed equations as the conventional method, is used.

The case of (4) (p, c, d, t, s_flag)=(0, 0, 1, 1, 1) shows that no weighting coefficient set is decoded, but linear prediction is performed by only shift operations by generating the weighting coefficients from the display order information of the reference pictures and further approximating the coefficients to the powers of 2, as explained in the ninth embodiment, and then the two fixed equations are switched for use, so as to generate a predictive image.

Note that in the present embodiment, the determinations are made using five flags (p_flag, c_flag, d_flag, t_flag, s_flag), each of which is 1 bit, but it is also possible to represent the determinations with only one flag of 5 bits, instead of these five flags. In that case, decoding by use of variable length decoding is available, not by representation with 5 bits.

Note that in the present embodiment, all the five flags (p_flag, c_flag, d_flag, t_flag, s_flag), each of which is 1 bit, are used, but the same can be applied to the case where linear prediction method is switched only using some of these flags. In that case, the flags necessary for the linear prediction are only coded and described, out of the flags as shown in FIG. 17A.

In the conventional method, a flag is provided in a picture common information area of a coded stream for switching between generation of a predictive image by use of fixed equations and generation of a predictive image by use of weighting coefficient sets of linear prediction coefficients, so as to allow the switching between them on a picture-by-picture basis. However, in this method, the predictive image generation method can only be switched on a picture-by-picture basis.

On the contrary, in the present embodiment as mentioned above, it is possible to switch the method for generating a predictive image for each slice that is a subdivision of a picture by providing the switching flag in a slice header of a coded stream. Therefore, it is possible, for example, to generate the predictive image by use of the weighting coefficient sets in a slice containing complex images, whereas to generate the predictive image by use of the fixed equations in a slice containing simple images. As a result, the image quality can be improved while minimizing the increase in processing amount.

Note that in the present embodiment, five flags (p_flag, c_flag, d_flag, t_flag, s_flag) are described in a slice header area for the determination of the method in each slice, but it is also possible to switch the determination on a picture-by-picture basis by describing these flags in the picture common information area. In addition, it is also possible to generate a predictive image by the optimum method on a block-by-block basis by providing the switching flag on each block being a subdivision of a slice.

Note that the display order information in the present embodiment is not limited to display order, but may be the actual display time, or the order of respective pictures starting from a predetermined picture, with its value increasing as the lapse of display time.

Eleventh Embodiment

The moving picture coding method and the moving picture decoding method in the eleventh embodiment of the present invention will be explained. Since the structures of the coding apparatus and the decoding apparatus, the flows of coding processing and decoding processing, and the reference index assignment method are exactly the same as those in the first and sixth embodiments, the explanation thereof is not repeated here.

In the present embodiment, the technology which is similar to that explained in the fifth and tenth embodiments will be explained.

The flag p_flag indicating whether a parameter set is coded or not and the flag c_flag indicating whether only the data concerning the parameter C (C1 and C2) is coded or not, out of the parameters for ref1 and ref2, are described in each slice.

Figures 40A, 40B:
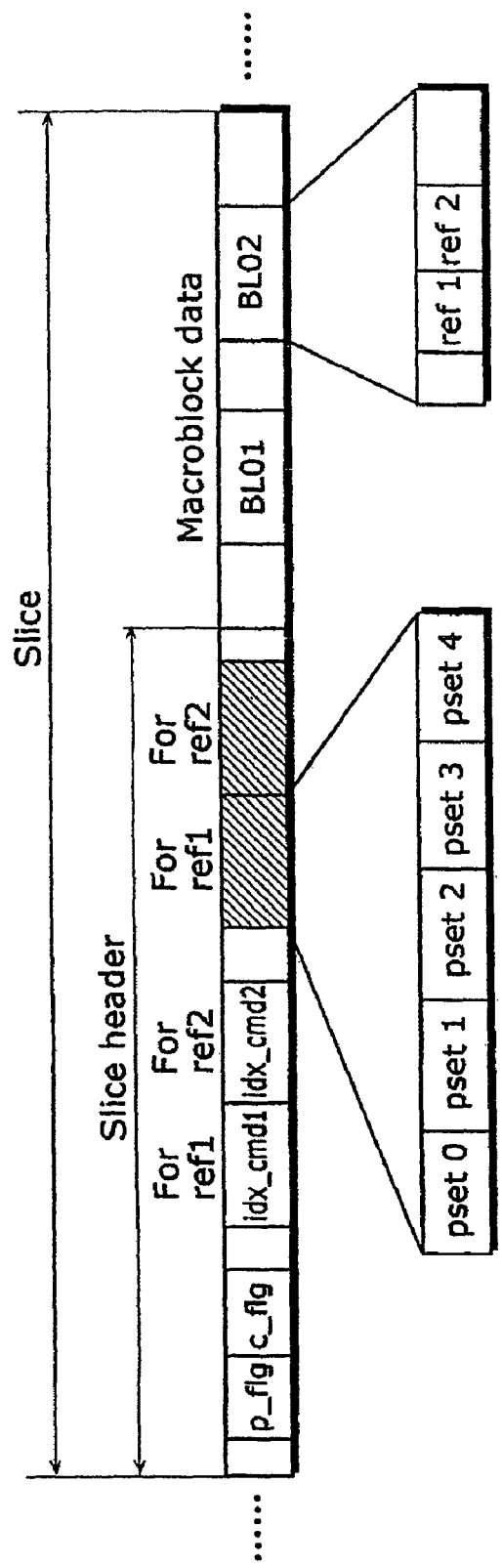
FIGS. 40A and 40B are schematic diagrams for explaining a structure of a coded stream and an example of flags.

In the coding apparatus as shown in FIG. 1, the motion compensation coding unit 107 determines, on a slice-by-slice basis or a block-by-block basis, whether or not to code the data concerning the parameter set, and outputs, based on the determination, the information of the flag p_flag to the coded stream generation unit 103, in which that information is described into the coded stream, as shown in FIG. 40A.

Similarly, in the coded apparatus as shown in FIG. 1, the motion compensation coding unit 107 determines, on a slice-by-slice basis or a block-by-block basis, whether or not to code only the data concerning the parameter C (C1 and C2) corresponding to the DC components of image data, and outputs, based on the determination, the information of the flag c_flag to the coded stream generation unit 103, in which the information is described into the coded stream, as shown in FIG. 40A.

On the other hand, in the decoding apparatus as shown in FIG. 2, the coded stream analysis unit 201 analyzes the values of the switching flags p_flag and c_flag, and based on the analysis, outputs, to the motion compensation decoding unit 204, the instruction indicating whether to generate a predictive image by use of the downloaded parameter sets, or to generate a predictive image by use of fixed equations, for example, and the motion compensation decoding unit 204 performs motion compensation by linear prediction.

For example, as shown in FIG. 40B, (1) when the flag p_flag is 1 and the flag c_flag is 0, the coding apparatus codes all the parameter sets, (2) when the flag p_flag is 1 and the flag c_flag is 1, the coding apparatus codes only the data concerning the parameter C (C1 and C2), and further (3) when the flag p_flag is 0 and the flag c_flag is 0, the coding apparatus does not code any parameter sets. Note that by determining the flag values as shown in FIG. 40B, it can be found whether the DC component of the image data has been coded or not using the value of the flag p_flag.

The coding apparatus processes the parameters as explained in FIG. 8 to FIG. 10, for example, in the above case (1). It processes the parameters as explained in FIG. 16, for example, in the above case (2). It processes the parameters using fixed equations, for example, in the above case (3).

The decoding apparatus processes the parameters as explained in FIG. 18 to FIG. 20, for example, in the above case (1). It processes the parameters as explained in FIG. 22, for example, in the above case (2). It processes the parameters using fixed equations, for example, in the above case (3).

Another example of a combination of the above cases (1) to (3) will be explained specifically.

In the above example, coding of parameters (whether or not to have the decoding apparatus receive the parameters) is switched explicitly using the flags p_flag and c_flag, but it is also possible to use a variable length coding table (VLC table) instead of the above flags.

Figures 41A, 41B:
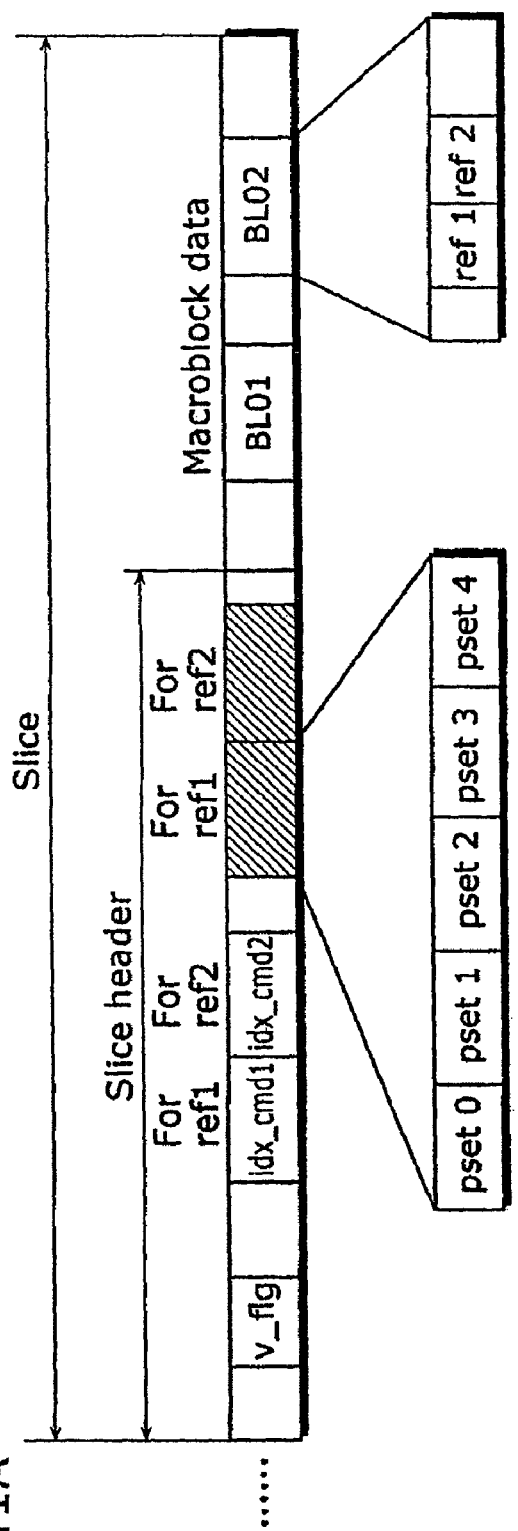
FIGS. 41A and 41B are schematic diagrams for explaining a structure of a coded stream and an example of flags.

As shown in FIGS. 41A and 41B, it is also possible to select explicitly whether to switch between the fixed equation 2a and the fixed equation 2b.

Here, no switching of the equation 2 means the following. It is explained in the background art, for example, that, in order to generate a predictive image, the fixed equation 2a including fixed coefficients is selected when the picture designated by the first reference index appears behind in display order the picture designated by the second reference index, and the equation 2b including fixed coefficients is selected in other cases. On the other hands, when it is instructed, as shown in the example of FIG. 41B, not to switch the equation, it means that the fixed equation 2b including fixed coefficients is selected even when the picture designated by the first reference index appears behind in coding order the picture designated by the second reference index so as to generate a predictive image.

The information of the flag v_flag for selecting explicitly whether to switch between the fixed equation 2a and the fixed equation 2b is outputted from the coded stream generation unit 103 and described in the coded stream as shown in FIG. 41A.

FIG. 41B shows an example of processing by use of the flag v_flag. As shown in FIG. 41B, when the flag v_flag is 1, the parameters are not coded (the parameters are not downloaded on the decoding apparatus. The same goes for the following.), and the fixed equation 2 is not switched. When the flag v_flag is 01, the parameters are not coded, and the fixed equation 2 is switched. When the flag v_flag is 0000, only the parameter C is coded, and the equation 2 is not switched.

Further, when the flag v_flag is 0001, only the parameter C is coded, and the equation 2 is switched. When the flag v_flag is 0010, all the parameters are coded, and the equation 2 is not switched. When the flag v_flag is 0011, all the parameters are coded, and the fixed equation 2 is switched.

Note that since all the parameters are coded when v_flag is 0010 and 0011, it is possible to perform linear prediction using weighting parameters, without using fixed equations, and in that case, the determination of whether to switch the fixed equation or not for use is ignored.

Note that the flag v_flag can be switched by the motion compensation coding unit 107 in the coding apparatus as shown in FIG. 1 and the motion compensation decoding unit 204 in the decoding apparatus as shown in FIG. 2. It is also possible to use the flag d_flag indicating whether to switch the fixed equation or not, instead of the flag v_flag, in addition to the above flags p_flag and c_flag.

As described above, use of flags allows switching of whether or not the decoding apparatus receives (downloads) coded parameters after the coding apparatus codes the parameters. As a result, the parameters to be coded (or received) can be switched explicitly according to the characteristics of the application and the performance of the decoding apparatus.

In addition, since the fixed equation can be switched explicitly, the variety of means for improving the image quality is increased, and thus the coding efficiency is also improved. Also, even if the decoding apparatus does not have a fixed equation, it can switch to the fixed equation explicitly, and thus generate a predictive image using the explicitly selected fixed equation.

Note that the placement of the flags is not limited to that as shown in FIG. 40. Also, the values of the flags are not limited to those as explained above. Furthermore, since four types of uses of parameters can be explicitly shown using two types of flags, the parameters may be assigned in the manners other than those as explained above. In addition, all the parameters are transmitted in the above example, but all the necessary parameter sets may be transmitted, as explained in FIG. 10 and FIG. 20, for example.

Twelfth Embodiment

If a program for realizing the structures of the picture coding method or the picture decoding method as shown in each of the above embodiments is recorded on a memory medium such as a flexible disk, it becomes possible to perform the processing as shown in each of the embodiments easily in an independent computer system.

Figure 25A:
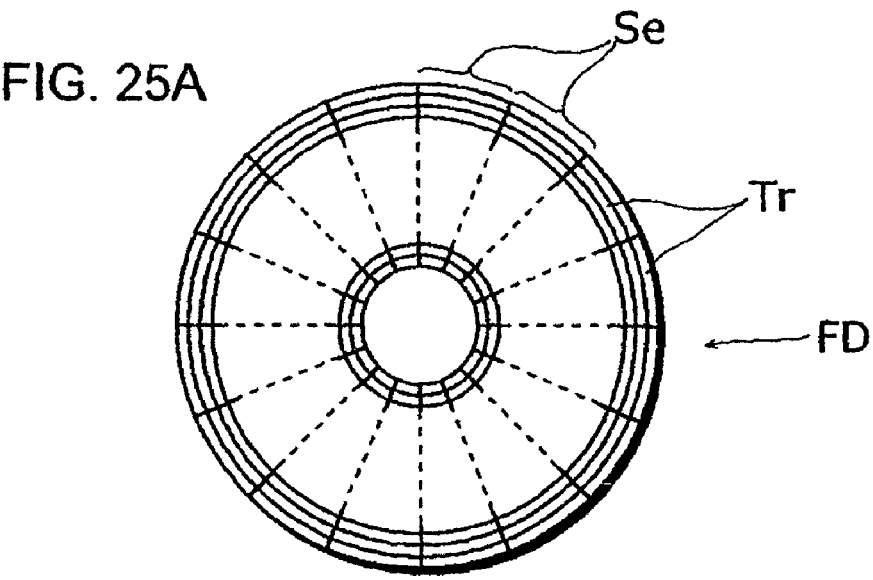
FIGS. 25A, B and C are illustrations of a recording medium for storing a program for realizing the moving picture coding method and moving picture decoding method in each of the above-mentioned embodiments using a computer system.
Figure 25B:
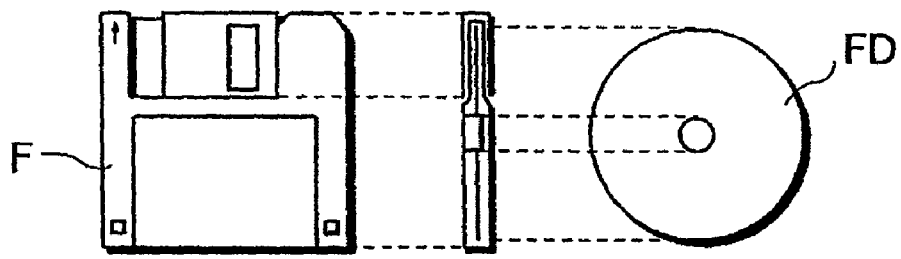
Figure 25C:
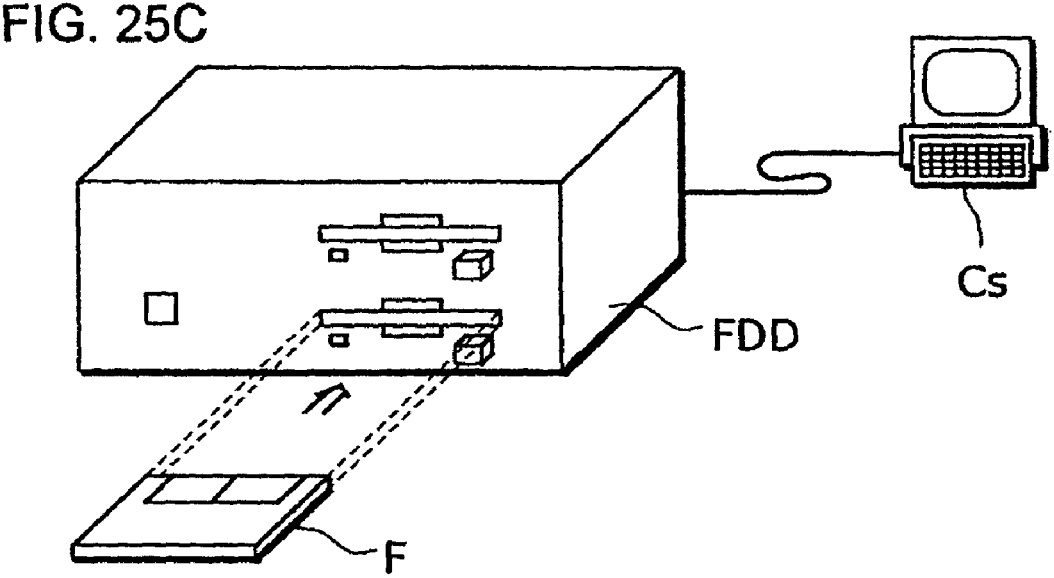

FIGS. 25A, 25B and 25C are illustrations showing the case where the processing is performed in a computer system using a flexible disk which stores the picture coding method or the picture decoding method of the above first to eleventh embodiments.

FIG. 25B shows a front view and a cross-sectional view of an appearance of a flexible disk, and the flexible disk itself, and FIG. 25A shows an example of a physical format of a flexible disk as a recording medium body. The flexible disk FD is contained in a case F, and a plurality of tracks Tr are formed concentrically on the surface of the disk in the radius direction from the periphery and each track is divided into 16 sectors Se in the angular direction. Therefore, as for the flexible disk storing the above-mentioned program, the picture coding method as the program is recorded in an area allocated for it on the flexible disk FD.

FIG. 25C shows the structure for recording and reproducing the program on and from the flexible disk FD. When the program is recorded on the flexible disk FD, the picture coding method or the picture decoding method as a program is written in the flexible disk from the computer system Cs via a flexible disk drive. When the picture coding method is constructed in the computer system by the program on the flexible disk, the program is read out from the flexible disk using the flexible disk drive and transferred to the computer system.

The above explanation is made on the assumption that a recording medium is a flexible disk, but the same processing can also be performed using an optical disk. In addition, the recording medium is not limited to a flexible disk and an optical disk, but any other medium such as an IC card and a ROM cassette capable of recording a program can be used.

Thirteenth Embodiment

FIG. 26~FIG. 29 are illustrations of devices for performing the coding processing or the decoding processing as described in the above embodiments and a system using them.

Figure 26:
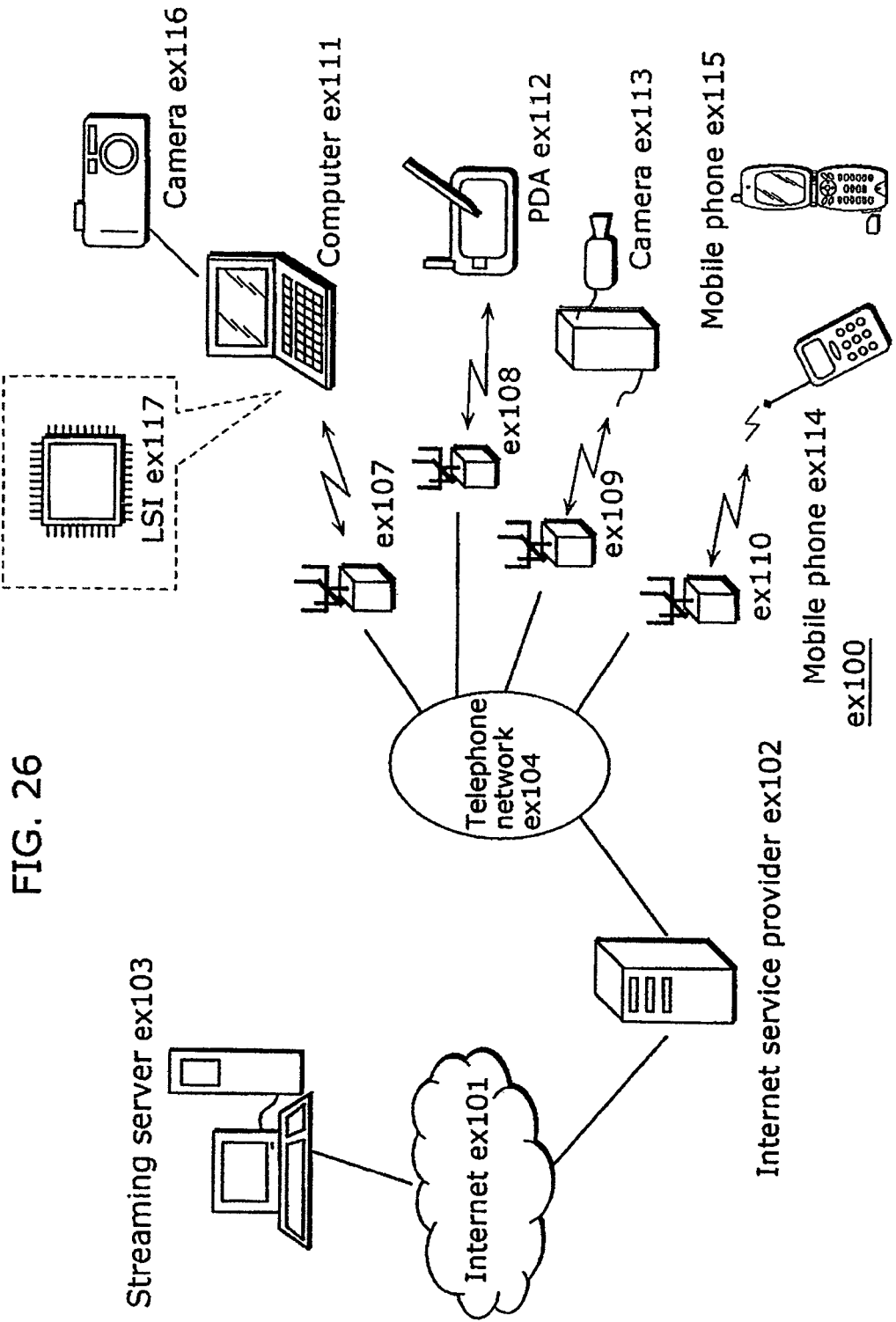
FIG. 26 is a block diagram showing an overall configuration of a content supply system.

FIG. 26 is a block diagram showing the overall configuration of a content supply system ex100 for realizing content distribution service. The area for providing communication service is divided into cells of desired size, and base stations ex107 to ex110 which are fixed wireless stations are placed in respective cells.

In this content supply system ex100, devices such as a computer ex111, a personal digital assistant (PDA) ex112, a camera ex113, a mobile phone ex114 and a camera-equipped mobile phone ex115 are connected to the Internet ex101 via an Internet service provider ex102, a telephone network ex104 and base stations ex107 to ex110.

However, the content supply system ex100 is not limited to the configuration as shown in FIG. 26, and a combination of any of them may be connected. Also, each device may be connected directly to the telephone network ex104, not through the base stations ex107 to ex110.

The camera ex113 is a device such as a digital video camera capable of shooting moving pictures. The mobile phone may be a mobile phone of a personal digital communications (PDC) system, a code division multiple access (CDMA) system, a wideband-code division multiple access (W-CDMA) system or a global system for mobile communications (GSM) system, a personal handyphone system (PHS), or the like.

A streaming server ex103 is connected to the camera ex113 via the base station ex109 and the telephone network ex104, which allows live distribution or the like using the camera ex113 based on the coded data transmitted from a user. Either the camera ex113 or the server for transmitting the data may code the data.

Also, the moving picture data shot by a camera ex116 may be transmitted to the streaming server ex103 via the computer ex111. The camera ex116 is a device such as a digital camera capable of shooting still and moving pictures. Either the camera ex116 or the computer ex111 may code the moving picture data. An LSI ex117 included in the computer ex111 or the camera ex116 actually performs coding processing.

Software for coding and decoding moving pictures may be integrated into any type of a storage medium (such as a CD-ROM, a flexible disk and a hard disk) being a recording medium which is readable by the computer ex111 or the like. Furthermore, a camera-equipped mobile phone ex115 may transmit the moving picture data. This moving picture data is the data coded by the LSI included in the mobile phone ex115.

The content supply system ex100 codes contents (such as video of live music performance) shot by users using the camera ex113, the camera ex116 or the like in the same manner as the above embodiments and transmits them to the streaming server ex103, while the streaming server ex103 makes stream distribution of the content data to the clients at their request. The clients include the computer ex111, the PDA ex112, the camera ex113, the mobile phone ex114 and so on capable of decoding the above-mentioned coded data. In the content supply system ex100, the clients can thus receive and reproduce the coded data, and further the clients can receive, decode and reproduce the data in real time so as to realize personal broadcasting.

When each device in this system performs coding or decoding, the moving picture coding apparatus or the moving picture decoding apparatus, as shown in each of the above-mentioned embodiments, can be used.

A mobile phone will be explained as an example of the device.

Figure 27:
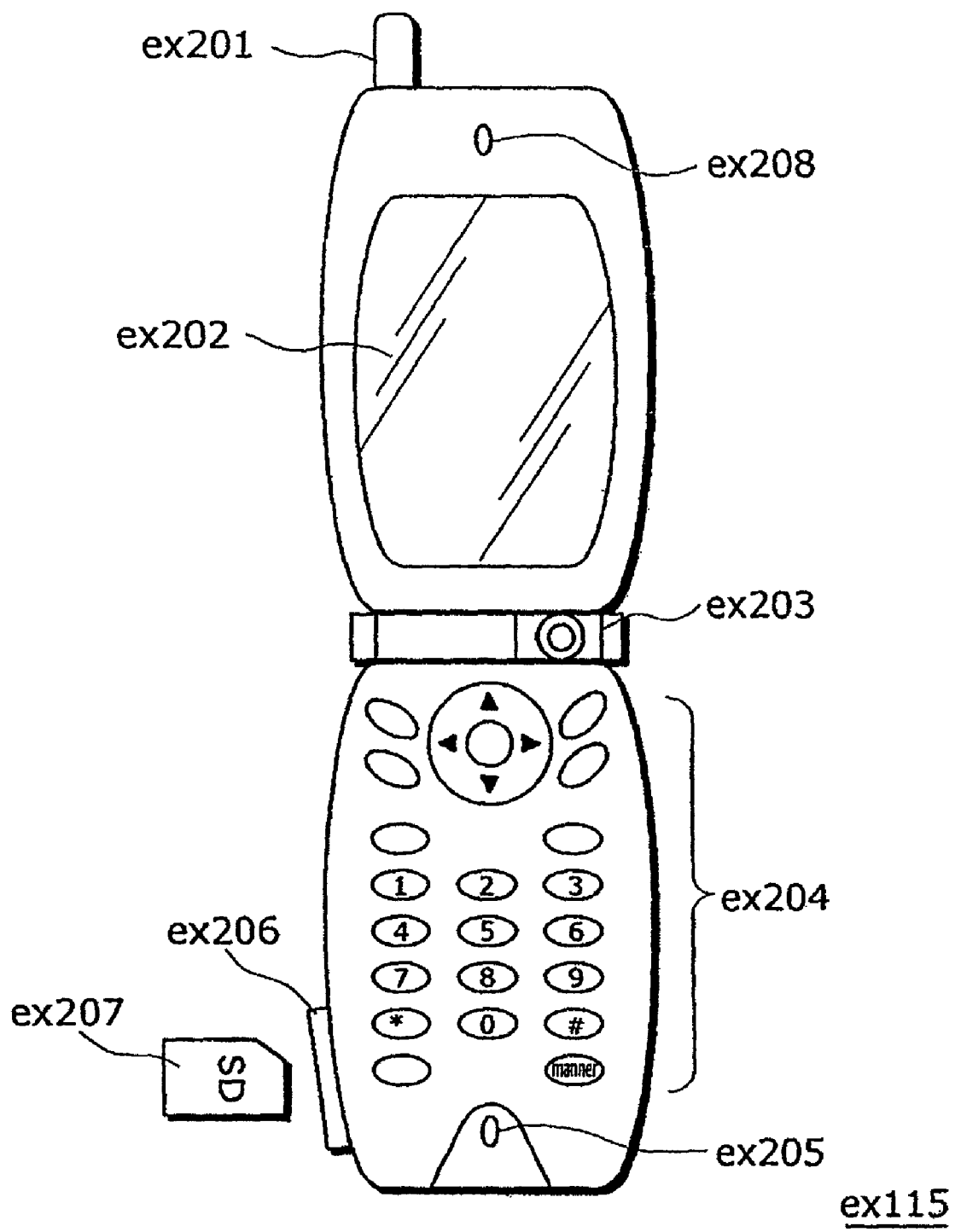
FIG. 27 is an external view of a mobile phone.

FIG. 27 is a diagram showing the mobile phone ex115 that uses the moving picture coding method and the moving picture decoding method explained in the above embodiments.

The mobile phone ex115 has an antenna ex201 for sending and receiving radio waves to and from the base station ex110, a camera unit ex203 such as a CCD camera capable of shooting video and still pictures, a display unit ex202 such as a liquid crystal display for displaying the data obtained by decoding video and the like shot by the camera unit ex203 and received via the antenna ex201, a body unit including a set of operation keys ex204, a voice output unit ex208 such as a speaker for outputting voices, a voice input unit 205 such as a microphone for inputting voices, a storage medium ex207 for storing coded or decoded data such as data of moving or still pictures shot by the camera, and text data and data of moving or still pictures of received e-mails, and a slot unit ex206 for attaching the storage medium ex207 to the mobile phone ex115. The storage medium ex207 includes a flash memory element, a kind of an electrically erasable and programmable read only memory (EEPROM) that is an electrically erasable and rewritable nonvolatile memory, in a plastic case such as an SD card.

The mobile phone ex115 will be further explained with reference to FIG. 28. In the mobile phone ex115, a power supply circuit unit ex310, an operation input control unit ex304, a picture coding unit ex312, a camera interface unit ex303, a liquid crystal display (LCD) control unit ex302, a picture decoding unit ex309, a multiplex/demultiplex unit ex308, a record/reproduce unit ex307, a modem circuit unit ex306 and a voice processing unit ex305 are connected to a main control unit ex311 structured for overall controlling the display unit ex202 and the body unit including the operation keys ex204, and they are connected to each other via a synchronous bus ex313.

When a call-end key or a power key is turned ON by a user's operation, the power supply circuit unit ex310 supplies respective units with power from a battery pack so as to activate the camera-equipped digital mobile phone ex115 for making it into a ready state.

In the mobile phone ex115, the voice processing unit ex305 converts the voice signals received by the voice input unit ex205 in conversation mode into digital voice data under the control of the main control unit ex311 including a CPU, ROM, RAM and others, the modem circuit unit ex306 performs spread spectrum processing of the digital voice data, and the send/receive circuit unit ex301 performs digital-to-analog conversion and frequency transform of the data, so as to transmit it via the antenna ex201. Also, in the mobile phone ex115, after the data received by the antenna ex201 in conversation mode is amplified and performed of frequency transform and analog-to-digital conversion, the modem circuit unit ex306 performs inverse spread spectrum processing of the data, and the voice processing unit ex305 converts it into analog voice data, so as to output it via the voice output unit 208.

Furthermore, when transmitting e-mail in data communication mode, the text data of the e-mail inputted by operating the operation keys ex204 on the body unit is sent out to the main control unit ex311 via the operation input control unit ex304. In the main control unit ex311, after the modem circuit unit ex306 performs spread spectrum processing of the text data and the send/receive circuit unit ex301 performs digital-to-analog conversion and frequency transform for it, the data is transmitted to the base station ex110 via the antenna ex201.

When picture data is transmitted in data communication mode, the picture data shot by the camera unit ex203 is supplied to the picture coding unit ex312 via the camera interface unit ex303. When the picture data is not transmitted, it is also possible to display the picture data shot by the camera unit ex203 directly on the display unit 202 via the camera interface unit ex303 and the LCD control unit ex302.

The picture coding unit ex312, which includes the picture coding apparatus as explained in the present invention, compresses and codes the picture data supplied from the camera unit ex203 by the coding method used for the picture coding apparatus as shown in the above embodiments so as to transform it into coded picture data, and sends it out to the multiplex/demultiplex unit ex308. At this time, the mobile phone ex115 sends out the voices received by the voice input unit ex205 during shooting by the camera unit ex203 to the multiplex/demultiplex unit ex308 as digital voice data via the voice processing unit ex305.

The multiplex/demultiplex unit ex308 multiplexes the coded picture data supplied from the picture coding unit ex312 and the voice data supplied from the voice processing unit ex305 by a predetermined method, the modem circuit unit ex306 performs spread spectrum processing on the multiplexed data obtained as a result of the multiplexing, and the send/receive circuit unit ex301 performs digital-to-analog conversion and frequency transform on the data for transmitting via the antenna ex201.

As for receiving data of a moving picture file which is linked to a Web page or the like in data communication mode, the modem circuit unit ex306 performs inverse spread spectrum processing of the signal received from the base station ex110 via the antenna ex201, and sends out the multiplexed data obtained as a result of the processing to the multiplex/demultiplex unit ex308.

In order to decode the multiplexed data received via the antenna ex201, the multiplex/demultiplex unit ex308 separates the multiplexed data into a coded bit stream of picture data and a coded bit stream of voice data, and supplies the coded picture data to the picture decoding unit ex309 and the voice data to the voice processing unit ex305 respectively via the synchronous bus ex313.

Next, the picture decoding unit ex309, which includes the picture decoding apparatus as explained in the present invention, decodes the coded bit stream of picture data by the decoding method corresponding to the coding method as shown in the above-mentioned embodiments so as to generate reproduced moving picture data, and supplies this data to the display unit ex202 via the LCD control unit ex302, and thus moving picture data included in a moving picture file linked to a Web page, for instance, is displayed. At the same time, the voice processing unit ex305 converts the voice data into analog voice data, and then supplies this data to the voice output unit ex208, and thus voice data included in a moving picture file linked to a Web page, for instance, is reproduced.

Figure 29:
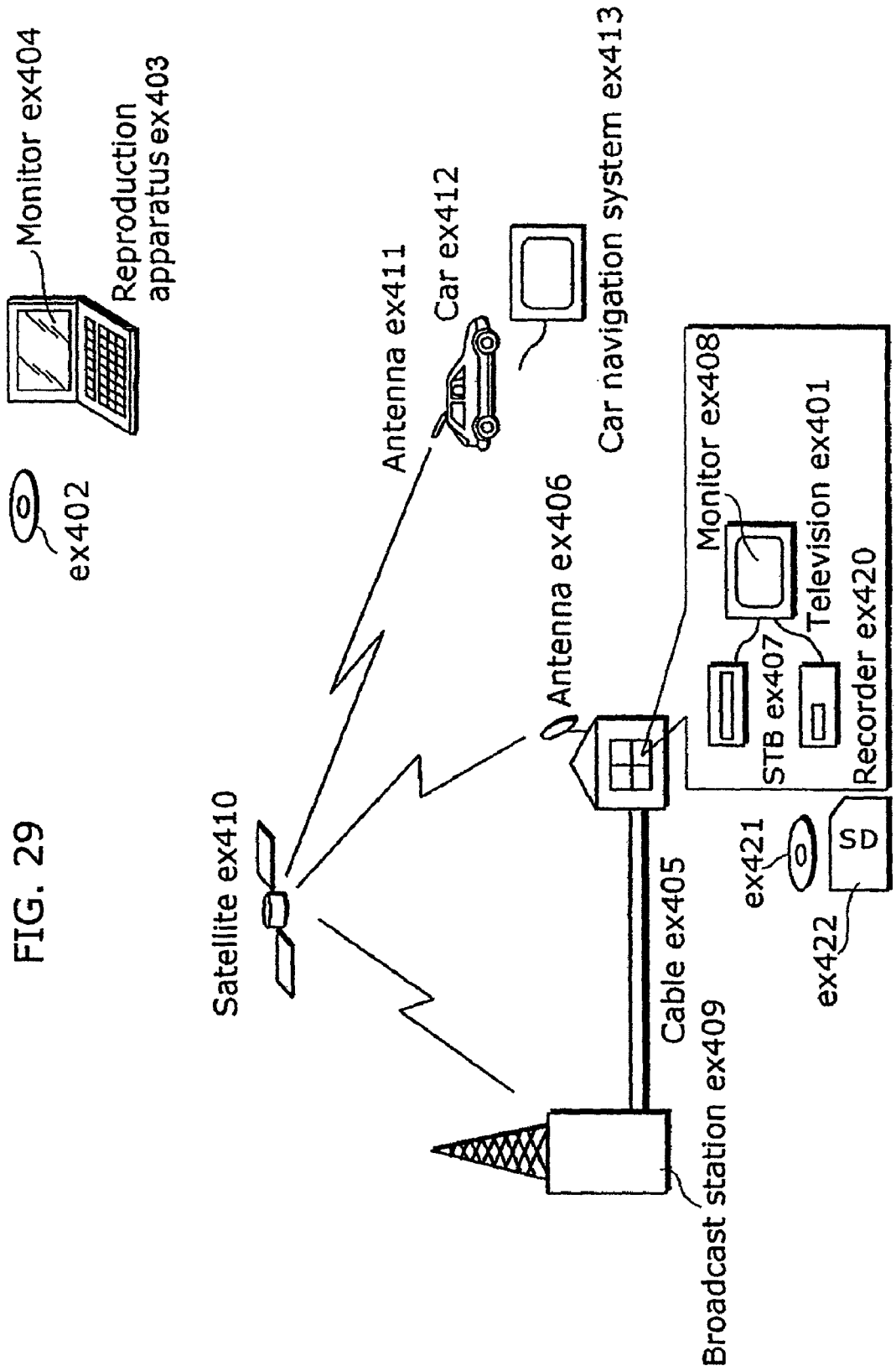
FIG. 29 is a diagram showing an example of a digital broadcasting system.
Figure 30:
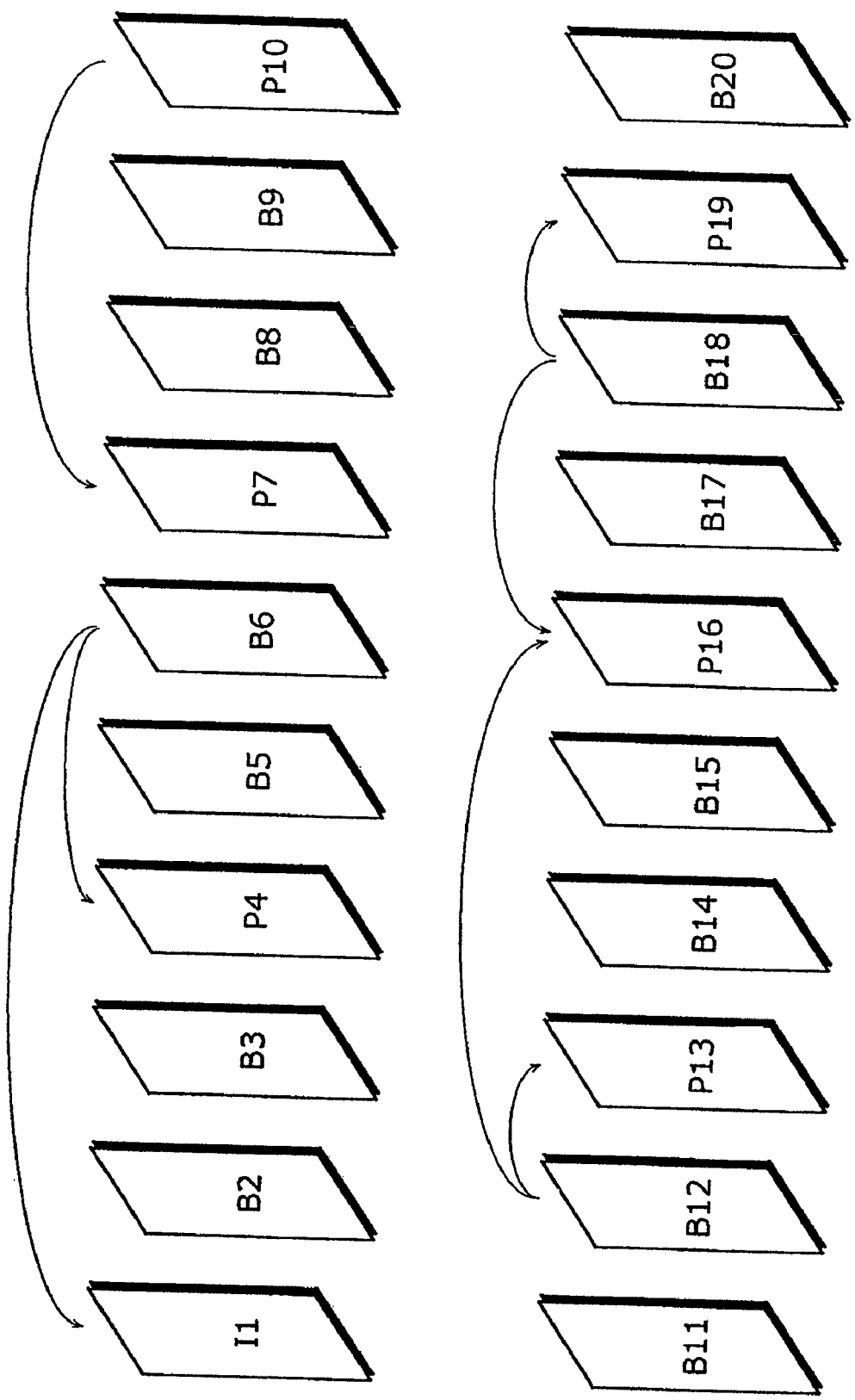
FIG. 30 is a schematic diagram for explaining reference relations between pictures in a background art.
Figure 32:
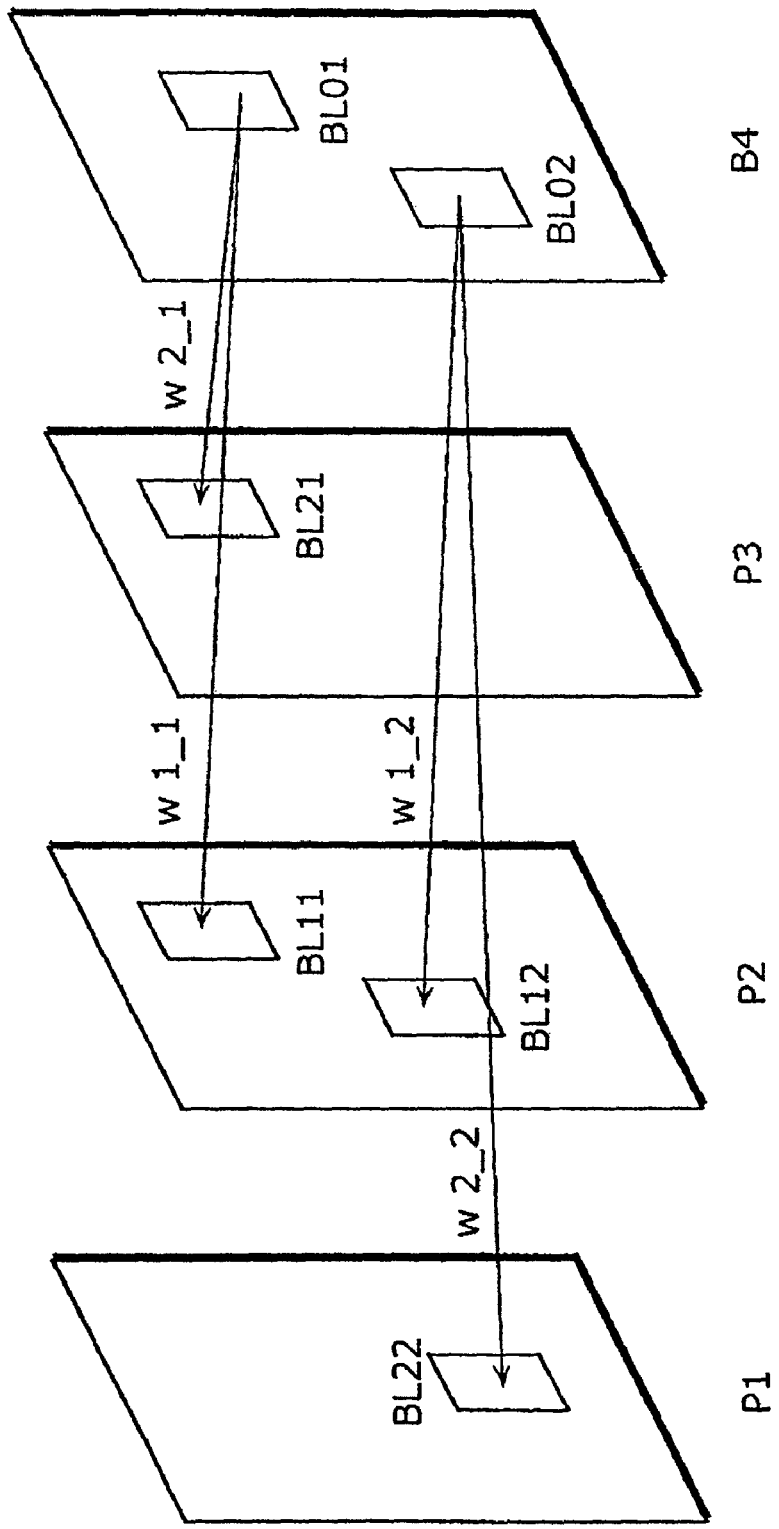
FIG. 32 is a schematic diagram for explaining operations for motion compensation in the background art.
Figure 33:
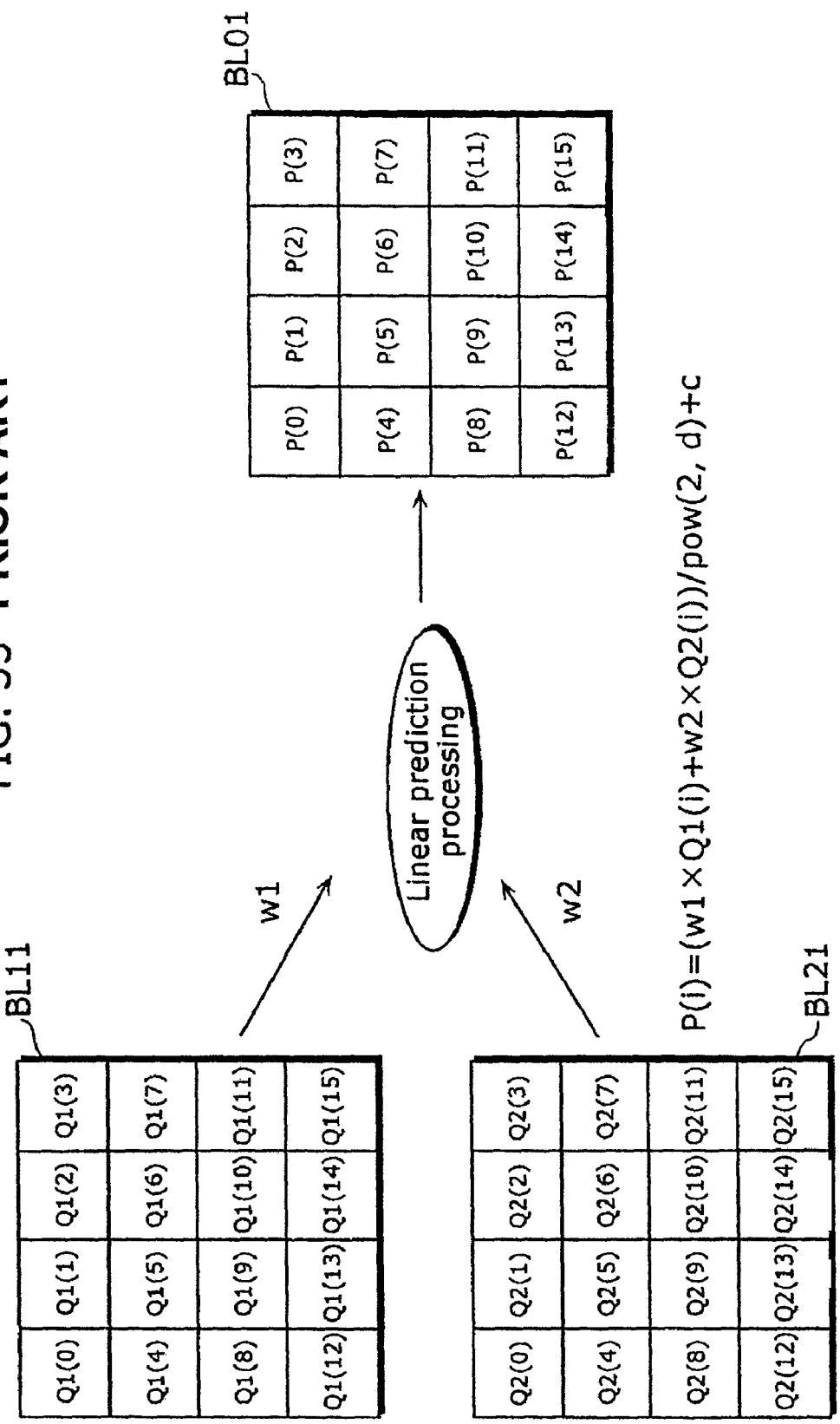
FIG. 33 is a schematic diagram for explaining operations for linear prediction processing in the background art.

The present invention is not limited to the above-mentioned system, and at least either the picture coding apparatus or the picture decoding apparatus in the above-mentioned embodiments can be incorporated into a system for digital broadcasting as shown in FIG. 29. Such ground-based or satellite digital broadcasting has been in the news lately. More specifically, a coded bit stream of video information is transmitted from a broadcast station ex409 to a communication or broadcasting satellite ex410 via radio waves. Upon receipt of it, the broadcasting satellite ex410 transmits radio waves for broadcasting, a home-use antenna ex406 with a satellite broadcast reception function receives the radio waves, and a television (receiver) ex401 or a set top box (STB) ex407 decodes the coded bit stream for reproduction.

The picture decoding apparatus as shown in the above-mentioned embodiments can be implemented in the reproduction apparatus ex403 for reading off and decoding the coded bit stream recorded on a storage medium ex402 that is a recording medium such as a CD and DVD. In this case, the reproduced video signals are displayed on a monitor ex404. It is also conceived to implement the picture decoding apparatus in the set top box ex407 connected to a cable ex405 for a cable television or the antenna ex406 for satellite and/or ground-based broadcasting so as to reproduce them on a monitor ex408 of the television ex401. The picture decoding apparatus may be incorporated into the television, not in the set top box. Or, a car ex412 having an antenna ex411 can receive signals from the satellite ex410, the base station ex107 or the like for reproducing moving pictures on a display device such as a car navigation system ex413.

Furthermore, the picture coding apparatus as shown in the above-mentioned embodiments can code picture signals for recording on a recording medium. As a concrete example, there is a recorder ex420 such as a DVD recorder for recording picture signals on a DVD disc ex421 and a disk recorder for recording them on a hard disk. They can also be recorded on an SD card ex422. If the recorder ex420 includes the picture decoding apparatus as shown in the above-mentioned embodiments, the picture signals recorded on the DVD disc ex421 or the SD card ex422 can be reproduced for display on the monitor ex408.

Figure 28:
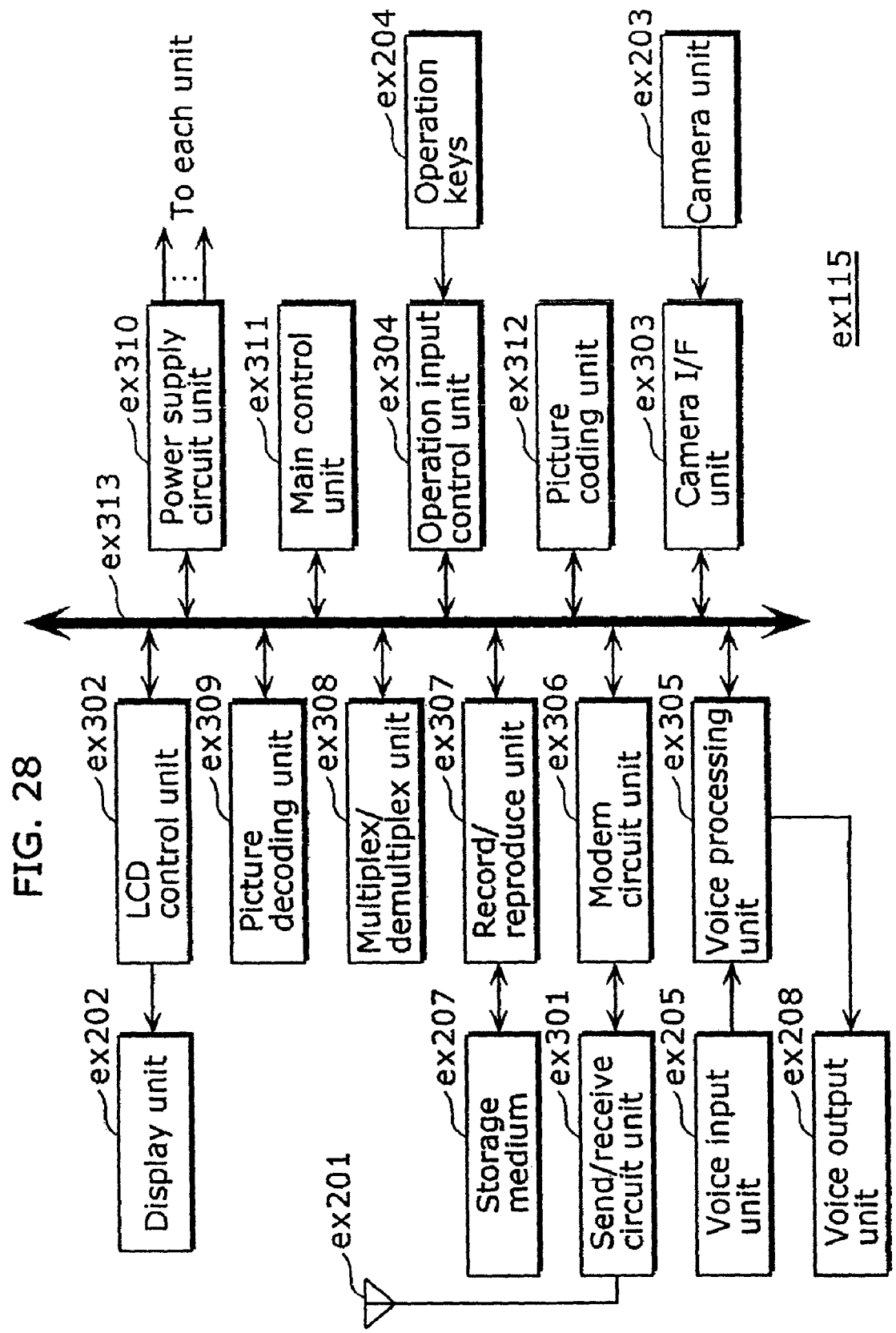
FIG. 28 is a block diagram showing a structure of the mobile phone.

As the structure of the car navigation system ex413, the structure without the camera unit ex203, the camera interface unit ex303 and the picture coding unit ex312, out of the units shown in FIG. 28, can be conceived. The same applies to the computer ex111, the television (receiver) ex401 and others.

In addition, three types of implementations can be conceived for a terminal such as the above-mentioned mobile phone ex114: a sending/receiving terminal including both an encoder and a decoder; a sending terminal including an encoder only; and a receiving terminal including a decoder only.

As described above, it is possible to use the moving picture coding method or the moving picture decoding method in the above-mentioned embodiments in any of the above-mentioned apparatuses and systems, and using this method, the effects described in the above embodiments can be obtained.

INDUSTRIAL APPLICABILITY

The present invention is suitable for a picture coding apparatus for performing inter-picture coding to generate a predictive image by generating commands indicating correspondence between picture numbers and reference indices for designating reference pictures and coefficients used for generation of predictive images, designating a reference picture to be referred to using a reference index, when performing motion compensation on a block in a current picture to be coded, and performing linear prediction using a coefficient corresponding to the reference index on a block obtained by motion estimation in the designated reference picture. In addition, the present invention is suitable for a picture decoding apparatus for decoding a coded signal obtained as a result of the coding by the picture coding apparatus.

The invention claimed is:

1. A decoding method for decoding a coded block by referring to two reference pictures, the decoding method comprising:

decoding a coded image signal to obtain: a first reference index that identifies a first reference picture for a current block to be decoded; a second reference index that identifies a second reference picture for the current block to be decoded; commands that indicate correspondence between reference indices and reference pictures; information that indicates a first maximum reference index value for indicating a maximum value of the first reference index and a second maximum reference index value for indicating a maximum value of the second reference index; plural sets of weighting coefficients used for generating a predictive image; and a prediction error;

designating, based on the commands and the first and second reference indices, the first reference picture and the second reference picture which are referred to when the current block is decoded through motion compensation;

specifying two sets of weighting coefficients that correspond to the first and second reference indices from among the plural sets of weighting coefficients;

generating a first predictive image by performing linear prediction on pixel values of a first reference block, using one of the specified two sets of weighting coefficients, and generating a second predictive image by performing linear prediction on pixel values of a second reference block, using the other of the specified two sets of weighting coefficients, the first reference block being obtained from the first reference picture designated in said designating and the second reference block being obtained from the second reference picture designated in said designating;

generating a predictive image using the first predictive image and the second predictive image; and generating a reconstructed image by adding the predictive image and the prediction error, wherein the commands comprises first commands and second commands, and the first commands indicate correspondence between first reference indices and first reference pictures, each of the first reference indices being an index for designating the first reference picture, and the second commands indicate correspondence between second reference indices and second reference pictures, each of the second reference indices being an index for designating the second reference picture, and wherein information of said plural sets of weighting coefficients used for generating the first predictive image and the second predictive image are placed in a slice header of the coded image signal, and wherein, in the case that the current block is a block included in a B picture and the current block is decoded by designating the first reference picture and the second reference picture which are referred to, one of the specified two sets of weighting coefficients comprises a first part w1 and a second part c1, and the other of the specified two sets of weighting coefficients comprises a first part w2 and a second part c2, and the first part w1 is used for scaling pixel values of the first reference block and the first part w2 is used for scaling pixel values of the second reference block, and the second part c1 and the second part c2 are used for increasing pixel values of the predictive image by a mean value of c1 and c2.

2. The decoding method according to claim 1, wherein the information that indicates the first maximum reference index value and the second maximum reference index value is placed in a picture common information area included in the coded image signal.

3. A decoding apparatus which decodes a coded block by referring to two reference pictures, the decoding apparatus comprising:

a coded image signal decoding unit operable to decode a coded image signal to obtain: a first reference index that identifies a first reference picture for a current block to be decoded; a second reference index that identifies a second reference picture for the current block to be decoded; commands that indicate correspondence between reference indices and reference pictures; information that indicates a first maximum reference index value for indicating a maximum value of the first reference index and a second maximum reference index value for indicating a maximum value of the second reference index; plural sets of weighting coefficients used for generating a predictive image; and a prediction error;

a reference picture designating unit operable to designate, based on the commands and the first and second reference indices, the first reference picture and the second reference picture which are referred to when the current block is decoded through motion compensation;

a weighting coefficient specifying unit operable to specify two sets of weighting coefficients that correspond to the first and second reference indices from among the plural sets of weighting coefficients;

a first and second predictive image generating unit operable to generate a first predictive image by performing linear prediction on pixel values of a first reference block, using one of the specified two sets of weighting coefficients, and operable to generate a second predictive image by performing linear prediction on pixel values of a second reference block, using the other of the specified two sets of weighting coefficients, the first reference block being obtained from the first reference picture designated by said reference picture designating unit and the second reference block being obtained from the second reference picture designated by said reference picture designating unit;

a predictive image generating unit operable to generate a predictive image using the first predictive image and the second predictive image; and a reconstructed image generating unit operable to generate a reconstructed image by adding the predictive image and the prediction error, wherein the commands comprises first commands and second commands, and the first commands indicate correspondence between first reference indices and first reference pictures, each of the first reference indices being an index for designating the first reference picture, and the second commands indicate correspondence between second reference indices and second reference pictures, each of the second reference indices being an index for designating the second reference picture, and wherein information of said plural sets of weighting coefficients used for generating the first predictive image and the second predictive image are placed in a slice header of the coded image signal, and wherein, in the case that the current block is a block included in a B picture and the current block is decoded by designating the first reference picture and the second reference picture which are referred to, one of the specified two sets of weighting coefficients comprises a first part w1 and a second part c1, and the other of the specified two sets of weighting coefficients comprises a first part w2 and a second part c2, and the first part w1 is used for scaling pixel values of the first reference block and the first part w2 is used for scaling pixel values of the second reference block, and the second part c1 and the second part c2 are used for increasing pixel values of the predictive image by a mean value of c1 and c2.

4. The decoding apparatus according to claim 3,
wherein the information that indicates the first maximum reference index value and the second maximum reference index value is placed in a picture common information area included in the coded image signal.

5. A non-transitory computer-readable medium having a program stored thereon for causing a computer to perform a decoding method for decoding a coded block by referring to two reference pictures, the decoding method comprising:

decoding a coded image signal to obtain: a first reference index that identifies a first reference picture for a current block to be decoded; a second reference index that identifies a second reference picture for the current block to be decoded; commands that indicate correspondence between reference indices and reference pictures; information that indicates a first maximum reference index value for indicating a maximum value of the first reference index and a second maximum reference index value for indicating a maximum value of the second reference index; plural sets of weighting coefficients used for generating a predictive image; and a prediction error;

designating, based on the commands and the first and second reference indices, the first reference picture and the second reference picture which are referred to when the current block is decoded through motion compensation;

specifying two sets of weighting coefficients that correspond to the first and second reference indices from among the plural sets of weighting coefficients;

generating a first predictive image by performing linear prediction on pixel values of a first reference block, using one of the specified two sets of weighting coefficients, and generating a second predictive image by performing linear prediction on pixel values of a second reference block, using the other of the specified two sets of weighting coefficients, the first reference block being obtained from the first reference picture designated in said designating and the second reference block being obtained from the second reference picture designated in said designating;

generating a predictive image using the first predictive image and the second predictive image; and generating a reconstructed image by adding the predictive image and the prediction error, wherein the commands comprises first commands and second commands, and the first commands indicate correspondence between first reference indices and first reference pictures, each of the first reference indices being an index for designating the first reference picture, and the second commands indicate correspondence between second reference indices and second reference pictures, each of the second reference indices being an index for designating the second reference picture, and wherein information of said plural sets of weighting coefficients used for generating the first predictive image and the second predictive image are placed in a slice header of the coded image signal, and wherein, in the case that the current block is a block included in a B picture and the current block is decoded by designating the first reference picture and the second reference picture which are referred to, one of the specified two sets of weighting coefficients comprises a first part w1 and a second part c1, and the other of the specified two sets of weighting coefficients comprises a first part w2 and a second part c2, and the first part w1 is used for scaling pixel values of the first reference block and the first part w2 is used for scaling pixel values of the second reference block, and the second part c1 and the second part c2 are used for increasing pixel values of the predictive image by a mean value of c1 and c2.

* * * * *